(12) United States Patent
Kido

(10) Patent No.: US 8,355,590 B2
(45) Date of Patent: Jan. 15, 2013

(54) IMAGE DATA COMPRESSION METHOD, PATTERN MODEL POSITIONING METHOD IN IMAGE PROCESSING, IMAGE PROCESSING APPARATUS, IMAGE PROCESSING PROGRAM, AND COMPUTER READABLE RECORDING MEDIUM

(75) Inventor: Manabu Kido, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 13/398,908

(22) Filed: Feb. 17, 2012

(65) Prior Publication Data

US 2012/0148163 A1 Jun. 14, 2012

Related U.S. Application Data

(63) Continuation of application No. 12/503,955, filed on Jul. 16, 2009, now Pat. No. 8,150,213.

(30) Foreign Application Priority Data

Aug. 9, 2008 (JP) ................................. 2008-206479
Oct. 16, 2008 (JP) ................................. 2008-267978

(51) Int. Cl.
*G06K 9/36* (2006.01)

(52) U.S. Cl. ........................................ 382/243; 382/298
(58) Field of Classification Search ........... 382/232–243
See application file for complete search history.

(56) References Cited

U.S. PATENT DOCUMENTS

| 4,685,143 | A | * | 8/1987 | Choate .......................... 382/170 |
| 5,046,109 | A | * | 9/1991 | Fujimori et al. .............. 382/144 |
| 5,469,516 | A | | 11/1995 | Kerz |
| 6,072,897 | A | * | 6/2000 | Greenberg et al. ........... 382/144 |
| 6,094,508 | A | * | 7/2000 | Acharya et al. ............... 382/199 |
| 6,272,255 | B2 | * | 8/2001 | de Queiroz et al. .......... 382/239 |
| 6,408,109 | B1 | | 6/2002 | Silver et al. |
| 6,490,375 | B1 | * | 12/2002 | Garakani et al. ............. 382/273 |
| 2010/0034476 | A1 | | 2/2010 | Kido |
| 2010/0034484 | A1 | | 2/2010 | Kido |

FOREIGN PATENT DOCUMENTS

| JP | 07-128017 | 5/1995 |
| JP | 08-129612 | 5/1996 |
| JP | 3759983 | 3/2006 |

* cited by examiner

*Primary Examiner* — Jingge Wu
(74) *Attorney, Agent, or Firm* — Kilyk & Bowersox, P.L.L.C.

(57) ABSTRACT

There is provided a data compression method for increasing a reduction ratio, while keeping a sufficient characteristic amount, to seek speeding up of processing, the method being for compressing image data in pattern model positioning in image processing of searching out of an image to be searched and positioning a pattern model corresponding to a pre-registered image. The method includes the steps of: computing an edge strength image having edge strength information and an edge angle image having edge angle information with respect to each pixel constituting an image; transforming the edge angle image of each pixel into an edge angle bit image expressed by an edge angle bit indicating an angle with a pre-defined fixed width; and compressing the edge angle bit image to create an edge angle bit reduced image by taking a sum with respect to each edge angle bit.

10 Claims, 51 Drawing Sheets

FIG. 7

| PIXEL | ANGLE | | | | | | | |
|---|---|---|---|---|---|---|---|---|
| 1 | 0 | 0 | 0 | 0 | 0 | 0 | 0 | 0 |
| 2 | 0 | 1 | 1 | 1 | 0 | 0 | 0 | 0 |
| 3 | 0 | 1 | 1 | 0 | 0 | 0 | 0 | 0 |
| 4 | 0 | 1 | 0 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| ⋮ | ⋮ | ⋮ | ⋮ | ⋮ | ⋮ | ⋮ | ⋮ | ⋮ |
| 64 | 0 | 0 | 0 | 0 | 0 | 0 | 0 | 0 |
| AFTER REDUCTION | 0 | 1 | 1 | 1 | 0 | 0 | 0 | 0 |

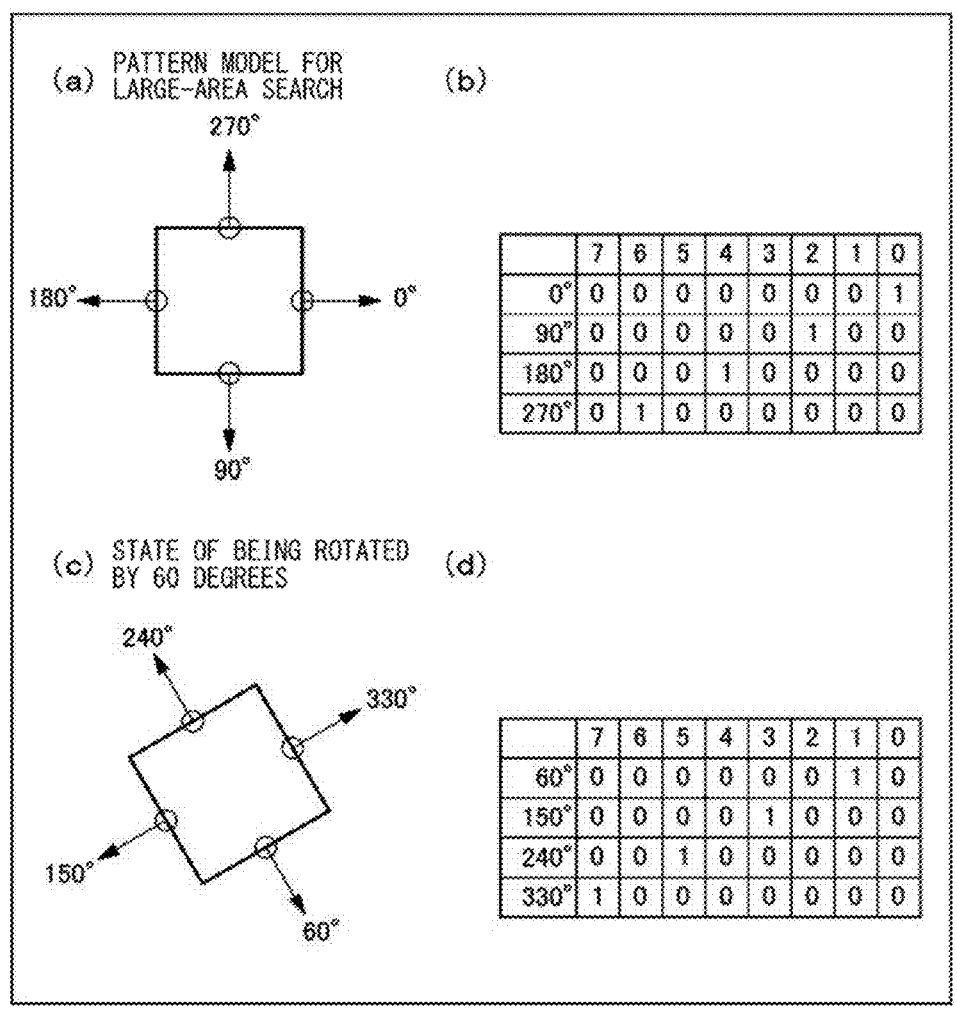

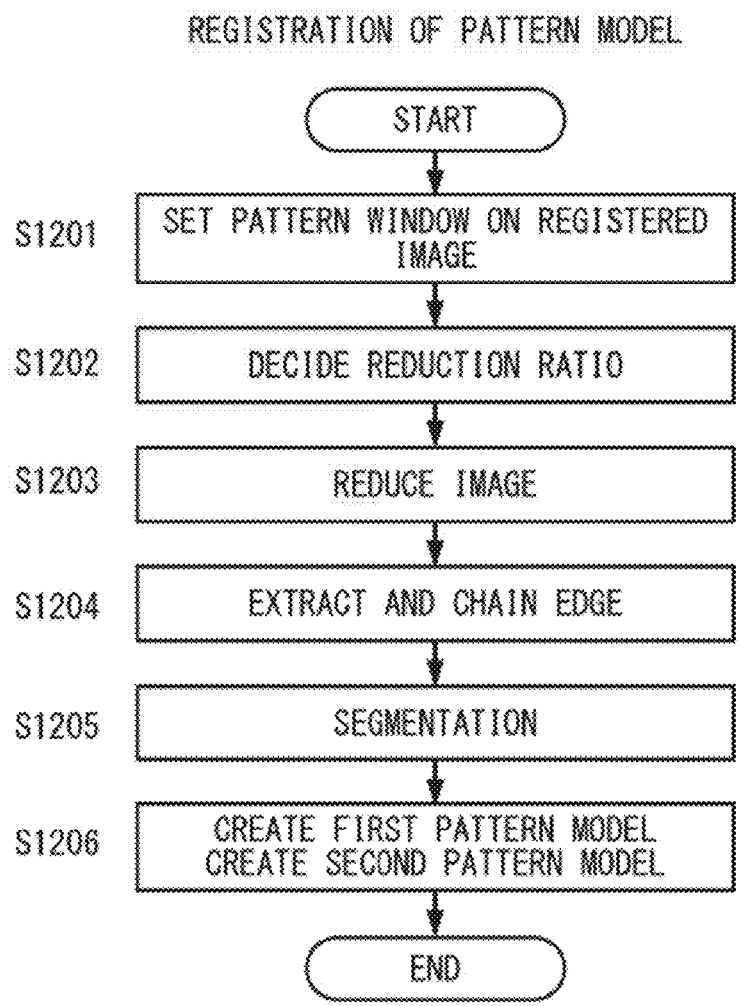

FIG. 30
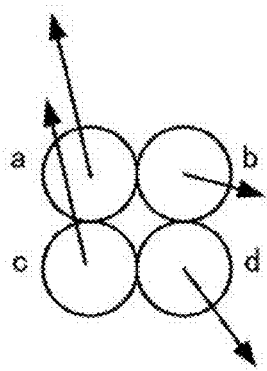
FIG. 31
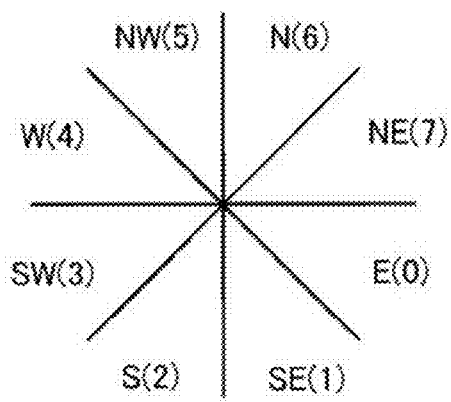
FIG. 32
| EDGE POINT | EDGE ANGLE BIT | | | | | | | |
|---|---|---|---|---|---|---|---|---|
| | 7 | 6 | 5 | 4 | 3 | 2 | 1 | 0 |
| a | 0 | 0 | 1 | 0 | 0 | 0 | 0 | 0 |
| b | 0 | 0 | 0 | 0 | 0 | 0 | 0 | 1 |
| c | 0 | 0 | 1 | 0 | 0 | 0 | 0 | 0 |
| d | 0 | 0 | 0 | 0 | 0 | 0 | 1 | 0 |

FIG. 33
| EDGE POINT | EDGE ANGLE BIT | | | | | | | |
|---|---|---|---|---|---|---|---|---|
| | 7 | 6 | 5 | 4 | 3 | 2 | 1 | 0 |
| a | 0 | 0 | 1 | 0 | 0 | 0 | 0 | 0 |
| b | 0 | 0 | 1 | 0 | 0 | 0 | 0 | 1 |
| c | 0 | 0 | 0 | 0 | 0 | 0 | 0 | 0 |
| d | 0 | 0 | 0 | 0 | 0 | 0 | 1 | 0 |
| a' | 0 | 0 | 1 | 0 | 0 | 0 | 1 | 1 |
FIG. 34
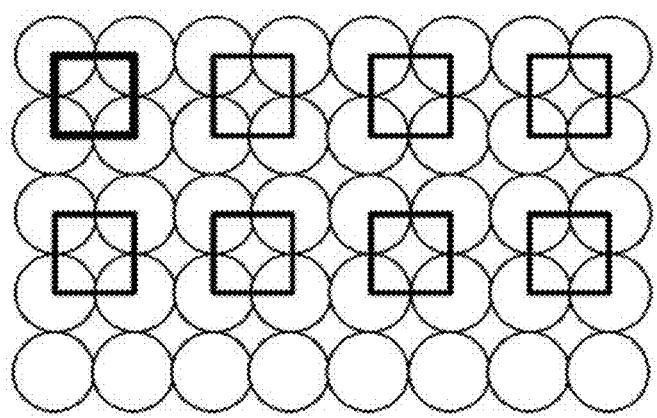
FIG. 35
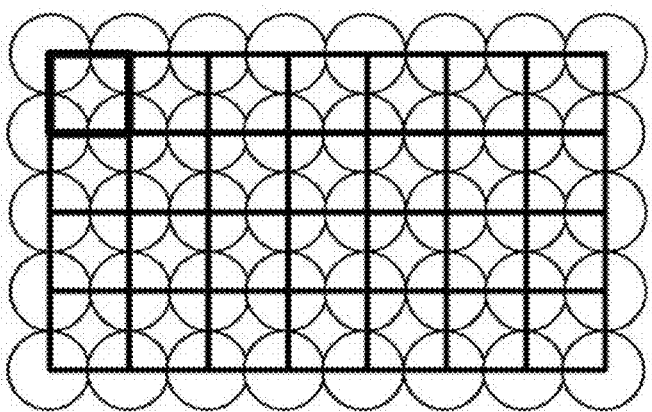

FIG. 39
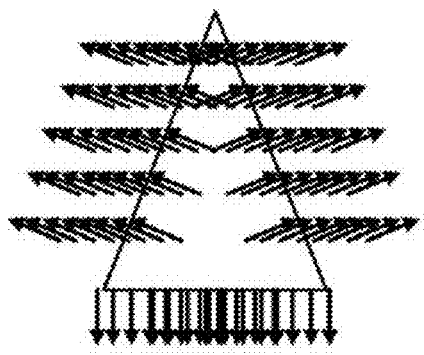
FIG. 40A
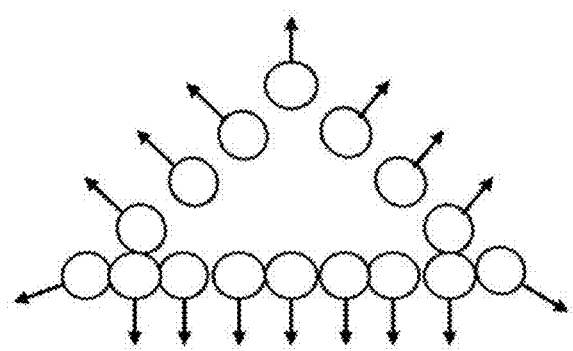
FIG. 40B
FIG. 41
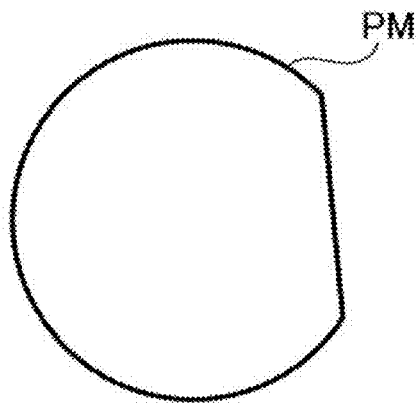

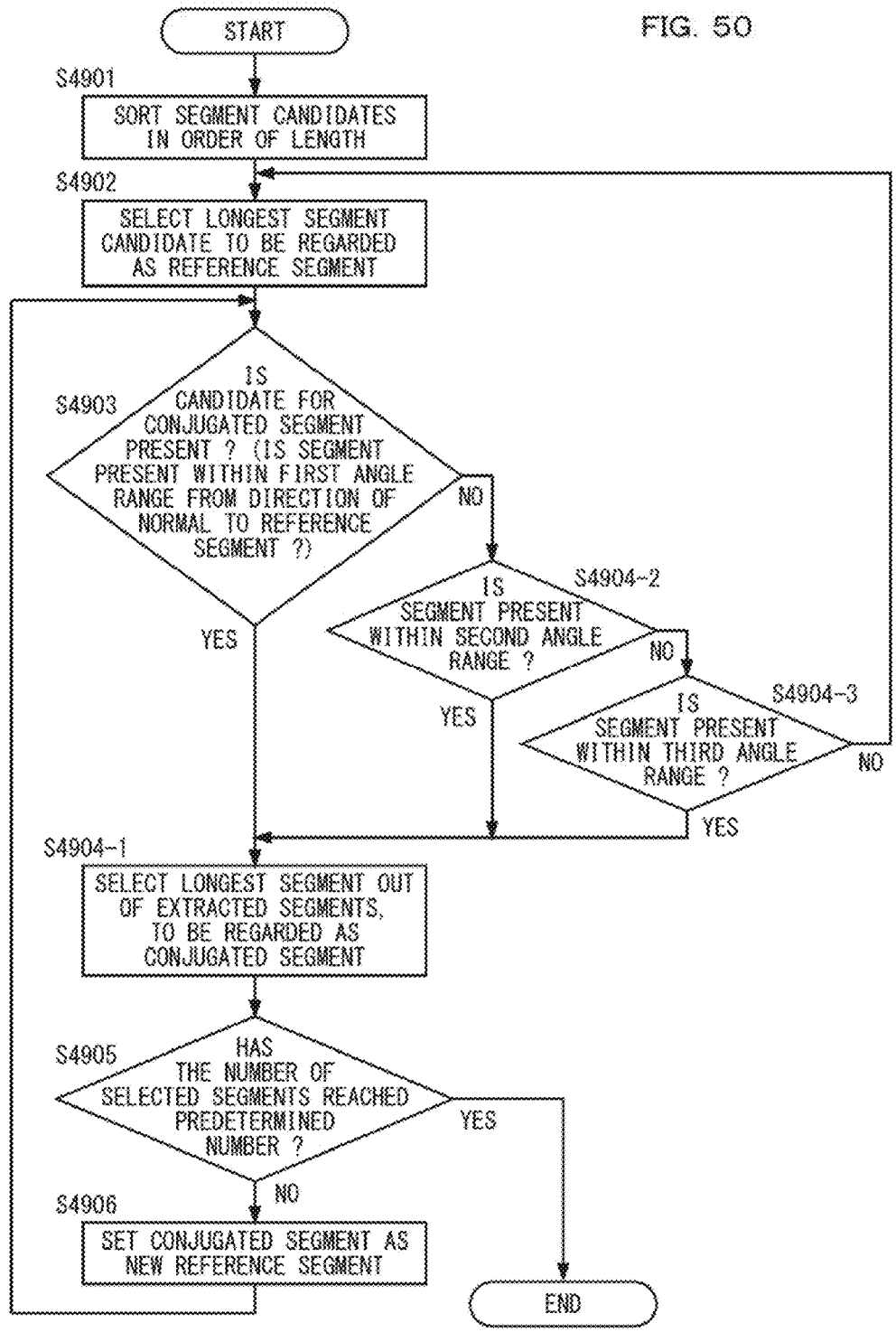

|  | COARSE SEARCH | FINE POSITIONING |  |
|---|---|---|---|
| EDGE STRENGTH UPPER LIMIT | 255 | 255 | 81 |
| EDGE STRENGTH LOWER LIMIT | 30 | 30 | 82 |
| CONTOUR LENGTH LOWER LIMIT | 10 | 10 | 83 |
| NUMBER OF SELECTED CONTOURS | 50 | 50 | 84 |
| ORDER OF REGISTERED CONTOURS | DESCENDING ORDER OF LENGTH ▼ | DESCENDING ORDER OF LENGTH ▼ | 85 |

200

|  | COARSE SEARCH | FINE POSITIONING |  |
|---|---|---|---|
| EDGE STRENGTH UPPER LIMIT | 255 | 255 | 81 |
| EDGE STRENGTH LOWER LIMIT | 30 | 30 | 82 |
| CONTOUR LENGTH UPPER LIMIT | 20 | 100 | 86 |
| CONTOUR LENGTH LOWER LIMIT | 4 | 10 | 83 |

300

IMAGE DATA COMPRESSION METHOD, PATTERN MODEL POSITIONING METHOD IN IMAGE PROCESSING, IMAGE PROCESSING APPARATUS, IMAGE PROCESSING PROGRAM, AND COMPUTER READABLE RECORDING MEDIUM

CROSS-REFERENCE TO RELATED APPLICATIONS

The present application is a continuation of U.S. patent application Ser. No. 12/503,955, filed Jul. 16, 2009, and which claims foreign priority based on Japanese Patent Applications No. 2008-206479, filed Aug. 9, 2008, and No. 2008-267978, filed Oct. 16, 2008, the contents of which is incorporated herein by reference.

BACKGROUND OF THE INVENTION

1. Field of the Invention

The present invention relates to a data compression method for an image to be searched, a pattern model positioning method in image processing, an image processing apparatus, an image processing program, and a computer readable recording medium upon searching out of the image to be searched and positioning a pattern model corresponding to a pre-registered image.

2. Description of the Related Art

An image processing apparatus for processing an image picked up by an image pickup element typically includes: an image pickup apparatus for picking up an image processing object (hereinafter also referred to as "work"); an image data storing device for storing data on the image picked up by the image pickup apparatus; and an image data processing device for processing the image data stored by the image data storing device. For example, in the image processing apparatus where the image pickup apparatus is made up of a CCD camera, luminance data (so-called multi-valued data) such as 256 levels of gray or 1024 levels of gray is obtained based on each of charge amounts of a large number of charge coupled elements constituting an image pickup surface, whereby a position, a rotational angle and the like of the work as an object to be searched can be found. Conventionally, as techniques for performing processing on image data to search an object to be searched in image processing, there are known a difference search performed using a total value of absolute values of pixel difference values between images, a normalized correlation search performed using normalized correlation values between images, and the like. In these searches, an object to be searched that is wished to be searched is previously registered as a template image, and based on the image, a search is executed for the object to be searched out of an image to be searched. In these search processing, a region-based search by use of image data has conventionally been mainstream. However, such a conventional region-based search based on image thickness or the like has the problem of being susceptible to a change in illumination upon image pickup, and the like.

Meanwhile, there has also been provided a method for performing edge extraction processing on a registered image and an image to be searched, to perform a search based on edge information. In this method, a concentration value of pixels constituting image data is not used, but edge data based on an amount of change in concentration value is used, and hence it is possible to obtain the advantage of being not susceptible to fluctuations in illumination upon image pickup. Especially, in recent years, an edge-based pattern search with an edge regarded as a characteristic amount is drawing attention for its high robustness, and is in practical use in industrial applications and the like.

As a technique for improving a processing speed of a pattern search, a "coarse to fine" approach is known. Namely, first, a search is coarsely performed using a low-resolution image (coarse image), and after a rough position is specified, detailed positioning is performed using a high-resolution image (fine image), thereby to enhance accuracy of a position and posture. As a technique concerning fine positioning for finding a position and posture with high accuracy by means of such coarse-to-fine type template matching, an image processing apparatus of Japanese Patent No. 3759983 is known.

In the case of performing the edge-based search by means of coarse-to-fine type template matching, a pyramid search is used where a search is performed using coarse data obtained by compressing (also referred to as "thinning out" or the like) original data, to specify a rough position, and thereafter, a search is performed using detailed data. FIG. 87 shows a concept of the pyramid search. As shown in this drawing, a rough search (referred to as "coarse search" or the like) is performed using a low-resolution image having a high reduction ratio, to find a rough position. Thereafter, a search is performed in the vicinity thereof with an increased resolution and an intermediate reduction ratio, and finally, a fine search is performed on an image of an original size or an image having a reduction ratio close to the original size. As thus described, in the typical pyramid search, a plurality of images having changed resolutions are prepared, and a schematic position is first detected by use of an image having the lowest resolution. In subsequent processing, a search range is narrowed down to the vicinity of the previous detected position as the resolution is gradually increased. Thereby, the accuracy of the detected position enhances with each succeeding processing level, finally leading to detection of a highly accurate position with the resolution being that of the original image or closer thereto.

However, upon performing such a pyramid search, when a compression ratio is increased with the aim of higher-speed processing, an amount of characteristics such as an edge strength and an edge angle in a pattern image as an object to be searched is reduced due to compression of image data, thus causing the problem of making the search difficult since matching is performed based on the reduced characteristics. Especially in the edge-based search, information on an angle of an edge is highly important as information for use in the search, and it is necessary to effectively keeps information on the edge angle. Meanwhile, reducing an image as in the pyramid search is inevitable for improvement in processing speed, and at this time, the edge angle information might be lost. Therefore, upon performing a first coarse search, setting a reduction ratio of a reduced image is extremely important. Namely, if the first search is performed on an extremely reduced image, the search is performed in a state where a characteristic amount necessary for the search has been lost, and hence the search itself might be failed. On the contrary, when the first search is performed on an image having a low reduction ratio, it takes long to perform the search. Accordingly, upon performing the first search, an appropriate reduction ratio needs to be set in accordance with the user's usage and objective. However, setting an optimal reduction ratio is not easy. When the user is too conscious of keeping enough a characteristic amount to prevent failure of the search, a situation may occur where a search has to be performed on data on a characteristic amount extracted with a reduction ratio as low as the order of one-half depending upon a pattern image, thereby bringing about a state where the processing speed cannot be regarded as sufficient. As thus described, the search accuracy and the processing speed are in the trade-off relation, and hence making both compatible has been extremely difficult.

SUMMARY OF THE INVENTION

The present invention was made in view of such a situation, and a principal object of the present invention is to provide an image data compression method, a pattern model positioning method in image processing, an image processing apparatus, an image processing program, and a computer readable recording medium, so that a reduction ratio is increased to seek speeding up of processing while a sufficient characteristic amount is held.

In order to achieve the above object, a first image data compression method for compressing data on an image to be searched in pattern model positioning in image processing of searching out of the image to be searched and positioning an object to be searched that is similar to a pre-registered image by use of a pattern model corresponding to the registered image, the method is capable of including the steps of computing an edge angle image including edge angle information with respect to each pixel constituting an image; transforming an edge angle of each pixel into an edge angle bit image expressed by an edge angle bit indicating an angle with a pre-defined fixed width; and performing an OR operation on an edge angle bit of every pixel included in an OR operation region decided in accordance with a reduction ratio for reducing the edge angle bit image in order to create an edge angle bit reduced image reduced from the edge angle bit image, to create an edge angle bit reduced image made up of reduced edge angle bit data representing each OR operation region. Thereby, since the edge angle information is held even after reduction of the image, it is possible to speed up a search with a data amount reduced while keeping search accuracy.

A second pattern model positioning method in image processing includes the following steps upon searching out of an image to be searched and positioning an object to be searched that is similar to a pre-registered image by use of a pattern model corresponding to the registered image: a first coarse search step of performing a search on the whole area of a second-reduction-ratio image to be searched, obtained by reducing the image to be searched with a second reduction ratio, by use of a first pattern model created from the registered image with the second reduction ratio; a second coarse search step of further performing a search locally on a first-reduction-ratio image to be searched or the second-reduction-ratio image to be searched, created from the image to be searched, based on a result obtained in the first coarse search step by use of a second pattern model created from the registered image with the second reduction ratio or a first reduction ratio made lower than the second reduction ratio; and the step of further performing fine positioning with accuracy higher than the first or second coarse search on a fourth-reduction-ratio image to be searched, which is created from the image to be searched and a reduction ratio of which is a fourth reduction ratio not higher than the first reduction ratio, based on a result obtained in the second coarse search step by use of a third pattern model having the fourth reduction ratio which is created from the registered image, wherein, in advance of the first coarse search step, the method includes the steps of reducing the pre-registered image into the first reduction ratio; creating a first pattern model having the second reduction ratio which is created based on geometric information on a contour in the registered image reduced with the second reduction ratio and used in the first coarse search step, a second pattern model having the first or second reduction ratio which is created based on geometric information on a contour in the registered image reduced with the first or second reduction ratio and used in the second coarse search step, and a third pattern model having the fourth reduction ratio which is created from a fourth-reduction-ratio image to be searched and used in the fine positioning; acquiring the image to be searched and also reducing the image to be searched into the first reduction ratio; computing an edge angle image having the first reduction ratio and including edge angle information in each pixel constituting the image, by use of the first-reduction-ratio image to be searched; creating an edge angle bit image having the first reduction ratio, which is expressed by an edge angle bit indicating an angle with a pre-defined fixed width with respect to each pixel, by use of the edge angle image having the first reduction ratio; and performing an OR operation on an edge angle bit of every pixel included in an OR operation region decided in accordance with the second reduction ratio in order to create an edge angle bit reduced image having the second reduction ratio that is larger than the first reduction ratio of the edge angle bit having the first reduction ratio, to create an edge angle bit reduced image having the second reduction ratio which is made up of reduced edge angle bit data representing each OR operation region, and thereby, the method makes the following steps executable: the first coarse search step of positioning of the first pattern model having the second reduction ratio on the whole area of the edge angle bit reduced image having the second reduction ratio; the second coarse search step of performing a local coarse search on the edge angle bit image having the first reduction ratio or the edge angle bit reduced image having the second reduction ratio based on a result of the positioning in the first coarse search by use of the second pattern model corresponding to the reduction ratio; and the step of performing fine positioning based on a result of the second coarse search by use of the third pattern model for fine positioning having the fourth reduction ratio, which is between the registered image having the first reduction ratio and the registered image as an original image, and the fourth-reduction-ratio image to be searched of the registered image corresponding to the third pattern model. Thereby, since the edge angle information is held even with image data further reduced, it is possible to perform a high-speed search with a data size reduced without lowering search accuracy.

According to a third pattern model positioning method in image processing, the second coarse search step is capable of selecting at least one image to be searched out of an edge angle bit reduced image having a third reduction ratio that is larger than the first reduction ratio and smaller than the second reduction ratio, in addition to the edge angle bit image having the first reduction ratio or the edge angle bit reduced image having the second reduction ratio.

According to a fourth pattern model positioning method in image processing, the edge angle bit reduced image having the third reduction ratio can be made up of reduced edge angle bit data representing each OR operation region decided in accordance with the third reduction ratio, the data being obtained by performing an OR operation on an edge angle bit of every pixel included in the OR operation region.

According to a fifth pattern model positioning method in image processing, selection of the image to be searched can be decided based on a ratio between the first reduction ratio and the second reduction ratio.

A sixth pattern model positioning method in image processing can further have, in advance of the second coarse search step, the step of determining whether or not to require an edge angle bit reduced image on the basis of the third reduction ratio between the first reduction ratio and the second reduction ratio based on the ratio that is between the first reduction ratio and the second reduction ratio.

According to a seventh pattern model positioning method in image processing, in the case of determining to require the edge angle bit image having the third reduction ratio, a search can be executed by use of at least the edge angle bit reduced image having the third reduction ratio in the second coarse search step.

According to a eighth pattern model positioning method in image processing, in the case of executing the search by use of the edge angle bit reduced image having the third reduction ratio, a fourth pattern model corresponding to the third reduction ratio can be created from the registered image in advance of the second coarse search step.

According to a ninth pattern model positioning method in image processing, the fourth reduction ratio of the registered image corresponding to the third pattern model used in the fine positioning step can be decided to be a reduction ratio between the first reduction ratio and an unmagnified image based on sharpness of the registered image.

According to a tenth pattern model positioning method in image processing, the sharpness of the image can be sharpness of an edge of an edge image showing a contour.

According to a eleventh pattern model positioning method in image processing, the fine positioning step can be the step of arranging the third pattern model for fine positioning so as to be superimposed on the fourth-reduction-ratio image to be searched corresponding to the third pattern model, finding a corresponding edge point on the image to be searched corresponding to a contour constituting the third pattern model for fine positioning, regarding a relation between each contour and the corresponding edge point as an evaluation value, and performing fine positioning such that an accumulated value of the evaluation values becomes minimal or maximal.

According to a twelfth pattern model positioning method in image processing, the fourth reduction ratio can include unmagnification. Thereby, it is possible to use an unmagnified image obtained without reducing the original image as the fourth-reduction-ratio image to be searched.

A thirteenth pattern model positioning method in image processing can further include, in advance of the first coarse search step, the steps of: extracting a plurality of edge points from the registered image having the second reduction ratio; coupling adjacent edge points among the extracted plurality of edge points, to create a continuous chain; and creating segments each approximated by means of a circular arc or a line with respect to one or more chains, and extracting a contour from the registered image by regarding aggregation of the segments as the contour, thereby to constitute a pattern model of the registered image, wherein, the fine positioning step finds an individual corresponding edge point on the fourth-reduction-ratio image to be searched corresponding to each segment constituting the pattern model, and a relation between each segment and the corresponding edge point is regarded as an evaluation value and fine positioning is performed such that an accumulated value of the evaluation values becomes minimal or maximal.

A fourteenth pattern model positioning method in image processing can further include, in advance of the step of reducing the image to be searched into the first reduction ratio, the step of extracting a contour from the registered image and setting a plurality of reference points on the extracted contour, and also constituting a pattern model of the registered image where a corresponding point search line having a predetermined length, which passes through the reference point and is substantially orthogonal to the contour, is allocated to each reference point, wherein the fine positioning step finds a corresponding edge point on the image to be searched corresponding to the reference point with respect to each corresponding point search line based on an edge angle at least in a position along the corresponding point search line on the fourth-reduction-ratio image to be searched, and a relation between the corresponding edge point of each reference point and the contour including the reference point is regarded as an evaluation value and fine positioning is further performed such that an accumulated value of the evaluation values becomes minimal or maximal.

According to a fifteenth pattern model positioning method in image processing, when a plurality of edge points that can be candidates of the corresponding edge point are present on the corresponding point search line in the step of finding the corresponding edge point, one closest to the reference point among these corresponding-edge-point candidates can be selected as the corresponding edge point. Thereby, a method for deciding a corresponding edge point in the case of a plurality of corresponding-edge-point candidates being present can be uniformly decided, and thereafter, upon fine positioning, a distance between the corresponding edge point and the reference point can be used as an evaluation value.

According to sixteenth pattern model positioning method in image processing, the fine positioning step can include the step of computing an error value or a weight value concerning the corresponding edge point of each the reference point which is used in calculation of a least squares method to solve simultaneous equations obtained by the least squares method from these values, and comparing edge angles of the respective edge points included in the image to be searched and the pattern model to calculate coincidence in order to find a position and posture of the pattern model with accuracy higher than the coarse search performed with the third reduction ratio.

According to seventeenth pattern model positioning method in image processing, the step of computing an edge strength image can compute an edge strength image including information on an edge strength in each pixel constituting the image in addition to the edge angle image including the edge angle information. Thereby, an edge angle bit image having the first reduction ratio can be created with respect to each pixel by use of the edge angle image having the first reduction ratio and the edge strength image having the first reduction ratio. Consequently, it is possible to realize highly accurate positioning of a pattern model by use of edge image data based on the edge strength information as well as the edge angle information.

According to an eighteenth pattern model positioning method in image processing, the step of creating an edge angle bit image is capable of creating an edge angle bit image based on the edge strength image and the edge angle image of each pixel so as to hold the edge angle information with respect to each edge angle image even after reduction of the edge angle image into a predetermined reduction ratio.

According to nineteenth pattern model positioning method in image processing, an edge angle of a pixel, an edge strength of which is higher than a pre-set edge strength threshold, is held and an edge angle of a pixel, an edge strength of which is lower than the pre-set edge strength threshold, is not held.

According to a twentieth pattern model positioning method in image processing, the step of extracting an edge point performs edge-strength non-maximal point suppressing processing by use of an edge angle and an edge strength of the registered image, to extract an edge point.

According to a twenty first pattern model positioning method in image processing, the step of creating an edge angle bit image can synthesize data on a plurality of adjacent edge points included in the edge angle bit image, and also holding the data such that every synthesized edge point possesses edge angle information at each of the plurality of edge points related to the synthesis which is possessed by the edge point as the unmagnified image or the first-reduction-ratio image to be searched.

According to a twenty second pattern model positioning method in image processing, the step of creating an edge angle bit image can set up edge angle bits of both edge angle sections that demarcate a border between the edge angle sections in a case where the edge angle is included in a predetermined edge angle bit processing width with the border between the edge angle sections for sectionalizing the edge angle set at the center. Thereby, it is possible to eliminate a state where the edge angle bit unstably fluctuates due to the influence of noise, so as to expect a calculation result with stable uniformity.

According to a twenty third pattern model positioning method in image processing, the step of creating an edge angle bit image can set up an edge angle bit of either one of the edge angle sections that demarcate a border between the edge angle sections in a case where the edge angle is included in a predetermined edge angle bit processing width with the border between the edge angle sections for sectionalizing the edge angle set at the center. Thereby, it is possible to also give an edge angle bit to an edge angle section adjacent to the corresponding edge angle section, so as to obtain a stable search result.

According to a twenty fourth pattern model positioning method in image processing, the first reduction ratio can include unmagnification. Thereby, it is possible to create a pattern model and an edge angle bit image with respect to an unmagnified image of the image to be searched, so as to expect positioning with higher accuracy.

According to a twenty fifth pattern model positioning method in image processing, a sub-pixel position of the corresponding edge point to the reference point can be found.

According to twenty sixth pattern model positioning method in image processing, a resolution of the edge angle in the step of creating an edge angle bit image can be any of eight bits, 16 bits, 32 bits and 64 bits.

According to twenty seventh pattern model positioning method in image processing, the coarse search can be performed by uniformly allocating to edge directions the edge angle bit as the resolution of the edge angle. Thereby, it is possible to obtain a search result with more importance attached to a resolution in the edge direction than an edge polarity. Further, the same technique is usable in the case of ignoring the edge polarity.

According to a twenty eighth pattern model positioning method in image processing, a reduction ratio for performing edge detection in the step of creating an edge angle bit image can be decided based on at least either a size of the registered image or characteristic data on the pattern model. Thereby, it is possible to appropriately decide the edge detection reduction ratio. Further, a user setting is also possible.

According to twenty ninth pattern model positioning method in image processing, the edge angle of the pattern model in the step of creating an edge angle bit image can be changed in accordance with the posture thereof.

According to a thirtieth pattern model positioning method in image processing, the step of creating an edge angle bit image is capable of parallelizing edge data of the pattern model. Thereby, it is possible to perform search processing in parallel form, so as to seek further speeding up of the processing.

According to thirty first pattern model positioning method in image processing, the step of creating an edge angle bit image is capable of allocating a plurality of bits to edge angle directions. Thereby, it is possible to also weight the edge angle, so as to expect a more accurate search result.

According to a thirty second pattern model positioning method in image processing, in a case where two or more corresponding-edge-point candidates are present on the corresponding point search line, a weight value can be computed in accordance with a distance from the reference point to each corresponding edge point as weighting of the corresponding edge point, and final fine positioning is performed in accordance with the weight value. Thereby, in the case of a plurality of corresponding-edge-point candidates being present, it is possible to accurately determine in which direction the segment is to be moved based on information on a plurality of corresponding points.

According to a thirty third pattern model positioning method in image processing, upon computing the weight value with respect to each edge point in the fine positioning step, the weight value can be set to one in the case of one corresponding-edge-point candidate being present on the corresponding point search line on which the corresponding edge point is decided, and the weight value is set to "1−α(d1/d2)" (where 0<α<1) in the case of a plurality of corresponding-edge-point candidates being present on the corresponding point search line, when a distance between the reference point and a first corresponding-edge-point candidate among the corresponding-edge-point candidates is expressed as d1 and a distance between the reference point and a second corresponding-edge-point candidate among the corresponding-edge-point candidates is expressed as d2 (d1<d2). Thereby, since the number of corresponding-edge-point candidates and the distance between the corresponding-edge-point candidate and the reference point can be reflected upon fine positioning, it is possible to expect a movement in an accurate direction upon fine positioning.

According to a thirty fourth pattern model positioning method in image processing, a setting can be made such that upon creating aggregation of segments in the step of constituting a pattern model, segments which are substantially orthogonal to each other are preferentially selected out of a group of candidates of segments obtained from the image. Thereby, since cross segments are alternately preferentially selected, it is possible to accurately perform adjustment in a cross direction upon positioning of the pattern model configured of the segments.

According to a thirty fifth pattern model positioning method in image processing, upon creating aggregation of segments in the step of constituting a pattern model, a group of segment candidates obtained from the image can be sorted in order of length, to extract the longest segment, a predetermined angle range substantially orthogonal to the extracted segment is set and the longest segment among segment candidates having an angle in the angle range is extracted, and an operation of further extracting the longest segment from segment candidates included in a predetermined angle range substantially orthogonal to the extracted segment in the same manner as above is repeated until a predetermined number of segments are extracted. Thereby, since the cross segments are preferentially extracted, it is possible to accurately position. Especially when only a segment that is long but arrayed in the same direction is extracted, it is possible to accurately position in a direction of a normal to the segment, whereas it is difficult to accurately position in a direction parallel to the segment. With the above method, it is possible to expect accurate positioning in either of the X and Y directions by preferentially selecting the cross segments.

According to a thirty sixth pattern model positioning method in image processing, a setting is made such that a segment includes a line and a circular arc and the circular arc is selected with its angle ignored in extraction of a segment, and a setting is further made such that, when a circular arc segment is selected and there is a lastly selected line segment, a long segment is selected as a segment to be selected next out of segment candidates substantially orthogonal to the lastly selected line segment, and when there is no lastly selected line segment, a long segment is selected as the segment to be selected next out of arbitrary segment candidates. Thereby, as for the circular arc, preferential extraction is performed based only upon the length, resulting in making it possible to expect accurate positioning in either of the X and Y directions.

A thirty seventh image processing apparatus for compressing image data in pattern model positioning in image processing of, upon searching out of an image to be searched and positioning an object to be searched that is similar to a pre-registered image by use of a pattern model corresponding to the registered image, positioning with accuracy higher than at an initially given position, the apparatus includes: an edge angle image creating device for acquiring an edge angle image including edge angle information with respect to each pixel constituting an image; an edge angle bit image creating device for transforming the edge angle image with respect to each pixel created by the edge angle image creating device into an edge angle bit image expressed by an edge angle bit indicating an angle with a pre-defined fixed width; and an edge angle bit image reducing device for performing an OR operation on an edge angle bit of every pixel included in an OR operation region decided in accordance with a reduction ratio for reducing the edge angle bit image in order to create an edge angle bit reduced image reduced from the edge angle bit image, to create an edge angle bit reduced image made up of reduced edge angle bit data representing each OR operation region. Thereby, since the edge angle information is held even after reduction of an image, it is possible to realize speeding up of a search with a data amount reduced while holding search accuracy.

A thirty eighth image processing apparatus for positioning with accuracy higher than at an initially given position upon searching out of an image to be searched and positioning an object to be searched that is similar to a pre-registered image by use of a pattern model corresponding to the registered image, the apparatus can include: an image input device for acquiring the registered image and the image to be searched; an image reducing device for reducing the image to be searched with a predetermined reduction ratio; an edge angle image creating device for computing an edge angle image including edge angle information with respect to each pixel constituting the image on the reduction-ratio image to be searched reduced by the image reducing device; an edge angle bit image creating device for transforming each pixel of the edge angle image, created by the edge angle image creating device, into an edge angle bit image expressed by an edge angle bit indicating an angle with a pre-defined fixed width; an edge angle bit image reducing device for performing, in order to create an edge angle bit reduced image reduced from the edge angle bit image, an OR operation on an edge angle bit of every pixel included in an OR operation region decided in accordance with a reduction ratio for reducing the edge angle bit image, to create an edge angle bit reduced image made up of reduced edge angle bit data representing each OR operation region; a coarse search device for performing a pattern search on a first edge angle bit reduced image created by the edge angle bit image reducing device by using as a template a pattern model for first coarse search created with a first reduction ratio with regard to a first-reduction-ratio image to be searched reduced by the image reducing device with the first reduction ratio, to find with first accuracy a first position and posture corresponding to the pattern model for first coarse search from the whole area of the first edge angle bit reduced image, and also performing a pattern search on a second edge angle bit reduced image created by the edge angle bit image reducing device by using as a template a pattern model for second coarse search created with a second reduction ratio that is not larger than the first reduction ratio and not smaller than unmagnification with regard to a second-reduction-ratio image to be searched reduced by the image reducing device into the second reduction ratio, to find with second accuracy that is higher than the first accuracy a second position and posture corresponding to the pattern model for second coarse search from a predetermined region of the second edge angle bit reduced image where the first position and posture are set as references; and the fine positioning device for arranging a pattern model so as to be superimposed on a third-reduction-ratio image to be searched, obtained by reducing as appropriate the image to be searched into a third reduction ratio that is not smaller than unmagnification and not larger than the second reduction ratio by use of the second position and posture of the third-reduction-ratio image to be searched, to find a corresponding edge point on the third-reduction-ratio image to be searched corresponding to a contour constituting the pattern model, regarding a relation between each contour and its corresponding edge point as an evaluation value, and performing fine positioning with third accuracy that is higher than the second accuracy such that an accumulated value of the evaluation values becomes minimal or maximal. Thereby, it is possible to perform highly accurate positioning that is resistant to a noise component, using the edge angle of the image as well as the edge strength thereof. Further, changing the length of the corresponding point search line can give the advantage of facilitating to change the corresponding edge point search region.

According to a thirty ninth image processing apparatus, the edge angle image acquired by the edge angle image creating device is created with regard to each pixel constituting the edge angle image which is a pixel having an edge strength not smaller than a pre-set edge strength threshold.

A fortieth image processing program to compress image data in pattern model positioning in image processing of, upon searching out of an image to be searched and positioning an object to be searched that is similar to a pre-registered image by use of a pattern model corresponding to the registered image, positioning with accuracy higher than at an initially given position, the program is capable of causing a computer to realize: an edge angle image creating function for acquiring an edge angle image including edge angle information with respect to each pixel constituting an image; an edge angle bit image creating function for transforming the edge angle image with respect to each pixel created by the edge angle image creating device into an edge angle bit image expressed by an edge angle bit indicating an angle with a pre-defined fixed width; and an edge angle bit image reducing function for performing an OR operation on an edge angle bit of every pixel included in an OR operation region decided in accordance with a reduction ratio for reducing the edge angle bit image in order to create an edge angle bit reduced image reduced from the edge angle bit image, to create an edge angle bit reduced image made up of reduced edge angle bit data representing each OR operation region. Thereby, since edge angle information is held even after reduction of the image, it is possible to speed up a search with a data amount reduced while holding search accuracy.

A forty first image processing program to position with accuracy higher than at an initially given position upon searching out of an image to be searched and positioning an object to be searched that is similar to a pre-registered image by use of a pattern model corresponding to the registered image, the program is capable of causing a computer to realize: an image input function for acquiring the registered image and the image to be searched; an image reducing function for reducing the image to be searched with a predetermined reduction ratio; an edge angle image creating function for computing an edge angle image including edge angle information with respect to each pixel constituting the image on the reduction-ratio image to be searched reduced by the image reducing function; an edge angle bit image creating function for transforming each pixel of the edge angle image, created by the edge angle image creating function, into an edge angle bit image expressed by an edge angle bit indicating an angle with a pre-defined fixed width; an edge angle bit image reducing function for performing, in order to create an edge angle bit reduced image reduced from the edge angle bit image, an OR operation on an edge angle bit of every pixel included in an OR operation region decided in accordance with a reduction ratio for reducing the edge angle bit image, to create an edge angle bit reduced image made up of reduced edge angle bit data representing each OR operation region; a coarse search function for performing a pattern search on a first edge angle bit reduced image created by the edge angle bit image reducing function by using as a template a pattern model for first coarse search created with a first reduction ratio with regard to a first-reduction-ratio image to be searched reduced by the image reducing function with the first reduction ratio, to find with first accuracy a first position and posture corresponding to the pattern model for first coarse search from the whole area of the first edge angle bit reduced image, and also performing a pattern search on a second edge angle bit reduced image created by the edge angle bit image reducing function by using as a template a pattern model for second coarse search created with a second reduction ratio that is not larger than the first reduction ratio and not smaller than unmagnification with regard to a second-reduction-ratio image to be searched reduced by the image reducing function into the second reduction ratio, to find with second accuracy that is higher than the first accuracy a second position and posture corresponding to the pattern model for second coarse search from a predetermined region of the second edge angle bit reduced image where the first position and posture are set as references; and a fine positioning function for arranging a pattern model so as to be superimposed on a third-reduction-ratio image to be searched, obtained by reducing as appropriate the image to be searched into a third reduction ratio that is not smaller than unmagnification and not larger than the second reduction ratio by use of the second position and posture of the third-reduction-ratio image to be searched, to find a corresponding edge point on the third-reduction-ratio image to be searched corresponding to a contour constituting the pattern model, regarding a relation between each contour and its corresponding edge point as an evaluation value, and performing fine positioning with third accuracy that is higher than the second accuracy such that an accumulated value of the evaluation values becomes minimal or maximal.

Further, a forty second computer readable recording medium stores the above program. The recording medium includes magnetic disks, optical disks, magneto-optical disks, semiconductor memories, and some other medium capable of storing a program, such as a CD-ROM, a CD-R, a CD-RW, a flexible disk, a magnetic tape, an MO, a DVD-ROM, a DVD-RAM, a DVD-R, a DVD+R, a DVD-RW, a DVD+RW, Blue-ray, an HD, and a DVD (AOD). Moreover, the program includes one in the form distributed by downloading through a network line such as the Internet, other than one delivered as stored in the above recording medium. Furthermore, the recording medium includes equipment capable of recording a program, for example, general purpose equipment or dedicated equipment which is mounted in a state where the above program is executable in the form of software or firmware. Further, each processing and function included in the program may be executed by program software executable by a computer, or processing in each section may be realized by hardware such as a predetermined gate array (FPGA, ASIC) or in a mixed form of program software and a partial hardware module that realizes part of elements of hardware.

BRIEF DESCRIPTION OF THE DRAWINGS

FIG. 7 is a schematic view showing the state of creating and compressing an edge angle bit image;

FIG. 8A shows a pattern model for local search, FIG. 8B shows a pattern model for large-area search, and FIG. 8C shows a pattern model for fine positioning;

FIGS. 11A to 11D are schematic views each showing a state in which the edge angle bit changes as a result of rotating the pattern model;

FIG. 12 is a flowchart showing a procedure for creating a pattern model upon registration;

FIG. 30 is a schematic view showing an edge angle image made up of four pixels "a" to "d";

FIG. 31 is a schematic view showing edge angle sections defining edge angle bits;

FIG. 32 is a schematic view showing an edge angle bit image obtained by transforming the edge angle image of FIG. 30;

FIG. 33 is a schematic view showing an edge angle bit reduced image obtained by reducing the edge angle bit image of FIG. 32;

FIG. 34 is a schematic view for describing the state of reducing the original edge angle bit image in units of 2×2 pixels;

FIG. 35 is a schematic view for describing the state of enlarging the image after the reduction processing of FIG. 34;

FIG. 39 is a conceptual view showing the pattern model after parallel processing;

FIGS. 40A and 40B are conceptual views each showing data on registering of the pattern model;

FIG. 41 is an image view showing an example of a pattern model as a partially notched circle expressed by a circular arc segment and a line segment.

FIG. 50 is a flowchart showing a procedure for selecting a segment considered in a positioning direction;

FIG. 52A is a schematic view showing an edge angle image in which each pixel has an edge angle, and FIG. 52B is a schematic view showing edge angle sections that express edge angle bit data of the respective pixels with eight bits;

DETAILED DESCRIPTION OF THE PREFERRED EMBODIMENTS

Figure 1:
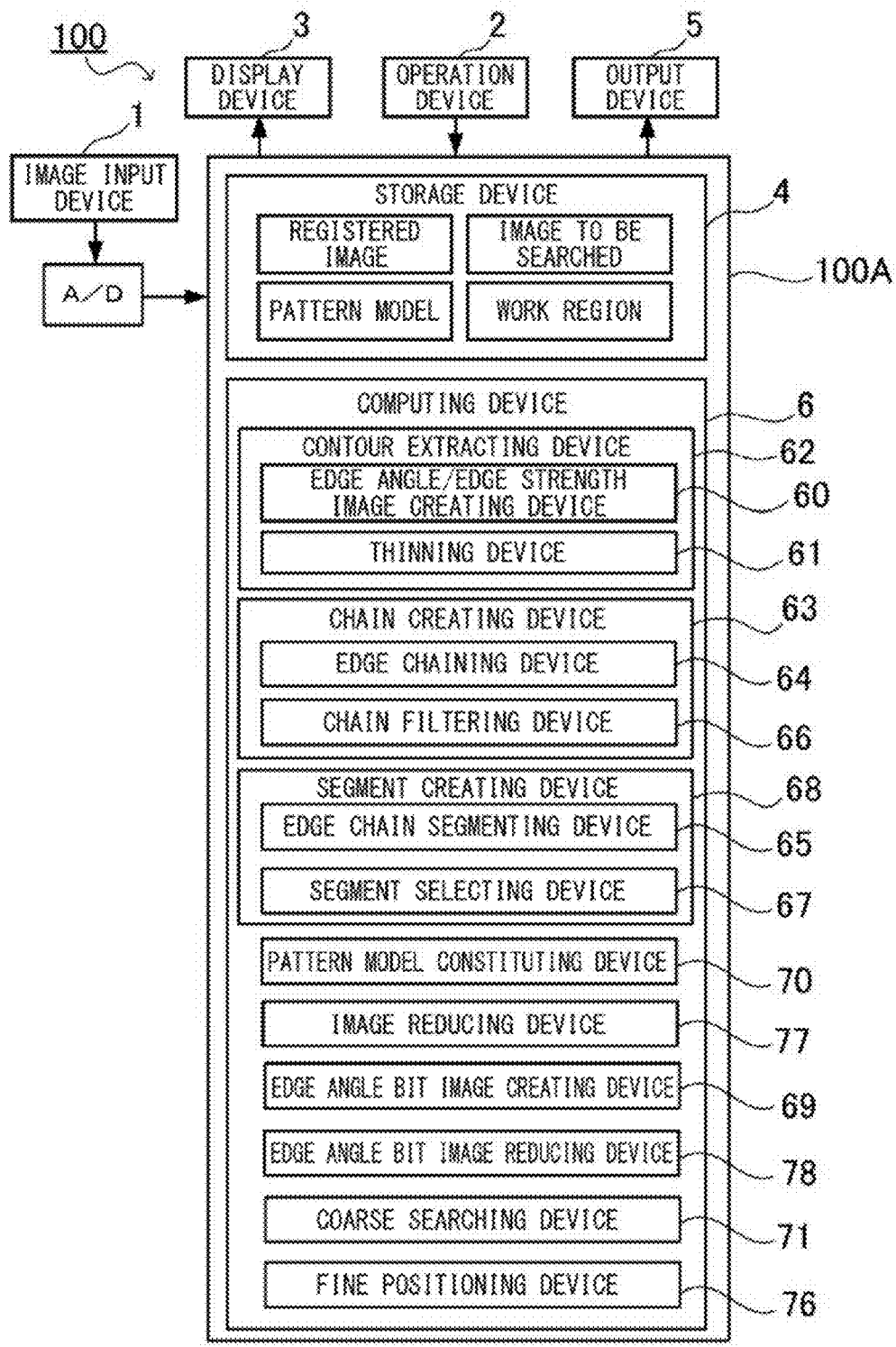
FIG. 1 is a block diagram showing an example of an image processing apparatus.

In the following, an embodiment of the present invention is described based on drawings. However, the embodiment shown below exemplifies an image data compression method, a pattern model positioning method in image processing, an image processing apparatus, an image processing program, and a computer readable recording medium for making a technical concept of the present invention concrete, and the present invention does not specify its image data compression method, pattern model positioning method in image processing, image processing apparatus, image processing program, and computer readable recording medium to the following. Further, the present specification by no means specifies a member shown in the claims to a member in the embodiment. Especially a size, a material, a shape, a relative arrangement and the like of a constitutional component described in the embodiment are not intended on restricting the range of the present invention to those but simply are explanatory examples so long as a specific description is nor particularly given. It is to be noted that there are cases where a size, a positional relation or the like of a member shown by each drawing may be emphasized for the sake of clarifying description. Moreover, in the following description, the same name or symbol indicates the same member or a homogeneous member, and a detailed description is not repeatedly provided as appropriate. Furthermore, as for each element constituting the present invention, a plurality of elements may be made up of the same member and may thus take the aspect of sharing one member, or on the contrary, a function of one member can be realized by being shared by a plurality of members.

The connection of an image processing apparatus for use in an example of the present invention with a computer, a printer, an external storage apparatus, and other peripheral equipment, which are connected to the image processing apparatus and used for operation, control, display, and other processing, are made electrically, magnetically or optically for communication by serial connection such as IEEE 1394, RS-232x, RS-422 or USB, parallel connection, or connection through a network such as 10BASE-T, 100BASE-TX or 1000BASE-T. The connection is not restricted to physical connection using a cable, but may be wireless connection through the use of electric waves such as wireless LAN like IEEE802.1x or Bluetooth (registered trademark), infrared rays, optical communications, or the like, or some other connection. Further, for the recording medium for data exchange, setting storage, and the like, a memory card, a magnetic disk, an optical disk, a magneto-optical disk, a semiconductor memory or the like can be used. It should be noted that in the present specification, the image processing apparatus is used not only in the meaning of an apparatus body for performing edge extraction, pattern matching and the like, but also in the meaning including a contour extraction system formed in combination of this apparatus body with peripheral equipment such as a computer and an external storage apparatus.

Further, in the present specification, the image data compression method, the pattern model positioning method in image processing, the image processing apparatus, the image processing program, and the computer readable recording medium are not restricted to a system itself that performs edge extraction, measurement region setting, and edge point coupling, and an apparatus and a method that operate and perform in a hardware manner processing of input/output, display, computing, communication, and other processing which are related to pickup and acquirement of a variety of images. An apparatus and a method for realizing processing in a software manner are also included in the range of the present invention. For example, an apparatus and a system, where software, a program, a plug-in, an object, a library, an applet, a compiler, a module, a macro that operates on a specific program, or the like is integrated into a general purpose circuit or computer, to allow performance of edge extraction and edge point coupling themselves or processing related thereto, also correspond to any of the image data compression method, the pattern model positioning method in image processing, the image processing apparatus, the image processing program, and the computer readable recording medium according to the present invention. Further, in the present specification, the computer includes, other than a general purpose or dedicated electronic calculator, a workstation, a terminal, a mobile type electronic apparatus, PDC, CDMA, W-CDMA, FOMA (registered trademark), GSM, IMT2000, a mobile phone such as a forth-generation mobile phone, a PHS, a PDA, a pager, a smart phone, and other electronic apparatuses. Moreover, in the present specification, the program is not restricted to one singly used, but can also be used in the mode of functioning as part of a specific computer program, software, service or the like, in the mode of functioning as called when necessary, in the mode of being provided as a service in an environment of an operating system (OS) or the like, in the mode of operating as being resident in the environment, in the mode of operating in a background, or in a position as another supporting program.

(Brief Flow of Image Processing)

Figure 2:
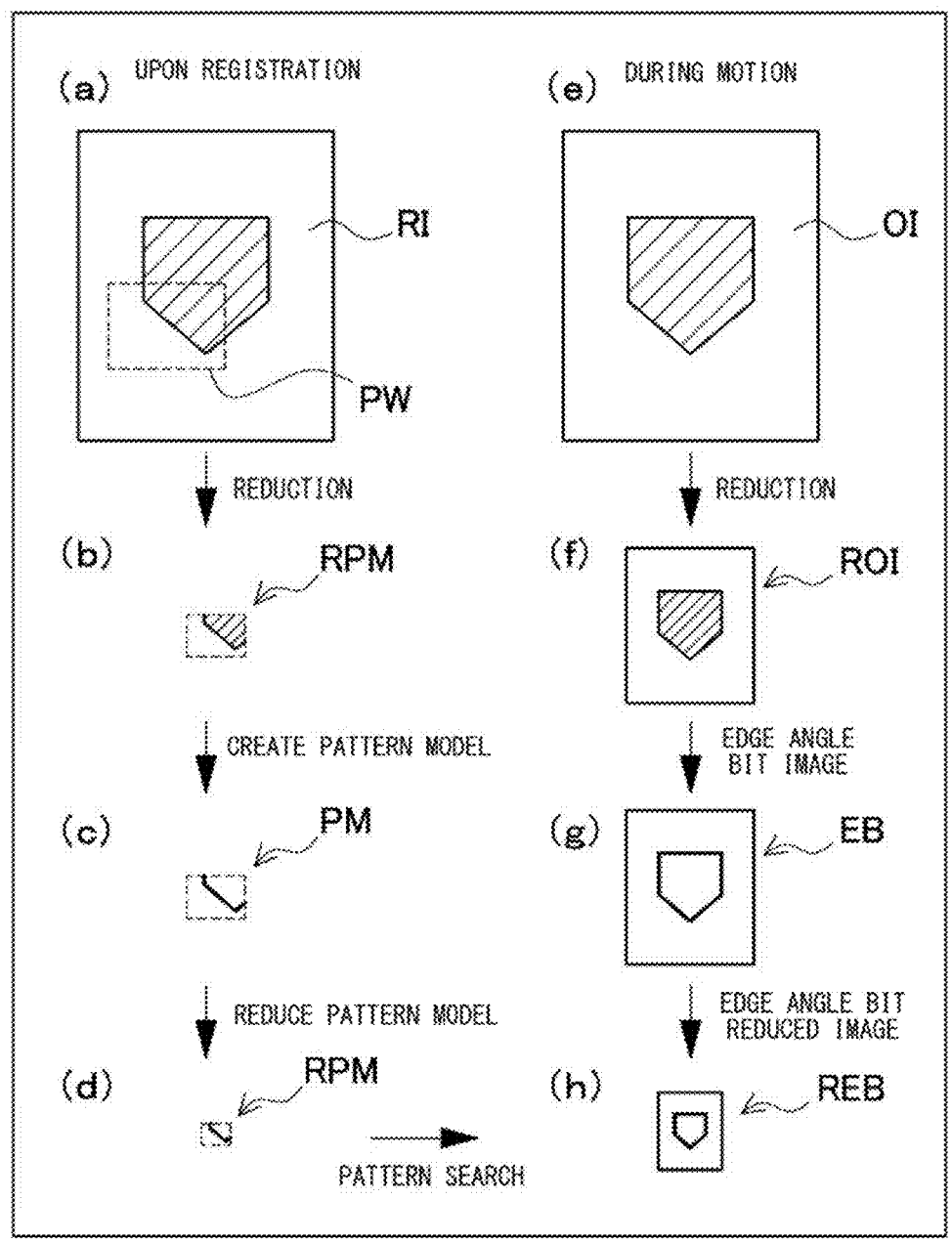
FIGS. 2A to 2H are schematic views each showing a scheme of an operation upon registration of a pattern model and during motion to perform a search by use of this pattern model.

FIG. 1 shows a block diagram of an image processing apparatus 100. As shown in FIGS. 2A to 2H, this image processing apparatus 100 previously registers an image wished to be searched and creates a pattern model from this registered image, and upon actual operation, the apparatus finds a position corresponding to the pattern model out of an image to be searched that is inputted. A scheme of an operation upon creating the pattern model is shown in a flowchart of FIG. 3. In the present embodiment, as shown in FIG. 2A, a user sets a region where a pattern model is created with respect to a registered image RI wished to be searched, namely a pattern window PW, is set by a user (Step S301 in FIG. 3). An image including a region where this pattern window PW is set is reduced as appropriate, as shown in FIG. 2B (Step S302 in the same drawing). Further, as shown in FIG. 2C, from a reduced pattern window RPM, a pattern model PM as a search pattern corresponding to the registered image RI is created (Step S303 in the same drawing). As thus described, in advance of the actual search operation, the image processing apparatus previously creates the pattern model PM corresponding to the registered image RI wished to be searched out of the image to be searched.

Further, as shown in FIG. 2D, the pattern model PM is reduced into a reduction ratio for first edge angle bit image and a reduction ratio for second edge angle bit image (described later), and used during motion (Step S304 in the same drawing). Such creation of the reduced pattern model RPM can be previously performed upon registration or can also be performed upon each operation.

Figure 4:
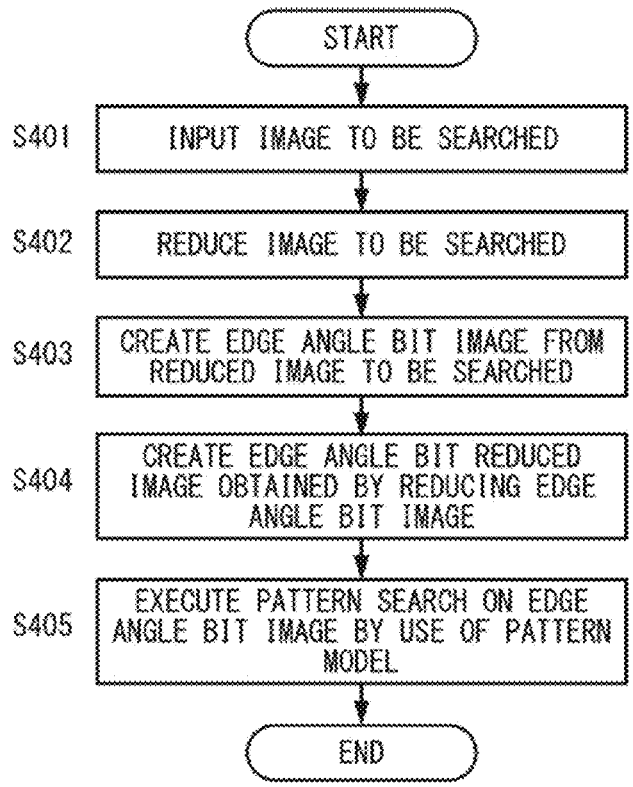
FIG. 4 is a flowchart showing a scheme of the operation during motion to actually perform a search.

Meanwhile, a scheme of an operation during motion is shown in a flowchart of FIG. 4. during motion, after an image OI to be searched is inputted in Step S401 (FIG. 2E), this image OI to be searched is reduced into a reduced image ROI to be searched as appropriate in Step S402 (FIG. 2F). Next, in Step S403, an edge angle bit image EB is created from the reduced image ROI to be searched (FIG. 2G: detailed later). Further, in Step S404, an edge angle bit reduced image REB reduced from the edge angle bit image EB is created (FIG. 2H). In Step S405, a pattern search is executed on the edge angle bit reduced image REB obtained as thus described by use of the pattern model obtained upon registration.

(Image Processing Apparatus 100)

Next, a configuration of the image processing apparatus 100 is described. The image processing apparatus 100 shown in the block diagram of FIG. 1 includes an image input device 1 for inputting an image, a display device 3 for displaying an image and a variety of data, an operation device 2 for the user to perform a variety of operations, and an output device 5 constituting an output interface for outputting a result of image processing in an image processing apparatus body 100A to the outside. The image input device 1 is made up of an image pickup device such as a CCD. An input image inputted from the image input device 1 is captured into the image processing apparatus body 100A through an A/D conversion device. Further, the display device 3 displays an original image of the input image or an edge image obtained by performing image processing on the original image by, for example, edge image processing.

(Image Processing Apparatus Body 100A)

The image processing apparatus body 100A includes a storage device 4 for storing a variety of data, and a computing device 6 for performing a variety of computing concerning image processing. Other than a registered image inputted from the image input device 1 through the A/D conversion device, the storage device 4 includes a pattern model created with this registered image regarded as a template image, an image to be searched, a work region for use in hold and storage of temporary data created upon creating the pattern model from the registered image or upon searching, and the like.

(Computing Device 6)

The computing device 6 includes a contour extracting device 62 for performing edge detection on an image to extract a contour, a chain creating device 63 for creating a chain from contour information, a segment creating device 68 for creating a segment from the chains, and other variety of devices. Examples of other devices include an edge angle bit image creating device 69, an edge angle bit image reducing device 78, an image reducing device 77 for reducing an image into a predetermined magnification, a pattern model constituting device 70 constituting a pattern model, a coarse searching device 71 performing coarse search, and a fine positioning device 76 for performing highly accurate positioning inside an image to be searched by means of a pattern model of a registered image based on edge information (detailed later). This computing device 6 registers a pattern model and performs a search in an image to be searched by use of the registered pattern model as described above. In order to perform such operations, the chain creating device 63, the segment creating device 68 and the pattern model constituting device 70 are used upon registration of the pattern model. Further, the coarse searching device 71 and the fine positioning device 76 are used upon actual operation. Moreover, the image reducing device 77, the contour extracting device 62, the chain creating device 63, and the like are used for both the operation upon registration and the operation during motion, and the edge angle bit image creating device 69 and the edge angle bit image reducing device 78 are used during motion. It is to be noted that in the present embodiment, although the chain creating device 63 is used only upon registration, it can also perform chaining on the image to be searched during motion.

(Contour Extracting Device 62)

The contour extracting device 62 includes an edge angle/edge strength image creating device 60 for creating an edge angle image and an edge strength image as edge images, and a thinning device 61. Specifically, with respect to a multi-valued image inputted by the image input device 1 (an original image of an original size or a reduced image reduced by a later-mentioned image reducing device 77), the edge angle/edge strength image creating device 60 creates edge strength images respectively in the X and Y directions (an edge strength image component in the X-direction and an edge strength image component in the Y-direction) by use of a filter known for extracting an edge point, for example, by use of a Sobel filter each in the X and Y directions, and the device also creates a two-dimensional edge angle image from these edge angle images in the X and Y directions. Further, with respect to this edge image created by the edge angle/edge strength image creating device 60, the thinning device 61 thins the edge point, for example by edge-strength non-maximal point suppressing processing.

It is to be noted that the edge strength in the present specification is a numeral value expressing a degree as to whether or not one pixel is part of an edge (darkness to brightness).

The edge strength is typically calculated from pixel values of a target pixel and nine pixels located therearound. Further, the edge angle shows a direction of an edge in one pixel, and typically calculated from edge strengths in the X and Y directions which are found by use of the foregoing Sobel filter or the like each in the X and Y directions.

(Chain Creating Device 63)

Meanwhile, the chain creating device 63 and the segment creating device 68 are used upon creating a pattern with part of a registered image regarded as a template image. The chain creating device 63 in the present example includes an edge chaining device 64 and a chain filtering device 66. Specifically, the edge chaining device 64 creates a chain by coupling a plurality of adjacent edge points among a plurality of edge points included in an edge image created by the contour extracting device 62. Further, the chain filtering device 66 performs filtering on a plurality of chain groups created by the edge chaining device 64 by means of a variety of characteristic amounts of chains.

(Segment Creating Device 68)

Further, the segment creating device 68 includes an edge chain segmenting device 65 and a segment selecting device 67. The edge chain segmenting device 65 approximates each chain having been created by the edge chaining device 64 and filtered by the chain filtering device 66, to create a segment. The segment in this case is a line and/or a circular arc appropriated by a least squares method. Further, the segment selecting device 67 performs the filtering on the segment.

Moreover, the segment selecting device 67 can also include a pattern characteristic selecting function. Namely, changing a selection criterion for a segment constituting a pattern model in accordance with characteristics of a pattern obtained from an object to be searched can realize more stable positioning. This is to be detailed later.

(Pattern Model Constituting Device 70)

The pattern model constituting device 70 is a device for creating a pattern model to be stored into the foregoing storage device. Specifically, each segment created by performing processing on a registered image by the foregoing contour extracting device 62, chain creating device 63 and segment creating device 68 perform processing on the registered image is processed by the pattern model constituting device 70. The pattern model is to be detailed later.

(Image Reducing Device 77)

Meanwhile, the image reducing device 77 is a device for reducing a registered image and an image to be searched. Its reduction ratio is automatically set by an automatic reduction ratio decision mode. Specifically, as described above, in the present embodiment, a region wished by the user to be a pattern model is set on the registered image. The reduction ratio in this case is automatically set in accordance with the region set by the user. Namely, the reduction ratio is automatically decided in accordance with a size of the pattern window PW for specifying a pattern model. For example, in the case of the pattern window PW being in rectangular shape, the reduction ratio is decided in accordance with a length of its shorter side.

It is to be noted that in the present specification, "increase a reduction ratio", "a reduction ratio is large", or "a reduction ratio is high" means increasing a reduction degree or increasing a compression ratio, and for example indicates reduction of a reduced image having a reduction ratio of one-eighth into a reduced image having a reduction ratio of one-sixteenth. On the contrary, "decrease a reduction ratio", "a reduction ratio is small", or "a reduction ratio is low" means suppressing a reduction degree and for example bringing a reduced image to the unmagnified image side, and for example indicates changing of a reduced image having a reduction ratio of one-sixteenth to a reduced image having a reduction ratio of one-eighth. Further, a "reduction ratio not smaller than unmagnification" does not mean enlarging the unmagnified image, but means an image having a reduction ratio larger than the unmagnified image, namely a reduction ratio of 1, or the unmagnified image of a reduction ratio of 1.

Moreover, other than such an automatic reduction ratio decision mode, a manual reduction ratio decision mode in which the user selects a desired reduction ratio and decides it as a reduction ratio may also be employed. In an example of a user interface shown in FIG. 5, the user is to select a reduction ratio as a reduction ratio for large-area search out of a plurality of reduction ratio, alternatives of one-second, one-fourth and one-eighth here. The reduction ratio may be specified with an arbitrary numeral value. Further, an image showing how the original image transforms by reduction of the image with a reduction ratio selected in this case may be displayed in conjunction. In such a manner, a reduction ratio for local search (medium reduction ratio) and a fine positioning reduction ratio can also be set other than the reduction ratio for large-area search (reduction ratio for large area).

Figure 10:
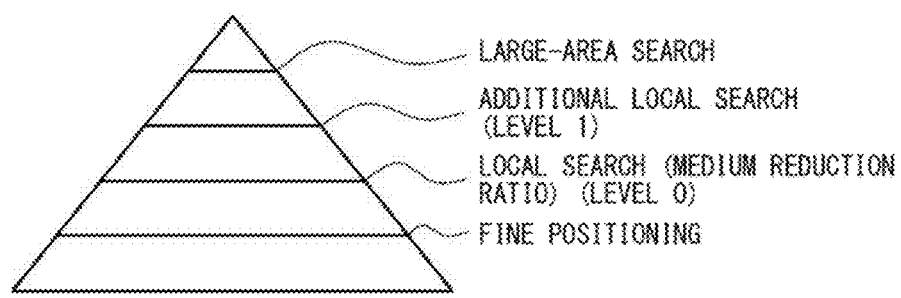
FIG. 10 is a schematic view showing a concept of the search during motion.

Further, a reduction ratio for local search can also be automatically added. Specifically, when a ratio between the reduction ratio for large-area search and the reduction ratio for local search is larger than a predetermined value, a local search (additional local search) set with an additional reduction ratio (reduction ratio for local search) between these reduction ratio for large-area search and reduction ratio for local search is automatically added (cf. FIG. 10). Further, the additional local search can be repeated a plurality of times. In such a manner, the ratio between the reduction ratio for large-area search and the reduction ratio for local search can be held within the predetermined value, to seek reduction in search speed.

The image reducing device 77 is utilized for a registered image that creates a pattern model and an image to be searched that is reduced with the same reduction ratio as a reduction ratio set in the registered image. Namely, the image to be searched is also reduced with the reduction ratio set in the registered image.

(Edge Angle Bit Image Creating Device 69)

The edge angle bit image creating device 69 creates an edge angle bit image by use of an edge angle image created by the foregoing edge angle/edge strength image creating device 60 of the computing device 6 with respect to an image to be searched and a reduced image obtained by reducing the image to be searched by the foregoing image reducing device 77. Namely, the edge angle bit image creating device 69 is used to create an edge angle bit image of an image to be searched during motion. In other words, it is not used upon registration of a pattern model.

Figure 6:
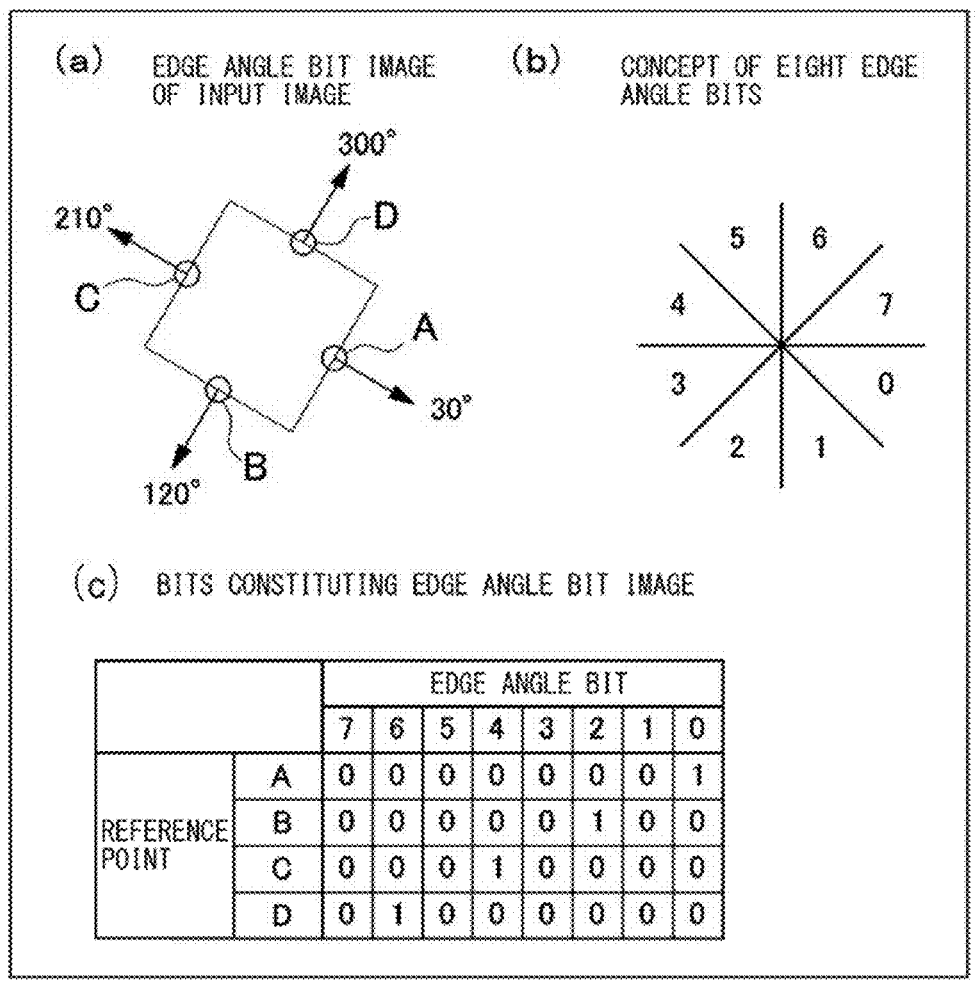
FIGS. 6A to 6C are schematic views each showing a scheme of an edge angle bit.

More specifically, as shown in FIGS. 6A to 6C, values of 0 to 360 degrees as edge angles are sectionalized in units of 45 degrees into eight bit data (FIG. 6B). It is determined whether or not edge angles obtained corresponding to the respective pixels of the edge angle image are in bit positions allocated to the respective eight sectionalized regions (FIG. 6A), and a flag of 1 is set in the determined bit position, to transform the edge angle image into an edge angle bit image (FIG. 6C). In the present embodiment, an edge angle bit image is created by the edge angle bit image creating device 69 by use of an edge angle image created by the edge angle/edge strength image creating device 60 of the computing device 6 (detailed later based on FIG. 30 and the like). However, this method is not restrictive, and for example, an edge angle bit image may be created by the edge angle bit image creating device 69 by use of an edge angle image thinned by the thinning device 61 of the computing device 6.

(Edge Angle Bit Image Reducing Device 78)

The edge angle bit image reducing device 78 is a means for reducing an edge angle bit image created by the foregoing edge angle bit image creating device 69. Thereby, an edge angle bit reduced image is obtained.

A reduction ratio of an edge angle bit reduced image in the present embodiment is decided in accordance with the size of the pattern window PW by use of which the user sets a region wished to be a pattern model on a registered image. Therefore, in the case of automatically deciding a reduction ratio in the edge angle bit image reducing device 78, the size of the pattern window PW set on the registered image is reflected. However, this method is not restrictive and, needless to say, the reduction ratio in the edge angle bit image reducing device 78 can be directly set by checking a reduction ratio of the pattern model.

This state is described by comparison with a conventional method. In the case of reducing an edge angle bit image by the conventional method, for example, in the case of the reduction ratio being one-eighth of the original image size of the image to be searched, a region of 8×8 pixels, namely an edge angle of one pixel representing 64 pixels or an edge angle of one pixel obtained by reducing an average value of 64 pixels has been regarded as a center value of the region. As opposed to this, in reduction in edge angle bit image by the edge angle bit image reducing device 78 according to the present embodiment, for example in the case of the reduction ratio being one-eighth of the original of the image to be searched, a state is held where a flag of 1 is set in a bit position of each pixel of 64 pixels in the 8×8 region, namely in a bit position corresponding to every angle possessed by 64 pixels as shown in FIG. 7 in the form of storing the bit positions as they are by an OR operation. It is thereby possible to store information on the edge angle bit image so as to be prevented from being damaged even after image reduction, and thus obtain accuracy in a search by use of a pattern model.

An OR operation region where the OR operation is performed is decided in accordance with a reduction ratio for reducing the edge angle bit image. For example, in the case of creating an edge angle bit reduced image by reducing the edge angle bit image into one-eighth, a region of 8×8 is the OR operation region. Namely, the edge angle bit image is sectionalized into 8×8 OR operation regions, and in each OR operation region, a result of performing the OR operation on edge angle bits of all pixels included in the OR operation region is reduced edge angle bit data representing each OR operation region. Aggregation of reduced edge angle bit data in each OR operation region obtained in the above manner is an edge angle bit reduced image.

Further, the OR operation means a sum operation, especially a sum operation of bits. Moreover, upon performing the OR operation of pixels, other than simply adding up bits, a lower limit value may be set on the number of pixels having edge angle bits. For example, in a case where the number of pixels each having an edge angle bit to be added does not satisfy a predetermined number-of-pixels threshold, this edge angle bit is ignored. Namely, since edge angle bits to be added of bit pixels in number extremely smaller than others, such as one to several pixels, may be noise or an error, such pixels having low credibility can be ignored. It is thereby possible to create a highly reliable edge angle bit reduced image based on only angle bits thought to be highly reliable.

(Other OR Operation: Saturated Addition)

Further, as the OR operation, an operation other than the above-mentioned sum operation can also be used. A saturated addition is described as an example. For example, in the case of performing reduction processing or enlargement processing by the OR operation, the OR operation is performed on pixel data on an edge angle bit image of n×n. Extension of this operation is to "perform saturated addition on a bit corresponding to each angle and decide a next center value from a result of the saturated addition". The saturated addition means addition processing in which an upper limit is previously set on an addition result and in the case of the a result of regular addition exceeding the upper limit, clipping is performed at the upper limit value. For example, when the upper limit is 100, the upper limit is restricted to 100 in the following manner:

10+89=99

11+89=100

12+89=100

10+100=100

Figure 52A:
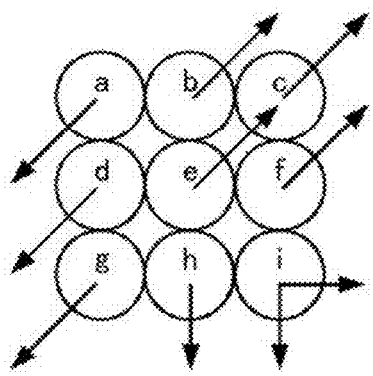
FIGS. 52A and 52B are schematic views each showing an example of reduction processing by use of saturated addition, where
Figure 52B:
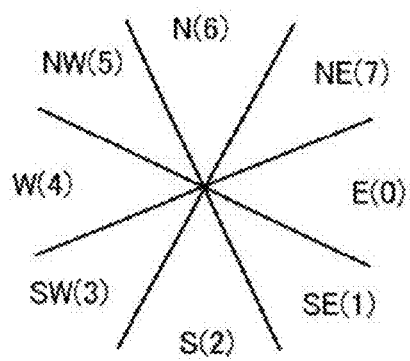

Next, a specific example of reduction processing by use of the saturated addition is described based on FIGS. 52A and 52B. FIG. 52A is a schematic view showing an edge angle image in which each pixel has an edge angle, and FIG. 52B is a schematic view showing an edge angle sections for expressing the respective pixels constituting this edge angle image with 8-bit edge angle bit data. It is to be noted that edge angle sections obtained by sectionalizing an angle for expressing edge angle directions by edge angle bits is described later by means of FIG. 31. In the example of FIG. 52B, the edge angle is sectionalized by displacement by 22.5 degrees from the horizontal or vertical direction. The edge angle sections are respectively labeled with E, SE, S, SW, W, NW, N and NE by a width of 45 degrees clockwise from exactly right, and respectively provided with labels of edge angle bits of 0, 1, 2, 3, 4, 5, 6 and 7. An edge angle bit image obtained by representing nine pixels "a" to "i" constituting the edge angle image of FIG. 52A with edge angle bits in accordance with the edge angle sections of FIG. 52B have edge angle bit data as follows:

76543210
a: 00001000
b: 10000000
c: 10000000
d: 00001000
e: 10000000
f: 10000000
g: 00001000
h: 00000100
i: 10000101

Then, in an edge angle bit image in a new reduced image, bits of "a" to "i" corresponding to the respective angles are all subjected to the saturated addition. The upper limit in the saturated addition is set to three. For example, reduced edge angle bit data "e'" of the position of "e" can be calculated by:

$e' = a+b+c+d+e+f+g+h+i$

A result of the calculation is as follows:
7766554433221100
e': 1100000011100001; binary display
e': 3 0 0 0 3 2 0 1; decimal display In the above computing result, characteristics of the saturated addition processing appear. Namely, values not smaller than three are all clipped to three. Such an addition is referred to as the saturated addition where, when a summing result is not smaller than a clipping threshold as thus described, clipping is performed at that value. This reduced edge angle bit data "e'" can be used as it is in search processing. For example, reduced edge angle bit data e" where only values not smaller than two are made one and the other values are made zero can be expressed as follows so as to be used for the search:

76543210
e": 10001100; binary display (Pattern Model X for Coarse Search Device)

Figure 8:
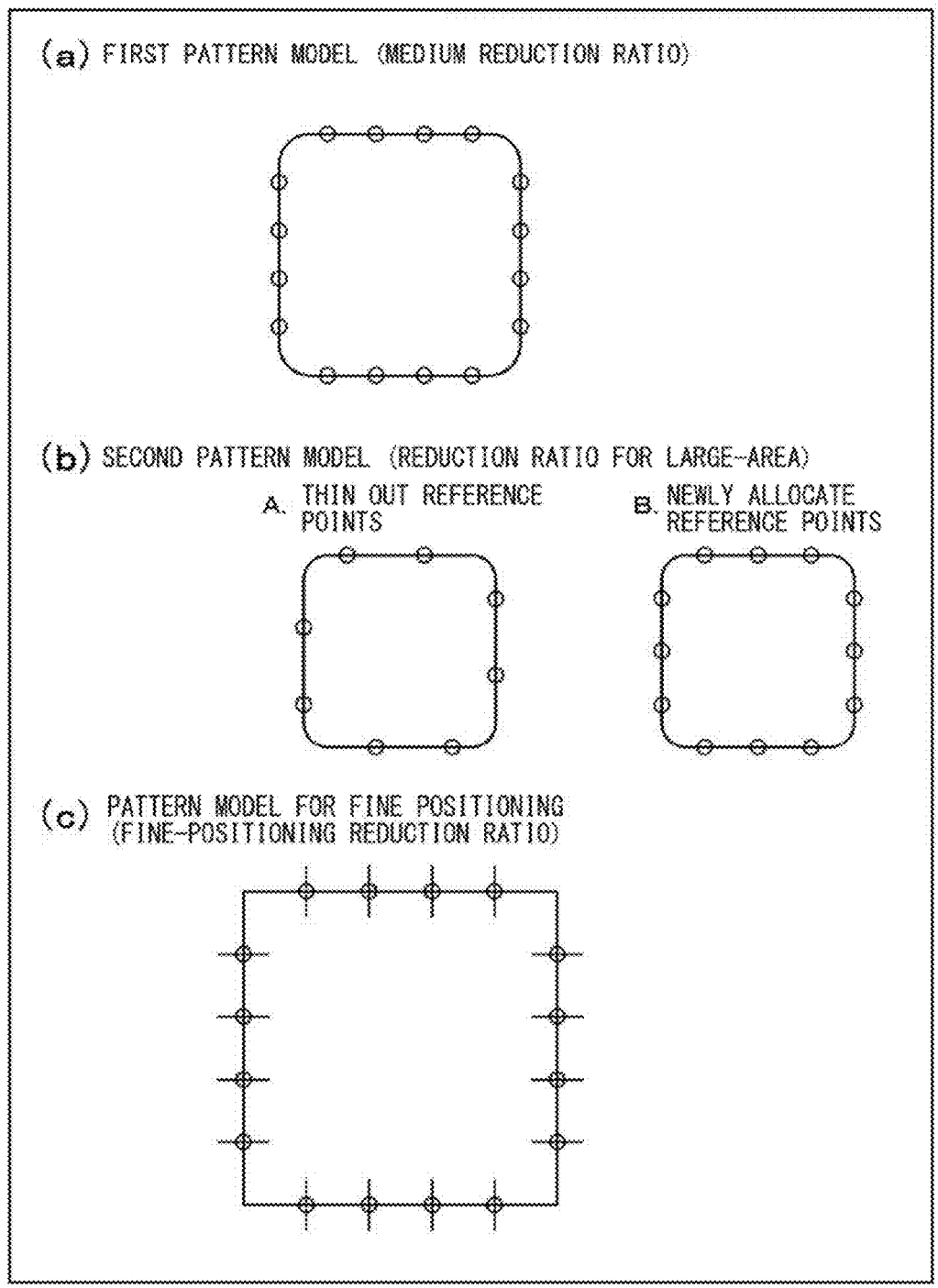
FIGS. 8A to 8C are schematic views each showing an example of each pattern model, where

The pattern model constituting device 70 creates two kinds of pattern models, which are a pattern model X for coarse search to be used in later-mentioned coarse searching device 71, and a pattern model Y for fine positioning to be used in the fine positioning (FIGS. 8A to 8C). The pattern model X for coarse search is formed such that a reference point is decided on each segment based on a pre-set condition, and an angle is set which is in a direction of a normal to the segment at each reference point and at which an orientation of an edge is set.

(Pattern Model Y for Fine Positioning)

Meanwhile, as for the pattern model Y for fine positioning, each reference point is created where, in addition to information of the foregoing pattern model X for coarse search, a parameter classified by a segment expressing each corresponding segment (e.g. parameter capable of defining a segment made up of a line or a circular arc) and a line (hereinafter referred to as "corresponding point search line), which is a kind of normal to the segment that is extended in the edge direction and further has a predetermined length, are set. The corresponding point search line is extended forward and backward in the direction of the normal with the reference point set at the center. It is to be noted that one or more reference points are preferably set on each segment. In other words, it is not necessary to include a segment with no reference point set thereon in the pattern model.

(Rough Search Device 71)

A search during motion is performed by the coarse searching device 71 and the fine positioning device 76 by use of a dedicated pattern model created upon registration. The coarse searching device 71 is a device for performing a coarse search during motion. The coarse search can be performed a plurality of times with different reduction ratios, as well as only once. In the case of performing the coarse search a plurality of times, it is preferably performed based on more detailed data approximated to the original size in such a manner that a reduction ratio of a second coarse search is suppressed lower than a reduction ratio of a first coarse search, namely a resolution is increased, or some other manner. Further, the second coarse search is preferably performed while narrowing a scanning area based on a result of the first coarse search. A scheme of searches during motion is shown in a flowchart of FIG. 9 and a schematic view of FIG. 10. In the present embodiment, as shown in Step S901 of FIG. 9, a first coarse search (large-area search), which is performed by use of a second pattern model obtained by reduction with a reduction ratio for large area, is performed on the whole area of an image to be searched. Thereafter, a second coarse search (local search) is performed on a region of a "detection candidate" obtained by the first coarse search and a region on the periphery thereof in an image to be searched having a medium reduction ratio that is lower than in the first coarse search. Further, in Step S903, fine positioning is performed by the fine positioning device 76 by use of the pattern model Y.

It should be noted that the order of creating a pattern model upon registration and the order of executing a search during motion are not necessarily matched with each other. For example, upon registration, pattern models are created sequentially from a pattern model having a lower reduction ratio (close to the original size), (first pattern model→second pattern model, etc.). This can extremely reduce conditions in which minute information is lost as the image is reduced. As opposed to this, during motion, a search is performed on pattern models in a reverse order, starting from a pattern model having a higher reduction ratio (lower resolution, higher compression ratio, etc.), (first coarse search→second coarse search). Thereby, a search can be performed efficiently by coarse-to-fine approach. This results in that the first coarse search is performed by use of the second pattern model during motion, and subsequently, the second coarse search is performed by use of the first pattern model.

(First Coarse Search)

Next, a scheme of the coarse search performed by the coarse searching device 71 is described. First, in the first coarse search, a rough search is performed on the whole area of the image to be searched by use of the registered pattern model, to extract a rough position, namely a detection candidate. On the edge angle bit reduced image of the image to be searched created by the edge angle bit image reducing device 78, scanning is performed by use of a pattern model created from the registered image having the same reduction ratio. Specifically, for example, in order to scan the whole region of an edge angle bit image obtained by reducing the original size into one-eighth, a pattern model set in a posture having a specific rotational angle is scanned from the upper left of the edge angle bit reduced image toward a lower-right direction. Thereby, a region of the detection candidate similar to the pattern model is specified in the whole region of the edge angle bit reduced image. The same scan is performed in the same manner by use of all of a plurality of different rotational postures which are individually set on the pattern model. Namely, the scan with a changed rotational angle is repeated a plurality of times. Consequently, the entire region of the detection candidates similar to the pattern model is extracted as a matching candidate with respect to the pattern model. FIGS. 11A to 11D each show a state where edge angle bits change as a result of rotation of the pattern model. In this example, a change in edge angle bit from (b) to (d) in a case (c) of rotating a pattern model (a) for large-area search clockwise by 60 degrees. Further, an evaluation value (score value), representing a similarity, of each detection candidate is computed, and candidates having a score value higher than a certain threshold are extracted. Moreover, each detection candidate has information on its position and posture, namely an XY coordinate of the pattern model, an angle θ and a score. It is noted that the score is to be detailed later.

(Second Coarse Search)

Next, the coarse searching device 71 performs the second coarse search based on a result of the first coarse search. In the second coarse search, a reduction ratio smaller than the reduction ratio of the image to be searched which was used in the foregoing first coarse search, i.e. a reduction ratio with a larger amount of information, is used. The detection candidates are narrowed down for example by use of an edge angle bit reduced image having a reduction ratio of one-fourth, and by use of a pattern model having a reduction ratio of one-eighth only in the entire peripheral region of the detection candidate similar to the pattern model which was extracted in the edge angle bit reduced image having the same reduction ratio used in the first coarse search. Since this second coarse search is a search performed using part of the edge angle bit reduced image, it can efficiently execute narrowing down of the detection candidates. As thus described, an efficient search can be made possible by performing the coarse search in a plurality of stages. Namely, after the whole area is scanned to specify a rough position in the first coarse search, the second coarse search is performed in the specified region (detection candidate, or "one likely to be the object") or in the vicinity thereof in the image having a lower reduction ratio. Further, the local search can be performed a plurality of times in accordance with reduction ratios.

(Fine Positioning Device 76)

As thus described, after a "detection candidate more likely to be the object" is found by performing the coarse search on the detection candidates and the vicinity thereof by the coarse searching device 71, fine positioning is performed by the fine positioning device 76. In the fine positioning, a search is performed in a non-reduced image of the original size or an image having a reduction ratio that is lower than the reduction ratio used in the coarse search and close to the original size. It is to be noted that, in this case, the image of the original size is also treated as an image having a reduction ratio of one. Further, the image to be searched is an edge angle bit image in the coarse search, whereas it is the original image or an image reduced therefrom in the fine positioning.

The fine positioning device 76 arranges a corresponding point search line of the pattern model Y for fine positioning so as to be superimposed on the image to be searched in the region of the detection candidate which was obtained on the image to be searched and is similar to the pattern model. Specifically, this is a search device for performing a search by use of a pattern model having the same magnification as that of the image to be searched in the region of the detection candidate, which was narrowed down by the searches by means of the edge angle bit reduced image and the pattern model having two different reduction ratios by use of the foregoing coarse searching device 71, and is similar to the pattern model.

Each of the pattern models used by the coarse searching device 71 and the fine positioning device 76 above is not an image itself as data for use in image processing (hereinafter referred to as "image data"), but data formed by one-dimensionally listing at least an X coordinate position, a Y coordinate position and an edge angle value corresponding to each edge point obtained from the image data. The "pattern model" is one made up of such data, and using the pattern model being not image data but listed data can seek speeding up of processing. Meanwhile, the image data is so-called image data, and for example, when it has data size of 640×480 bits, a value of each coordinate position of each pixel in the whole area needs to be held. As opposed to this, in the case of using the pattern model, it can be configured only of a position and an angle corresponding to an edge portion of an edge image. Hence a data amount is relatively small, to allow reduction in required amount of processing. Therefore, the use of the pattern model in place of image data enables processing at higher speed.

It is to be noted that in the present specification, the "registered image" is the original of an image wished to be searched. Meanwhile, the pattern model is the forgoing listed data suitable for a search for the same image as the registered image out of the image to be searched. In the present embodiment, the pattern model has information on the XY coordinate and the angle θ of each point constituting the pattern model. As described later, data constituting the pattern model in the fine positioning has information on a later-mentioned corresponding point search line on top of the information on the XY coordinate and the angle θ of each point.

Each member shown in FIG. 1 can also be executed by integrating a plurality of members, or dividing one function into individual members. For example, the image reducing device 77 for reducing an image can be integrated into the contour extracting device 62. Further, while each function of the computing device 6 can be processed by one CPU, LSI or the like, for example, the functions may be dispersed into a dedicated FPGA for performing pre-processing, a dedicated DSP for performing image processing, and the like. In this image processing apparatus 100, image processing is performed in an image processing portion made up of a DSP or the like, and displays of an image and a search result are processed by a CPU. As thus described, dispersing and processing each function can seek speeding up of processing. A member that executes each function can be arbitrarily made up.

The image input device 1 acquires an input image which was picked up and created by external equipment and is subject to image processing. Input image data can be acquired from external equipment by communication or I/O, and other than that, the data can also be inputted in the form of data file through a recording media. Further, the image processing apparatus itself may be made to have a function of picking up an input image. In this case, the image input device 1 functions as an image pickup device and an image creation device. When a camera using a solid-state image pickup element such as a CCD or a CMOS as the image pickup device is used and a work such as an electronic component to be subject to image processing is picked up, there is a difference in light amount of reflected light between light irradiated on the work and light irradiated on the background, and hence a difference occurs in electronic charge amount of the solid-state image pickup element between a portion corresponding to the work and a portion corresponding to the background. Namely, since a difference in luminance of the image occurs between the work and the background, this luminance difference can be detected as a contour or an edge of the work. It is to be noted that contour data on the registered image can also be inputted as CAD data on the work or the like. In such a manner, data inputted from the image input device 1 is A/D converted as appropriate, and transmitted to an image processing apparatus body portion.

The storage device 4 stores a parameter file storing a variety of data necessary for a variety of transformation and calculation for template matching and the like, and data on a pattern model of a registered image, an edge image for an image to be searched, and the like. As thus described, other than storing set contents, the storage device 4 can also be used as a region for storing data of an input image. As such a storage device 4 used can be a semiconductor element such as a DRAM or a flash memory, or a solid-state storage device such as hard disk.

The operation device 2 is an input device for operating the image processing apparatus 100. For example, in a case where the user operates a mouse 81 and a keyboard 82 to manually specify a processing region, the input device functions as a processing region specifying device 5. On the other hand, computing can also be performed by the computing device 6 based on image processing on the image processing apparatus 100 side, to automatically specify the processing region.

The input device is cable-connected or wireless-connected, or fixed, with the image processing apparatus 100. Examples of a typical input device include a variety of pointing devices such as a mouse, a keyboard, a slide pad, a track point, a tablet, a joy stick, a console, a jog dial, a digitizer, a light pen, a ten key, a touchpad, and a pointing stick. Further, in the mode of connecting a computer where a contour extracting program is installed with the image processing apparatus 100, or in the mode of regarding the computer where the contour extracting program is installed as an image processing apparatus or a contour extracting device, the above devices can also be used in operations of the image processing apparatus itself and its peripheral equipment other than an operation of the contour extracting program. Moreover, the user can directly touch the surface of the screen for making an input and an operation through use of a touch screen or a touch panel for a display itself that displays an interface screen, or the user can use a vocal input device or other existing input devices, or can also use these simultaneously. In the example of FIG. 1, the input device is made up of the pointing devices such as the mouse and the keyboard.

As the display device 3, a display such as an external liquid crystal monitor or a CRT monitor can be used. Further, a display device and an operation device can be simultaneously used by use of a display device of a type equipped with an input function such as a touch panel. The display device 3 can also be built in the image processing apparatus itself other than taking the form of being externally connected therewith.

The above configuration is exemplary, and for example, the image processing apparatus itself may include a display device, an operation device, and the like, and each member can also be simultaneously used in one member or may be integrated into the computing device 6. In the following, an example is described where a contour extracting program is installed into a general-purpose computer to execute edge coupling processing and contour extracting processing.

(Detailed Procedure for Image Processing)

This image processing apparatus performs pre-processing (enlargement, reduction, smoothing, Sobel filtering, and the like) on a registered image (also referred to as standard image, referenced image, and the like) and an image to be searched which were acquired by the image input device 1, and thereafter, extracts an edge as characteristic extraction. The apparatus then performs an edge-based pattern search during motion by use of a pattern model obtained from the registered image. In the present embodiment, as described above, a pattern model is previously registered (FIG. 3), and upon actual operation, processing is performed on the image to be searched (FIG. 4). As thus described, dispersing processing upon registration and processing during motion can speed up the processing.

The operation upon registration is described more specifically. By processing the registered image by the foregoing contour extracting device 62, a contour portion of the registered image is extracted as an edge, and an edge image for registered image is created which is expressed by aggregation of points with a width of about one pixel. The edge image for registered image is temporarily stored into an edge image memory for registered image of the storage device 4. Further, a pattern model is created from the edge image for registered image by the segment creating device 68 and the pattern model constituting device 70. The pattern model to be used in the search is held in a pattern model memory of the storage device 4, and is called as appropriate.

(Creation of Pattern Model Upon Registration)

FIG. 12 shows a flowchart of a procedure for creating the pattern model upon registration. For creation of the pattern model, as described above, a master image of an image wished to be extracted out of the image to be searched is specified as the registered image, and temporarily stored into the storage device 4. Therefore, a pattern window is set on the registered image (Step S1201). A reduction ratio is set with respect to this registered image (Step S1202), and thereafter, the image is sought to be reduced by the image reducing device 77 (Step S1203). Further, a contour is extracted from the reduced image. Specifically, edge extraction processing and chaining processing are performed (Step S1204). Further, chains are coupled to create a segment (Step S1205). In such a manner as above, edge data is sought to be segmented by the contour extracting device 62, the chain creating device 63 and the segment creating device 68 with respect to the reduced image. The pattern model is then created by the pattern model constituting device 70 (Step S1206).

As described above, in the present embodiment, two kinds of models are created as pattern model which are the pattern model X for coarse search and the pattern model Y for fine positioning. Further, a data structure of the pattern model for coarse search is made up of a coordinate position in the X and Y directions and an edge angle of each edge point with respect to an arbitrarily set original point. A data structure of the pattern model for fine positioning is made up of a coordinate position in the X and Y directions, an edge angle, and a later-mentioned corresponding point search line of each edge point with respect to the arbitrarily set original point.

(Edge Angle)

The edge angle is one showing a concentration gradient direction of the edge at the edge point. For showing the edge angle, 0 to 360 degrees are expressed by 256 levels.

(Edge Angle)

It is to be noted that, as for an edge strength of each edge point, in the present embodiment, the data is configured only of edge points having larger strength values than a pre-set strength value in the present embodiment, and hence the strength values are not held as data. However, the present invention is not restricted to this method, and for example in the case performing evaluation, weighting, or the like by later-mentioned score calculation based on similarity of edge strength values in search algorithm, data on edge strength may be held as a value of the data structure of the pattern model.

(Decision of Reduction Ratio of Image)

Figure 13A:
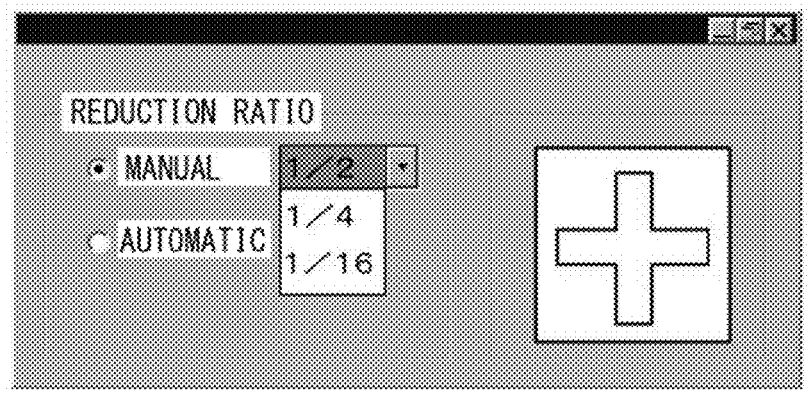
FIGS. 13A to 13C are image views each showing a user interface screen for automatically setting search accuracy and search time in accordance with priorities thereof.
Figure 13B:
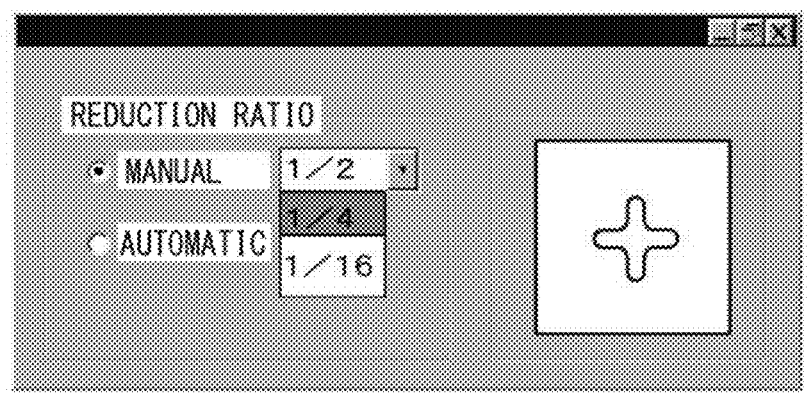
Figure 13C:
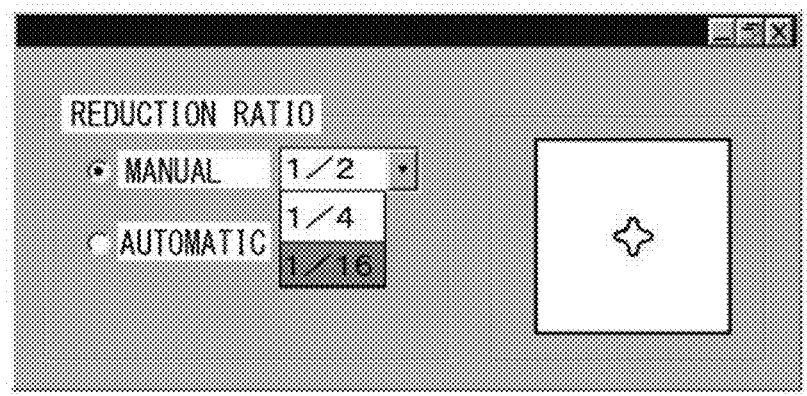

Further, upon using a reduced image upon registration, selection of its reduction ratio is highly important since the reduction ratio also exerts an effect during motion. There is set an appropriate reduction ratio with which noise can be eliminated and search time can be reduced while characteristic points in the image necessary for the search are held. For example, in the case of placing a high value on the search accuracy at the cost of the search time in the balance between the search accuracy and the search time to some degree, a reduction ratio is set to a specific reduction ratio that is made relatively low. Alternatively, an optimal reduction ratio decided by the user by trial and error can be utilized. In the present embodiment, an automatic mode for automatically deciding a reduction ratio and a manual mode for the user specifying a reduction ratio are made switchable. In the automatic mode, the reduction ratio is decided based on a length of a shorter side demarcating a rectangular region of the pattern window PW. Further, in the manual mode, when the user selects the optimal value while checking with his or her eyes how the pattern model actually transforms in accordance with the reduction ratio, it is possible to facilitate a setting operation as a sensuous operation. In an example of a user interface of FIGS. 13A to 13C, it is shown by means of an image that the reduction ratio can be selected using a drop-down list when the manual mode is selected, and how an image transforms in accordance with the selected reduction ratio. The higher the reduction ratio is made, the more significantly the image change its shape as its corner portion becomes less sharp. With reference to such a change in image, the user can select an appropriate reduction ratio in accordance with his or her application or purpose.

Otherwise, as another example, a technique for automatically deciding the balance between the search accuracy and the search time may be adopted. For example, as items on which the user puts a high value, the search accuracy, the search time, and both of them are presented as alternatives, and after a selection is made by the user, an appropriate setting is automatically performed in accordance with the selection.

(Pattern Model X for Coarse Search)

Figure 87:
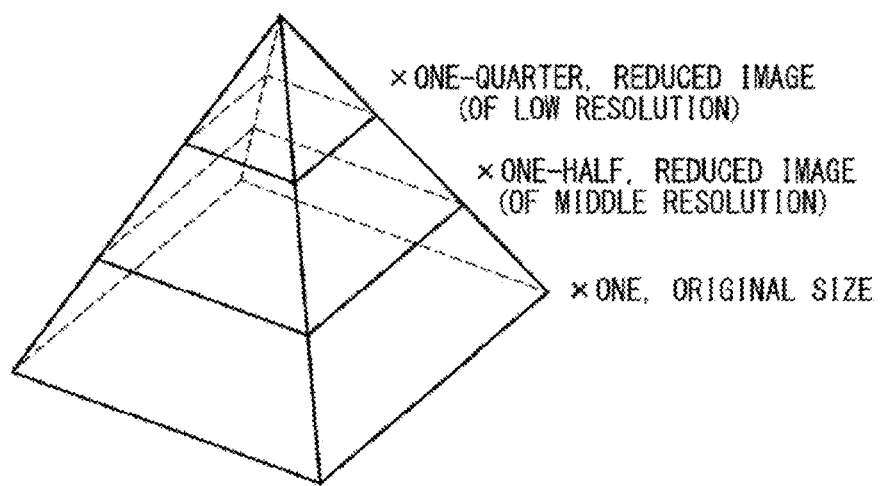
FIG. 87 is a schematic view showing a concept of a pyramid search.

The coarse search is a search for efficiently narrowing down, for a short period of time, a region where the same image as the registered image is highly likely to be present as a detection candidate out of the image to be searched, in advance of the later mentioned fine positioning. Therefore, the coarse search achieves the foregoing purpose through use of an image reduced from an original image to be searched or an original registered image. More specifically, as is the pyramid search shown in FIG. 87, the coarse search is performed by use of a reduced image obtained by reducing an image of the original size. In this coarse search, an image having a high reduction ratio and a low resolution is used. Then, the fine positioning is performed on a coarse position (detection candidate) obtained in the coarse search. In this fine positioning, an image having a lower reduction ratio and a higher resolution than those in the coarse search are used.

A procedure for creating the pattern model X for coarse search is described. In Step S1201, a master image of an image wished to be detected out of the image to be searched is temporarily stored as the registered image into the registered image memory of the storage device 4. More specifically, the user sets on the screen a position and a size of a portion required as a registered image with respect to an image captured from the image pickup device and displayed in the display device by use of the pattern window PW in rectangular shape as shown in FIGS. 2A to 2H.

Next, a reduction ratio upon reducing the image by the image reducing device 77 is decided in this registered image (Step S1202). In the present embodiment, a reduction ratio for large area of the pattern model described later is decided in accordance with the size of this pattern window PW, namely the number of pixels included in the rectangle.

That is, in the case of the number of pixels as the registered image being relatively large, the reduction ratio is set rather high since a loss of characteristic points inside the image is small even with the reduction ratio set high. On the other hand, in the case of the number of pixels as the registered image being relatively small, the reduction ratio is set rather low since the characteristic points inside the image is more likely to be lost. It is preferable to set, as the optimal reduction ratio, a reduction ratio to such a degree that reduction leads to removal of noise inside the image, but does not lead to loss of the characteristic points in the image.

As another technique for deciding a reduction ratio, for example, the registered image is shifted in the X and Y directions by a predetermined amount with respect to the same registered image. When the autocorrelation modestly changes, the image can be determined as having a characteristic that a correlation value is not apt to change so long as a certain degree of matching is realized, and hence the reduction ratio is set high. On the other hand, when the autocorrelation drastically changes, the image can be determined as having a characteristic that the correlation value is apt to change, and hence the reduction ratio is held low. In such a manner, the reduction ratio can also be decided based on the autocorrelation.

Based on the reduction ratio decided in such a manner as above, the registered image of the original size is reduced by the image reducing device 77 (Step S1203). Specifically, in the image reducing device 77, reduction in image is executed not with a final reduction ratio decided based on the size of the pattern window PW, but with the medium reduction ratio positioned between the original size of the image and the reduction ratio for large area. The edge is further sought to be segmented by the contour extracting device 62, the chain creating device 63 and the segment creating device 68 with respect to the image having the medium reduction ratio by the image reducing device 77 (Step S1204, Step S1205). It is to be noted that the medium reduction ratio corresponds to the reduction ratio in the second coarse search.

Reduction in image of the original size is followed by edge-data formation and segmentation of the image because performing the processing in this order can reduce noise while storing characteristic points held in the original image as compared with the reversal order in which the edge-data formation and segmentation of the image of the original size is followed by reduction in the obtained image. Further, this method is also in line with the purpose of the coarse search to extract the region of the detection candidate similar to the pattern model. Therefore, the medium reduction ratio can be set in a manual setting where the user manually decides the ratio while looking at the segment so that noise can be reduced to some degree while characteristic points in the image of the original size are held. Alternatively, the medium reduction ratio can be set in an automatic setting where the ratio is automatically set in accordance with the size of the pattern window PW.

(Creation of First Pattern Model)

Next, in Step S1206, the pattern model constituting device 70 creates the first pattern model with the foregoing medium reduction ratio by use of the data segmented by the segment creating device 68. This first pattern model is used for the local search among the coarse search (Step S902 of FIG. 9). FIGS. 8A to 8C each show an example of each pattern. In the first pattern model, as shown in FIG. 8A, a reference point is decided on each segment present inside edge image data based on a pre-determined condition, and an edge model point is defined at which an edge angle is set in the direction of the normal to the segment and in the orientation of the edge with respect to each reference point.

(Creation of Second Pattern Model)

Further, the pattern model constituting device 70 creates a second pattern model with the foregoing reduction ratio for large area by use of the data segmented by the segment creating device 68 (FIG. 8B). In this second pattern model for coarse search, as in the same manner as the first pattern model, a reference point is decided on each segment present inside edge image data based on a pre-determined condition, and an edge angle is set in the direction of the normal to the segment and in the orientation of the edge with respect to each reference point. These pattern models may not be created individually in accordance with reduction ratios, but it is possible that only one pattern model is created and then used by being enlarged or reduction ratio in accordance with a reduction ratio of an image to be searched during motion.

A difference between the first pattern model and the second pattern model is that in a case where the reference points set on each segment are present in a plurality of numbers, as shown in FIGS. 8A and 8B, a distance between the reference points is long in the second pattern model as compared with in the first pattern model. This is attributed to a difference in reduction ratio between the two pattern models. A degree of the difference in distance between the reference points is controlled by a difference between the medium reduction ratio and the reduction ratio for large area.

Figure 9:
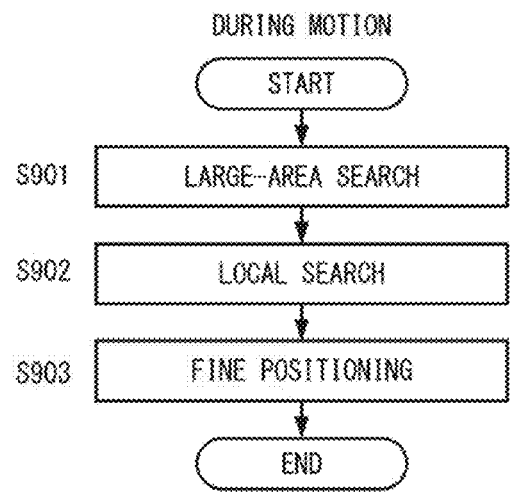
FIG. 9 is a flowchart showing a scheme of a procedure for a search during motion.

As shown in FIG. 9, the specific coarse search is made up of a "large-area search" (Step S901) carried out on the whole range of the image to be searched by use of the second pattern model having the reduction ratio for large area, and a "local search" (Step S902) carried out only on the candidate region of the detection candidate, extracted by this "large-area search", by use of the first pattern model having the medium reduction ratio.

In the description of the present embodiment, in the coarse search, one "large-area search" by use of one pattern model having the reduction ratio for large area and one "local search" by use of one pattern model having the medium reduction ratio are performed. Specifically, in the case of the following medium reduction ratio with respect to the original size of the image, the reduction ratio for large area is set as follows:

(1) in the case of not higher than $1/\sqrt{2}$ times, the reduction ratio for large area is set to one-second of the medium reduction ratio;
(2) in the case of $1/\sqrt{2}$ to ¼ times, the reduction ratio for large area is set to one-third of the medium reduction ratio; and
(3) in the case of not lower than one-fourth, the reduction ratio for large area is set to one-fourth of the medium reduction ratio.

As thus described, the reduction ratio for large area is decided in accordance with the medium reduction ratio, thereby striking the balance between search efficiency and storage of characteristic points from the original image.

The local search can be performed a plurality of times. In the case of the medium reduction ratio being significantly high with respect to the original size, for example in the case of the medium reduction ratio being set to one-fourth of the original size of the image as (3) above, the medium reduction ratio becomes one-sixteenth of the original size of the image. In this case, since the ratio between the reduction ratio for large area and the medium reduction ratio is as large as four times, it might take too long for the "local search" to be performed on the candidate region of the detection candidate extracted by use of the second pattern model having the reduction ratio for large area and the periphery thereof.

Therefore, in the present embodiment, when the ratio between the medium reduction ratio and the reduction ratio for large area is larger than twice, an additional medium reduction ratio is set so as to add one or more searches such that the ratio between adjacent reduction ratios becomes not larger than twice. Namely, by performing two or more local searches, reduction in time required for one local search is sought. Such automatic addition of the medium reduction ratio (reduction ratio for local search) can be set for example by making a checkbox for an option to "automatically add reduction ratio for local search" in the user interface screen shown in FIG. 5.

As described above, a pattern model has a data structure made up of a coordinate position in the X and Y directions and an edge angle of each edge point with respect to an arbitrarily set original point. Therefore, when the additional medium reduction ratio is set, a pattern model corresponding to the additional medium reduction ratio is created from a segment as in the cases of the foregoing first pattern model and the second pattern model. The pattern model having the additional medium reduction ratio differs from the first pattern model as well as the second pattern model in that, when reference points set on each segment are present in a plurality of numbers, the distance between the reference points is long as compared with in the first pattern model, and is short as compared with in the second pattern model. Since the pattern model itself is made up of data on coordinate positions and the like, even when the pattern model is reduced, a defect of information due to the reduction can be made extremely small as compared with the defect of information due to reduction in image data.

(Large-Area Search)

The operation in the search during motion is also described for the sake of convenience of description. As shown in Step S901 of FIG. 9, by execution of the "large-area search" by use of the pattern model having the reduction ratio for large area, the candidate region of the detection candidate is extracted. Then, the "local search" is executed on the extracted candidate region of the detection candidate by use of the second pattern model having the second highest ratio only to the reduction ratio for large area. Thereby, based on a result of the search, the candidate region of the detection candidate with higher accuracy is narrowed down. Subsequently, the "local search" is executed on the narrowed-down candidate region of the detection candidate by use of a pattern model having a set medium reduction ratio in decreasing order of reduction ratio, to repeat the step of narrowing down the candidate region of the detection candidate.

(Fine-Positioning Reduction Ratio)
(Manual Reduction Ratio Decision Mode)

Figure 5:
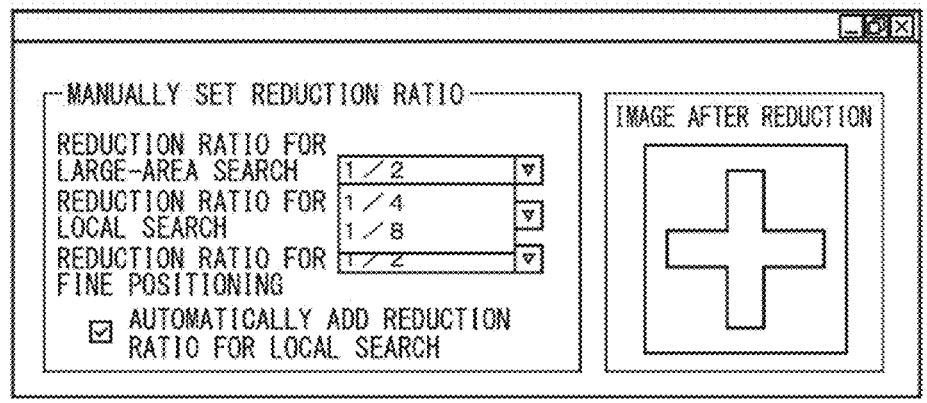
FIG. 5 is an image view showing a user interface screen for setting a reduction ratio in a manual reduction ratio decision mode.

Further, as described above, in the case of the manual reduction ratio decision mode in which the user can select the reduction ratio by use of the user interface of FIG. 5, the user can select one medium reduction ratio, one reduction ratio for large area, and a fine-positioning reduction ratio that is used upon using the fine positioning device 76. However, such a setting may be made also in this case that, when the ratio between the selected medium reduction ratio and the reduction ratio for large area is larger than twice, between these reduction ratio, a further medium reduction ratio based on the foregoing condition is automatically created. Further, as for the fine positioning reduction ratio upon using the fine positioning device 76, when the user is to select a candidate of the reduction ratio, a value to be selected is restricted to be the lowest value among reduction ratios set for the coarse search or a value of a reduction ratio further lower than this (including the original size of the image). Thereby, a condition can be avoided in which the fine positioning is erroneously performed using coarser data with higher reduction ratio than the pre-stage coarse search.

(Pattern Model for Fine Positioning)

As shown in Step S903 of FIG. 9, the fine positioning search is to perform fine positioning by use of a pattern model having a final medium reduction ratio lastly used in the "local search" or a reduction ratio lower than this (including the original size of the image) on the candidate region of one or a plurality of detection candidates. The reduction ratio of the pattern model for use in the fine positioning is preferably an unmagnified image, namely the original image of the original size.

(Sharpness of Edge)

As described above, in the fine positioning, the image to be searched of the original size is not necessarily used, but an image reduced with a reduction ratio (fine-positioning reduction ratio) in the range not exceeding the final medium reduction ratio lastly used in the pre-stage local search can also be used. Thereby, especially even when the image to be searched is blurred, a preferred search result can be expected.

For example, it can be regarded that the sharper the waveform of luminance data of the edge image of the original size, the higher the sharpness, and on the contrary, the gentler the waveform, the more blurred the image. Therefore, when the sharpness of the edge portion is lower than a pre-set value, namely when the edge is dispersed in its width direction by a width not smaller than a predetermined width and the image is thus blurred, the reduction ratio is set to an appropriate fine-positioning reduction ratio and the image is reduced into this reduction ratio, so that sharpness of this image can be reduced to increase the sharpness of the edge, and hence stable positioning accuracy can be obtained.

Figure 53:
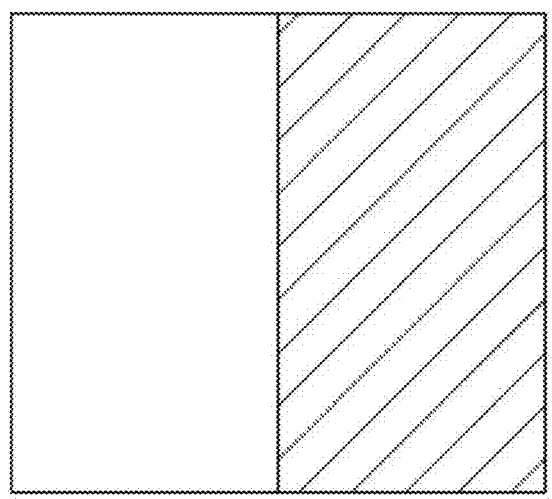
FIG. 53 is an image view showing an example of a binary image.
Figure 54:
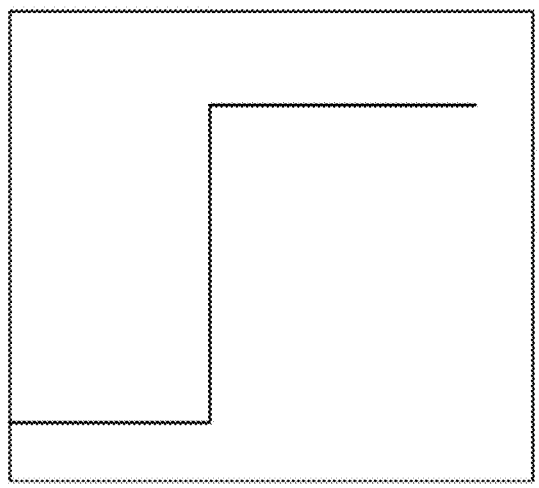
FIG. 54 is a graph showing a pixel value of FIG. 53.
Figure 55:
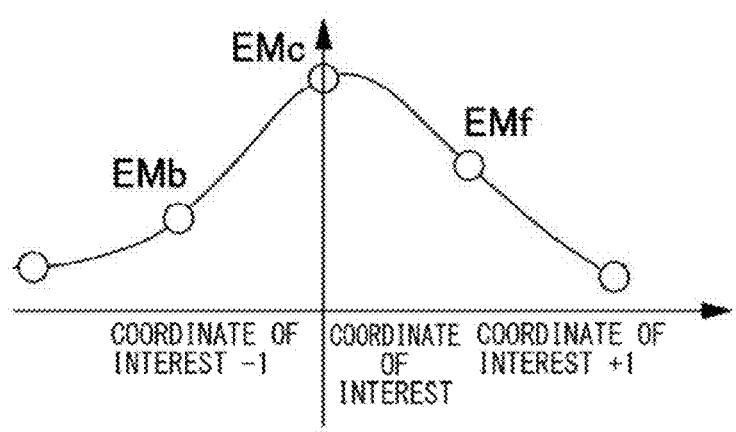
FIG. 55 is a graph showing a change in strength of an edge of an image having high sharpness.
Figure 56:
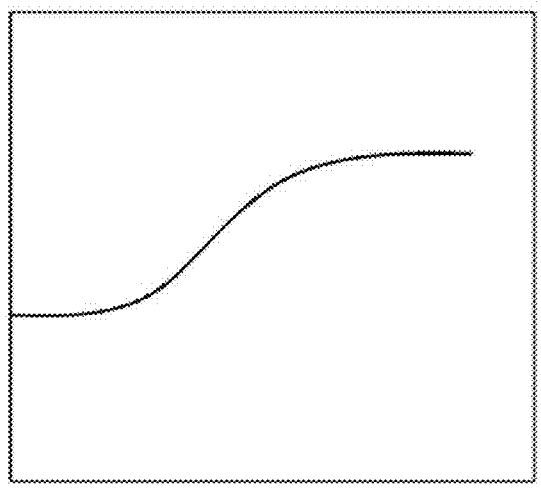
FIG. 56 is a graph showing a pixel value of an unclear image.
Figure 57:
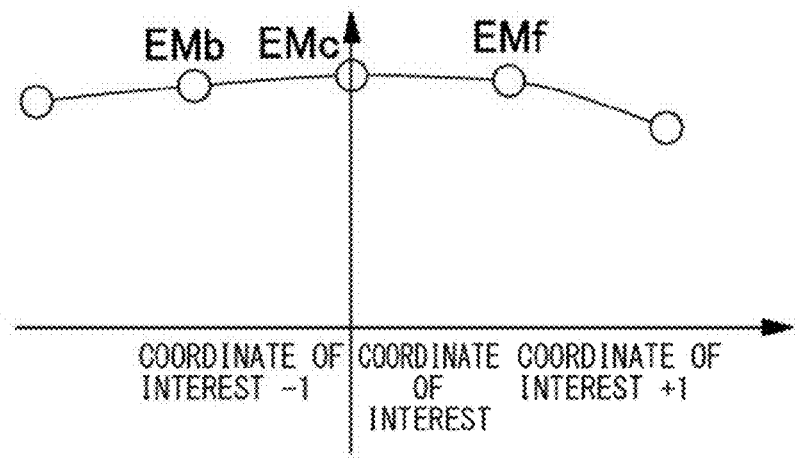
FIG. 57 is a graph showing a change in strength of an edge of an image having low sharpness.

For example, in the case of a binary image where pixels change sharply as shown in FIG. 53, a contour, namely an edge, of this image is a so-called step edge where its pixel concentration, namely pixel value, changes stepwise as shown in FIG. 54. Therefore, as shown in FIG. 55, a border of a change in strength of the edge tends to appear sharply, and accurate positioning can be expected. On the other hand, when the binary image is unclear, the border portion changes gently as shown in FIG. 56, resulting in that the change in strength of the edge becomes a poorly waved curve as shown in FIG. 57. There has thus been a problem in that even a slight fluctuation in peripheral environment such as a change in illumination or light amount exerts an effect on the edge detection accuracy, thereby preventing stable edge detection and lowering reliability of image processing such as image recognition. Accordingly, in the present embodiment, the image is reduced into the appropriate reduction ratio, to improve the edge sharpness.

(Decision of Sub-Pixel Coordinate of Edge)

Specifically, in the fine positioning by use of edge information, highly accurate positioning is performed based on the pattern model created on the basis of positional information on the edge extracted from the registered image and positioning information on the edge extracted from the image to be searched. Therefore, the positional information on the edge is extremely important.

Figure 58:
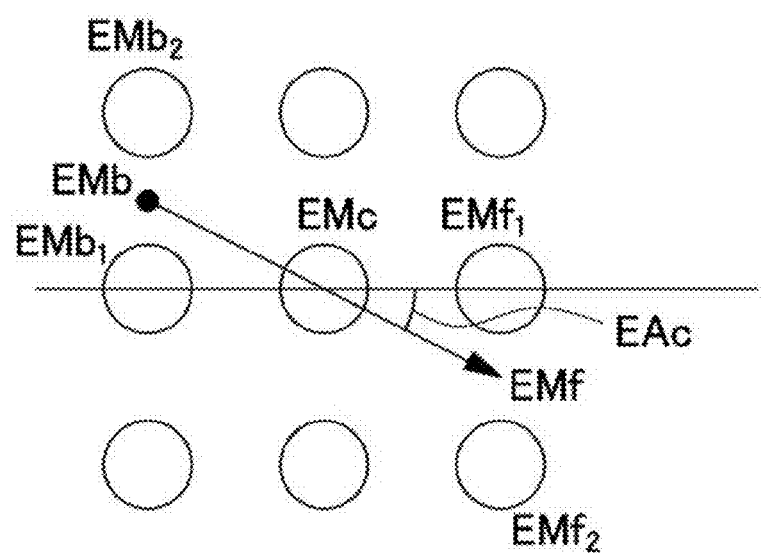
FIG. 58 is a schematic view showing a method for calculating a sub-pixel coordinate according to Japanese Unexamined Patent Publication No. H07-128017.

Conventionally, as a technique for deciding a sub-pixel position of the edge, techniques of Japanese Unexamined Patent Publication No. H07-128017, U.S. Pat. No. 6,408,109B1, and the like are known. In these methods, a sub-pixel coordinate is found by means of quadric interpolation, using a total of three data: an edge strength of a target pixel and edge strengths of two pixels positioned therearound. FIG. 58 shows a scheme of a method for calculating a sub-pixel coordinate according to Japanese Unexamined Patent Publication No. H07-128017. In this drawing, EMc (Edge Magnitude center) is an edge strength value of a target edge point as an edge point left after non-maximal point suppressing processing (nonmaxsupress) for thinning the edge. Further, EMf (Edge Magnitude forward) is an estimated edge strength value indicated by an arrow in an orientation of an edge angle of the target edge point. Moreover, EMb (Edge Magnitude backward) is an estimated edge strength value indicated by a circle in the orientation of the edge angle of the target edge point. Furthermore, a subscript of 1 in EMf1, EMb1 is given to a characteristic amount of an edge point in the cross direction, and a subscript of 2 in EMf2, EMb2 is given to a characteristic amount of an edge point in the diagonal direction. In the following example considered is an angle EAc, formed by the edge angle with the horizontal direction, <45 degrees. Other angles can be found by considering symmetry. The following expressions are established.

$EMf=EMf1*(1-\tan EAc)+EMf2*\tan EAc$ $EMb=EMb1*(1-\tan EAc)+EMb2*\tan EAc$

Using three edge strength data of EMc, EMf and EMb in the above expressions, an offset amount of the sub-pixel position can be calculated by the following expression:

$x=(EMf-EMb)/(2(2EMc-EMf-EMb))$ $y=x*\tan\theta$

As thus described, the sub-pixel position can be computed. Next, FIGS. 55 and 57 show a state of an edge strength in focus and a state of an edge strength in an unclear image. As apparent from FIG. 55, a peak of the edge strength that in focus to some degree is sharp and the edge position can be clearly decided. On the other hand, in the case of the unclear and blurred image as shown in FIG. 57, the vicinity of the maximum comes into quite a flat state, and an error of edge strengths has a large effect on the sub-pixel coordinate. In order to evaluate that effect, the case of EMf having an error of one gradation in EMf=EMb is considered. The relation between the error of the edge angle and the sub-pixel position is shown in the following expression:

$$x' = \frac{f_d(1) - f_d(-1)}{2(2f_d(0) - f_d(1) - f_d(-1))} \qquad \text{[Expression 1]}$$

$$y = \frac{x - a}{2(2c - x - a)} \qquad \text{[Expression 2]}$$

In the above function, a state around "x=a+1" is checked by means of the following expressions:

$$\delta y = \frac{a - a}{2(2c - a - a)} - \frac{a + 1 - a}{2(2c - a - 1 - a)} \qquad \text{[Expression 3]}$$

$$\delta y = \frac{0}{2(2c - 2a)} - \frac{1}{2(2c - 2a - 1)} \qquad \text{[Expression 4]}$$

In the above expression, when "X=c−a", $$\delta y = -\frac{1}{2(2X - 1)} \qquad \text{[Expression 5]}$$

Figure 59:
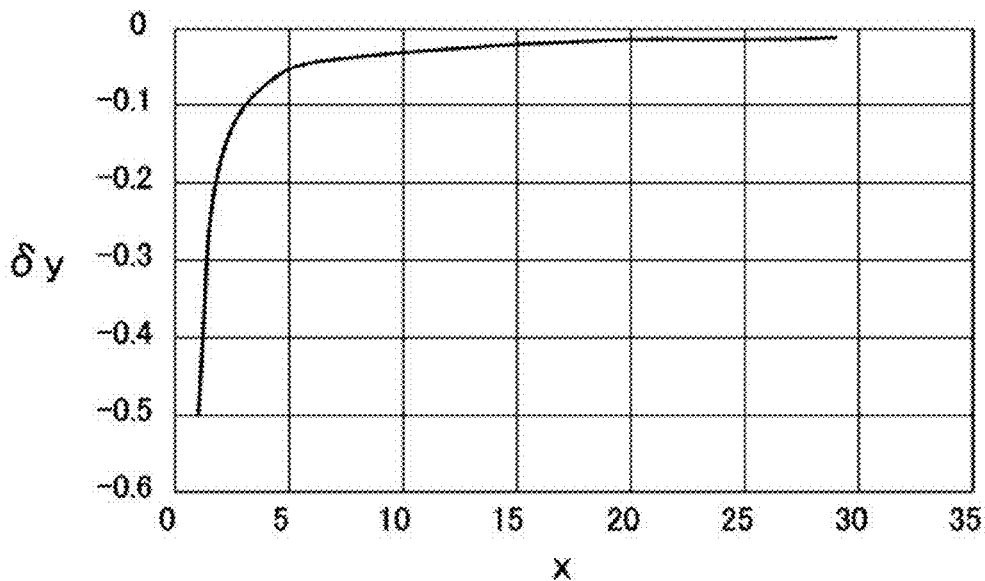
FIG. 59 is a graph showing the relation between the edge strength error and the sub-pixel position.

When this is expressed by a graph, one as in FIG. 59 is obtained. As shown in this drawing, it is found that, as the edge strength is getting flat in X→0, namely, c→a, an effect exerted by the error of the edge strength on the error of the edge position becomes larger. The same tendency can be seen in EMf≠EMb. Therefore, in the present embodiment, the sharpness of the edge point is calculated, and using this value, an edge data reduction ratio for performing calculation of the sub-pixel position of the edge is calculated. Further, using image data reduced into the image data reduction ratio, the edge extraction is performed. As thus described, reducing the image data can transform a gentle waveform as in FIG. 57 into a sharp waveform as in FIG. 55, to stabilize an edge position so that the positioning accuracy can be improved.

Figure 60:
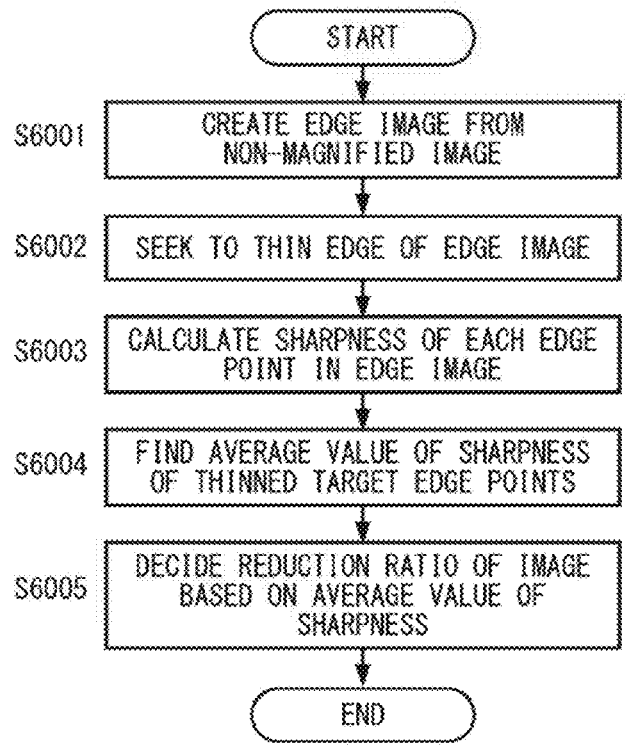
FIG. 60 is a flowchart showing a procedure for deciding an image data reduction ratio based on sharpness of edge points.

A procedure for deciding the image data reduction ratio based on the sharpness of the edge point is described based on a flowchart of FIG. 60. First, in Step S6001, an edge image is created from the unmagnified image. Next, the edge of the edge image is sought to be thinned in Step S6002 while the sharpness of each edge point in the edge image is computed in Step S6003. The edge thinning processing is performed for the non-maximal point suppressing processing in advance of the edge coupling processing. Further, in Step S6004, an average value of the sharpness of the thinned target edge points is computed. Then, in Step S6005, the image data reduction ratio is decided based on this average of the sharpness. The image data reduction ratio is decided such that the positional accuracy of the edge points is held not lower than predetermined accuracy.

(Edge Model Function)

Next, an edge model function is considered. Many of the extracted edges are thought to be stepwise edges, and are assumed to be expressible by an edge model function shown below. "σs" of this edge model function is the sharpness of the edge point. An ideal form of the edge in this case is expressed as follows:

$$\text{edge}(x) = \Phi\left(\frac{x-d}{\sigma_s}\right) \qquad [\text{Expression 6}]$$

$$\Phi(x) = \frac{1}{\sqrt{2\pi}} \int_{-\infty}^{x} e^{-\frac{z^2}{2}} dz \qquad [\text{Expression 7}]$$

Figure 61:
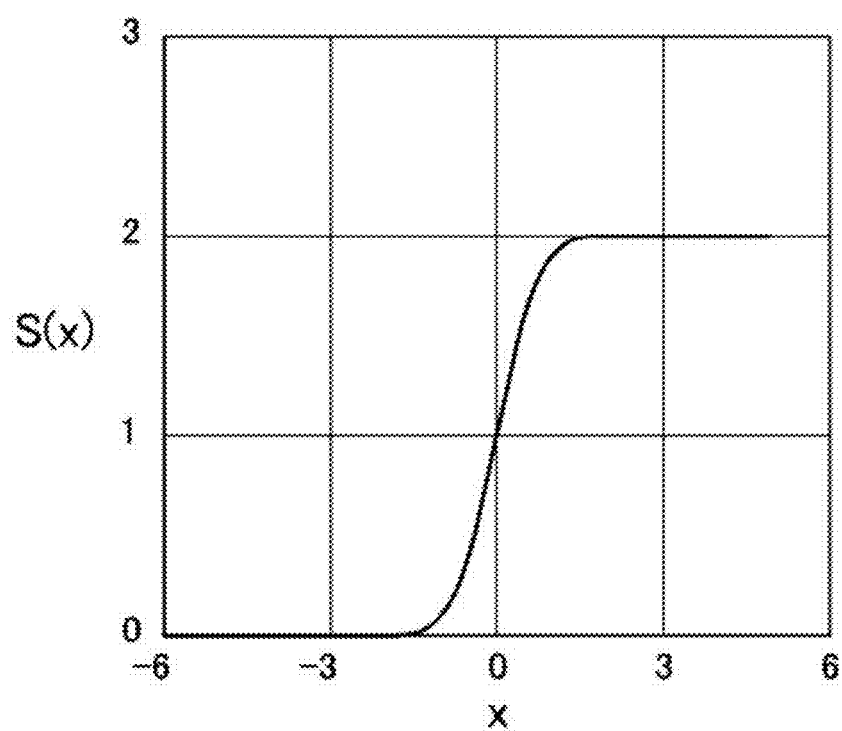
FIG. 61 is a graph showing an edge model function.

FIG. 61 shows a graph of the above function. The ideal shape (profile) of the edge shown in this drawing is plotted by the following expression (in the case of I=2, l=0, and σs=0.6 along the X axis):

$$S(x; \theta) = I\Phi\left(\frac{x-l}{\sigma_s}\right) \qquad [\text{Expression 8}]$$

(Procedure for Pattern Search Applied with Image Data Reduction Ratio)

Figure 62:
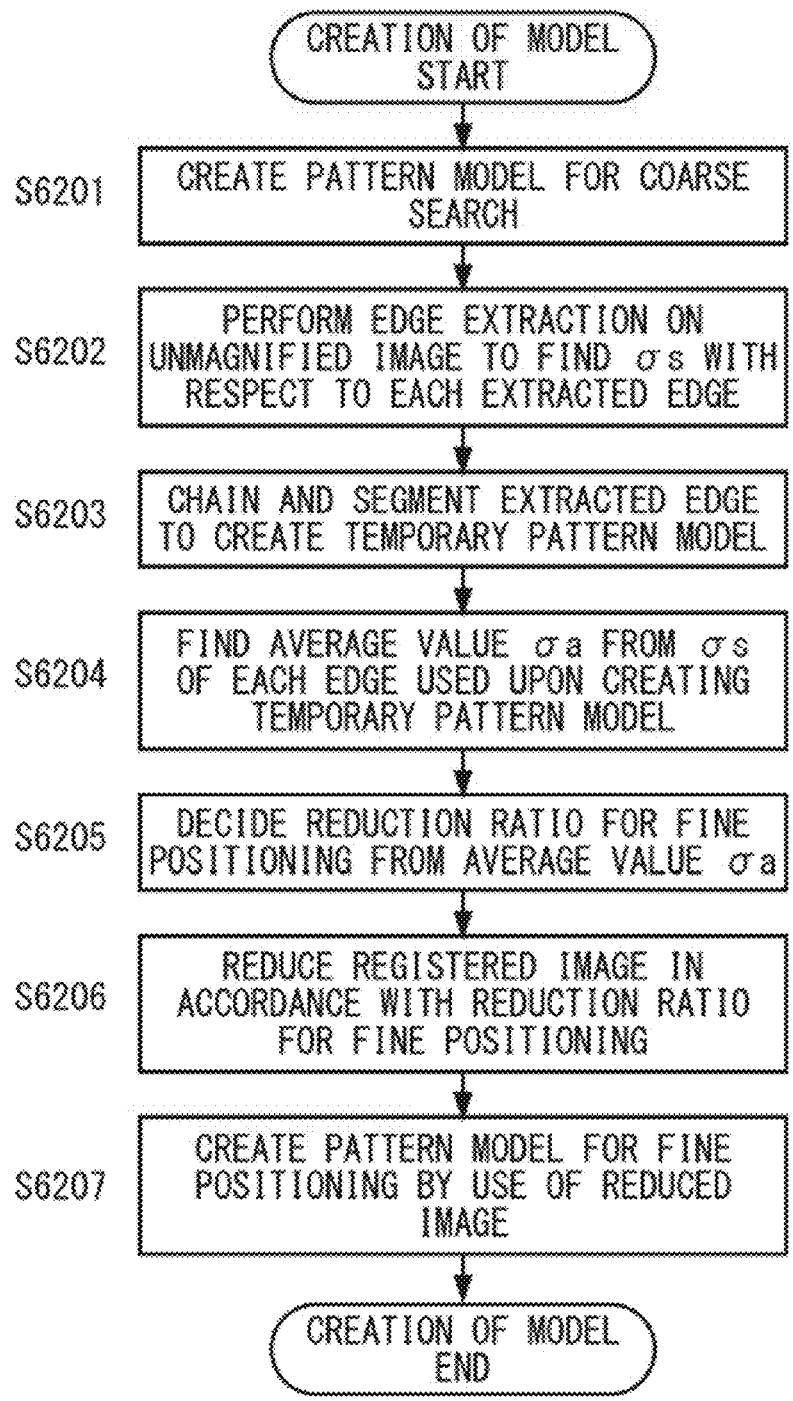
FIG. 62 is a flowchart showing an operation upon registration by use of the image data reduction ratio.
Figure 63:
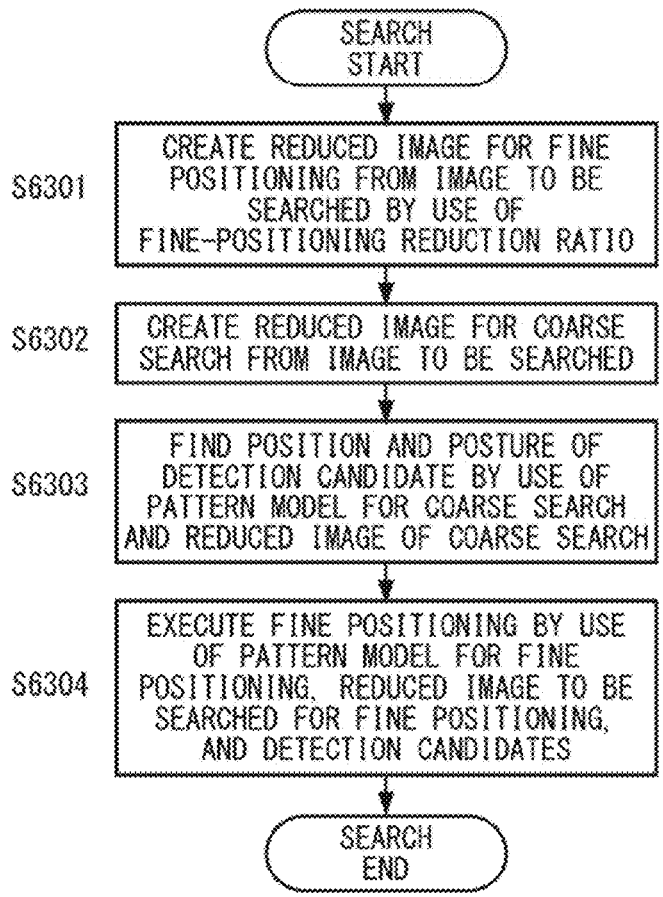
FIG. 63 is a flowchart showing an operation during motion by use of the image data reduction ratio.

Next, a specific procedure for a pattern search in image processing by use of the image data reduction ratio is described based on flowcharts of FIGS. 62 and 63. In these drawings, FIG. 62 shows an operation upon registration, and FIG. 63 shows an operation during motion.

(Operation Upon Registration Applied with Image Data Reduction Ratio)

Figure 64:
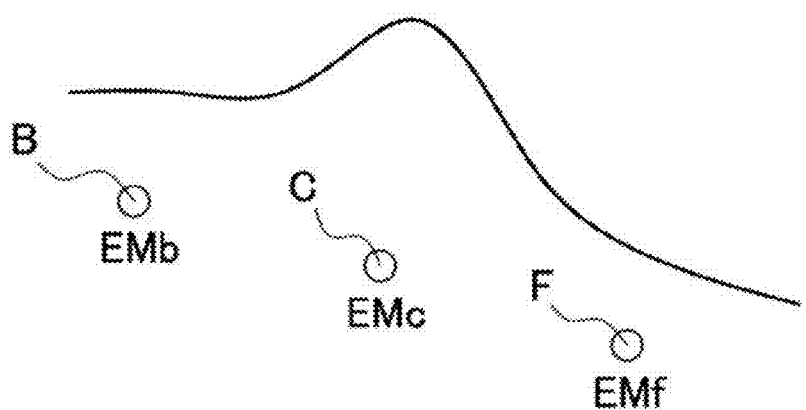
FIG. 64 is a schematic view showing edge strengths of three adjacent points B, C, and F.

First, the operation upon registration is described based on FIG. 62. In Step S6201, the pattern model for coarse search is created. Next, in Step S6202, the edge extraction is performed by use of the unmagnified image, to find a standard deviation as with respect to each of the extracted edge points. In finding the standard deviation σs, the shape of the edge actually extracted from the image data is assumed to be approximate to the model of FIG. 61. For calculation of the sub-pixel position of each edge at an edge point having a edge strength not smaller than a predetermined edge strength threshold, the next expression as an approximate expression of a quadric derivative of a logarithmic edge strength is employed by use of edge strengths EMb, EMc, EMf of three adjacent points B, C, F shown in FIG. 64:

$$t=(\ln(EMf)+\ln(EMb)-2\ln(EMc))*(\cos(EAc)^2) \qquad [\text{Expression 9}]$$

Using "t" in the above expression, the standard deviation σs can be calculated from the following expression:

$$\sigma_s = 1.8263 * t^{(-0.35661)} - 1.07197 \qquad [\text{Expression 10}]$$

What is important is that the standard deviation σs is expressible by a single-valued function, and the above expression does not have a particular meaning.

Meanwhile, in Step S6203, the edges extracted from the image data are chained and segmented by the chain creating device 63 and the segment creating device 68, to create a tentative pattern model. Further, in Step S6204, an average value σa is computed which uses only as of each edge used upon creating this temporary pattern model. Next, in Step S6205, using this advantage value σa, an image data reduction ratio "r" is found by the following expression. This is the fine-positioning reduction ratio.

$$r = \frac{\sigma_a}{0.6} \qquad [\text{Expression 11}]$$

In this example, a difference value of a logarithm of the edge strength is obtained, and from this difference value, the reduction ratio is calculated. However, this example is not restrictive, and a variety of approximate values concerning a differential value of the logarithm of the edge strength can also be used to compute the image data reduction ratio. Further, the appropriate value referred hereto includes an approximate value of the differential value of the edge strength.

As thus described, when the image data reduction ratio "r" is obtained, the registered image is newly reduced in accordance with the fine-positioning reduction ratio in Step S6206. Further, the pattern model for fine positioning is created from the reduced registered image in Step S6207.

(Operation During Motion Applied with Image Data Reduction Ratio)

Next, an operation performed during motion in response to the registration operation by use of the image data reduction ratio is described based on FIG. 63. First, in Step S6301, using the above obtained fine-positioning reduction ratio, the image to be searched is reduced into the reduced image to be searched for fine positioning. Meanwhile, as Step S6302, the reduced image for coarse search is created from the image to be searched, and in Step S6303, the position and posture of the detection candidate are calculated by use of the pattern model for coarse search and the reduced image for coarse search. Finally, in Step S6304, the fine positioning is executed by use of the pattern model for fine positioning, the reduced image to be searched for fine positioning, and the position and posture of the detection candidate.

(Pre-Processing/Post-Processing of Image Reduction)

Even after the reduction in image data, image data is reduced so as to hold information on edge position as much as possible. Specifically, after application of a low-pass filter corresponding to the image data reduction ratio, a sub-sampling is performed. The edge extraction is performed on the image data after the sub sampling so that the accurate information on the edge position can be obtained.

In such a manner as above, it is possible to suppress deterioration in accuracy that occurs due to unclearness of the original image, such as blurring. Further, reducing the image data to decrease the data amount can give a side benefit of allowing subsequent processing to be performed at high speed with a light load.

In the present embodiment, the fine-positioning reduction ratio is automatically set to the reduction ratio the upper limit of which is the final medium reduction ratio (first reduction ratio) used lastly in the "local search". Further, the pattern model for use in the fine positioning is created from the registered image reduced so as to have the same reduction ratio as the fine-positioning reduction ratio. As thus described, the fine-positioning reduction ratio is decided based on the sharpness of the edge of the edge image of the original size in the range from the original size of the image to the final medium reduction ratio used lastly in the local search.

As thus described, the fine-positioning reduction ratio is adjusted to hold the sharpness at the level not lower than a fixed level, and the reduction ratio can thus be used in the state of the sharpness being high, so that the stability of the positioning accuracy can be ensured.

(Operation Upon Registration of Pattern Model)

Figure 14:
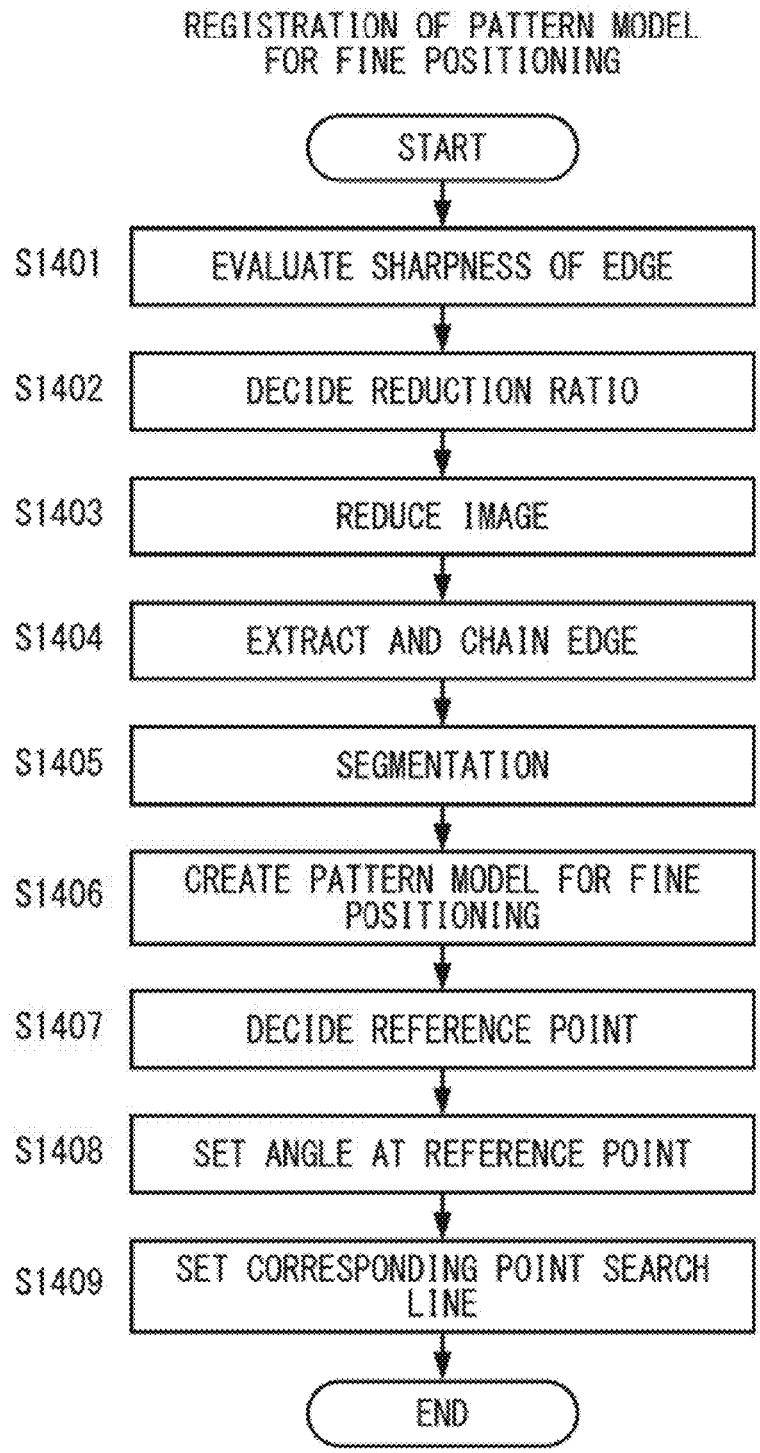
FIG. 14 is a flowchart showing a procedure for registering the pattern model for fine positioning.

Again returning to the description of the registration operation of the pattern model, a procedure for registering the pattern model for fine positioning is described based on a flowchart of FIG. 14. The pattern model for fine positioning is created by use of the same image as the registered image described in the above description of the pattern model for coarse search. First, in Step S1401, in advance of the processing by the image reducing device 77, the edge image of the original size with respect to the registered image is created by the contour extracting device 62, and the sharpness of the edge is evaluated. Based on this, the optimal reduction ratio is decided in Step S1402. As thus described, in Step S1403, the image is sought to be reduced by the image reducing device 77 based on the optimal fine-positioning reduction ratio decided with respect to the registered image. Further, with respect to the image reduced with the reduction ratio (including a reduction ratio of one) decided by the image reducing device 77, the edge is segmented by the contour extracting device 62, the chain creating device 63 and the segment creating device 68 (Step S1404, Step S1405). Specifically, on the reduced image, the edge extracting processing of extracting the edge and the chaining processing of creating the chain from the edge points are performed, and segmentation for coupling the chains are further performed. Next, the pattern model constituting device 70 creates the pattern model for fine positioning with the decided fine-positioning reduction ratio by use of data segmented by the segment creating device 68 (Step S1406).

Further, as does the foregoing pattern model for coarse search, the pattern model for fine positioning decides the reference point on each segment present inside the edge image data based on a pre-set condition (Step S1407). Moreover, the angle is set with respect to each reference point (Step S1408). The angle is set in the direction of the normal to the segment as well as the orientation of the edge. Furthermore set are the kind of segment (kind of segment such as a line or a circular arc) where the reference point is provided, a parameter representing the segment (parameter capable of defining the segment made up of a line or a circular arc), an angle in the direction of the normal to the segment and in the orientation close to the edge angle, and line segment information having a length pre-set in the direction of the normal to the segment, namely a corresponding point search line (Step S1409).

(Line Length of Corresponding Point Search Line)

As for a line length of the corresponding point search line given with respect to each reference point, the same length to each reference point is set. The length is decided by means of a ratio between the final medium reduction ratio used lastly in the local search and the fine-positioning reduction ratio for use in the fine positioning. In other words, it is set that the line length is large when the ratio between the final medium reduction ratio and the fine-positioning reduction ratio is large, and the line length is small when the ratio is small.

For example, when the final medium reduction ratio used lastly in the local search is one-fourth of the original size of the image and the fine-positioning reduction ratio is unmagnification, the ratio between the final medium reduction ratio and the fine-positioning reduction ratio is four times, and hence one pixel in the local search corresponds to four pixels in the fine positioning. Therefore, the length of the line in the pattern model for fine positioning is set to a length covering each of four pixels in the positive and negative directions of the edge from the reference point. However, since the length of this line has an effect on the positioning accuracy and the search time, covering a total number of corresponding pixels by the ratio of the reduction ratios is not necessarily required. For example, the line length of the corresponding point search line is set short in accordance with the processing time required. Otherwise, on the contrary, the line length may be set not to be smaller than the corresponding number of pixels. For example, a margin can be set to the line length in accordance with the ratio of the reduction ratios, to seek the stability of the processing.

(Change in Line Length of Corresponding Point Search Line)

Figure 27:
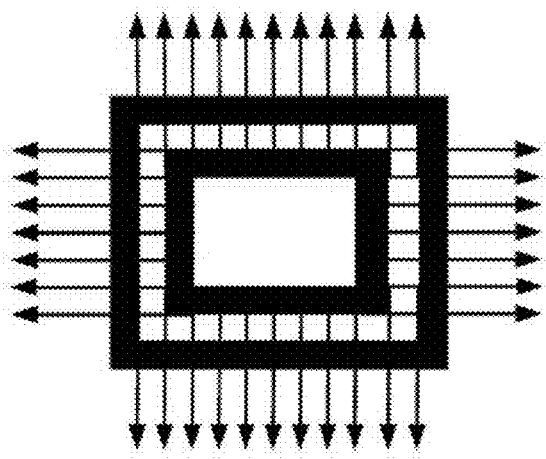
FIG. 27 is an image view showing the state of setting corresponding point search lines having the same length from reference points.
Figure 28:
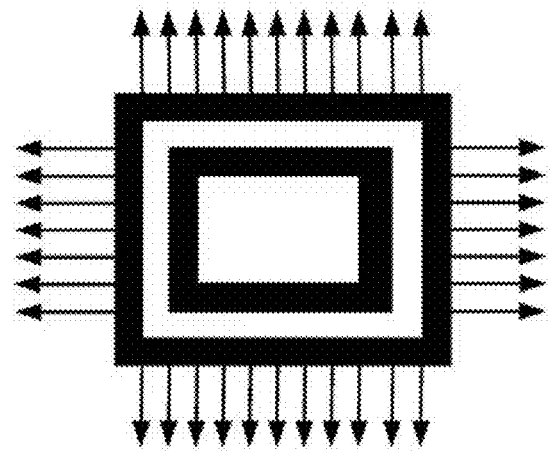
FIG. 28 is an image view showing the state of setting corresponding point search lines having different lengths from the reference points.

Further, the length of the corresponding point search line can be set not uniform forward and backward with respect to the reference point, and can be changed such that one line length is set longer or shorter. This processing is performed by the pattern model constituting device 70 or the like. An example of changing the length of the corresponding point search line is described based on FIGS. 27 and 28. In these drawings, FIG. 27 shows the case of the lengths from the reference points being the same, and FIG. 28 shows the lengths from the reference point being different. It is to be noted that in these drawings, the corresponding point search lines generated in an inner rectangular region in these drawings have been filtered. As shown in FIG. 27, when the lengths of the corresponding point search lines extended from the reference point are made constant in the forward/backward and right/left directions, the lines overlap the inner rectangular shape, which might cause erroneous determination. Therefore, when the corresponding point search lines are not extended in the inward direction, but are set only in the outward direction as in FIG. 28, more accurate search result with less erroneous determination can be expected.

(Setting Intervals of Corresponding Point Search Line)

The corresponding point search line is set on the segment excluding its end portion. This is because such an end portion is greatly influenced upon displacement. Therefore, stable processing can be expected by setting the corresponding point search line while excluding the portion greatly influenced upon displacement.

Intervals for and the number of corresponding point search lines for the setting thereof are decided in accordance with the required processing speed and accuracy of the pattern search. It is possible to keep the accuracy of the pattern search by setting such that at least one corresponding point search line is arranged on each line or circular arc constituting the segment. Most simply, one reference point is arranged at the center of the segment, and from that point, reference points are set at equal intervals on the segment. Further, the setting of the reference point is thinned out in a portion with a blurred edge angle inside the segment, and the reference points are thickly set in a reliably detected portion, and thereby, the accuracy can be enhanced.

Moreover, it is preferable to allocate at least one corresponding point search line to the center of the segment. This ensures setting of at least one corresponding point search line, even being short, with respect to the segment constituting part of the pattern model.

(Pre-Processing on Image to be Searched During Motion)

Figure 3:
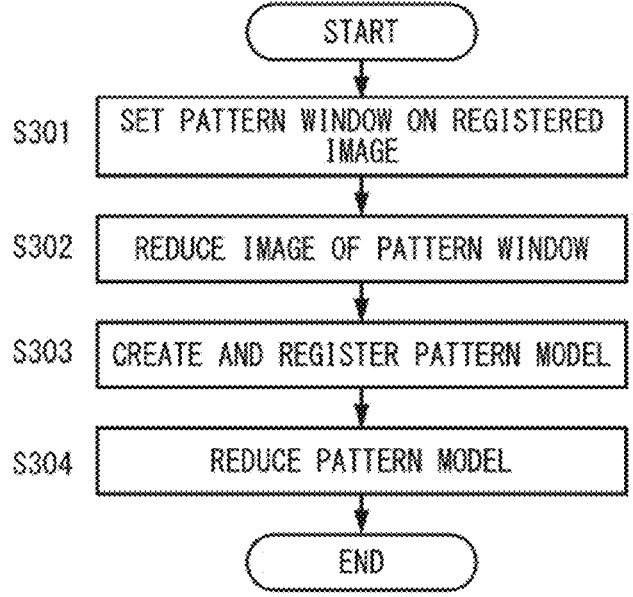
FIG. 3 is a flowchart showing a scheme of the operation upon registration of the pattern model.
Figure 15:
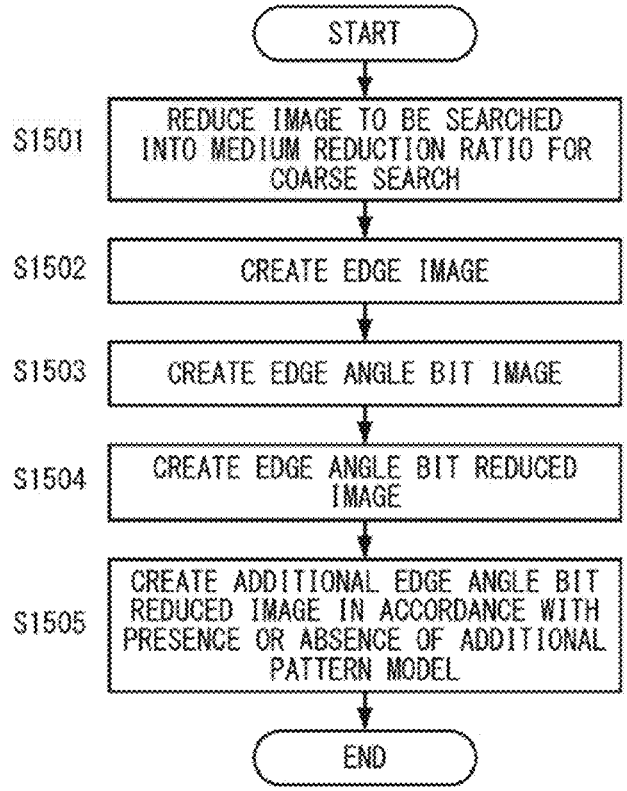
FIG. 15 is a flowchart showing a procedure for performing pre-processing on an image to be searched during motion.

In the above, the operation upon registration of the pattern model, namely the creation of the pattern models for coarse search and the fine positioning was described (FIGS. 3, 12). During motion, a search is performed by use of these patterns (FIG. 4). In the search, a predetermined pre-processing is performed on an image to be searched inputted from the image pickup device. A procedure for performing the pre-processing on the image to be searched in the search during motion is described based on a flowchart of FIG. 15.

First, in Step S1501, based on the inputted image to be searched, the image reducing device 77 creates a reduced image by use of the medium reduction ratio for first pattern model for coarse search (first reduction ratio) which was used in the registered image upon registration.

Meanwhile, in Step S1502, the edge angle/edge strength image creating device 60 of the contour extracting device 62 creates an edge angle image and an edge strength image. Further, the thinning device 61 creates a thinned edge angle image based on these edge angle image and edge strength image.

Next, in Step S1503, the edge angle bit image creating device 69 is created by the contour extracting device 62, and based on the thinned edge strength image, an edge angle bit image corresponding to the medium reduction ratio of the first pattern model for coarse search is created. Needless to say, the edge angle bit image thus created is applied to the "local search" by use of the first pattern model for coarse search in the search operation.

Further, in Step S1504, the edge angle bit image reducing device 78 creates an edge angle bit reduced image corresponding to the reduction ratio for large area for the second pattern model for "large-area search" based on the edge angle bit image created by the edge angle bit image creating device 69.

It is to be noted that, as described in the description of the setting of the medium reduction ratio of coarse search, in the case of creating the additional pattern model based on the additional medium reduction ratio between the firstly set medium reduction ratio and the reduction ratio for large area, also in this pre-processing, as arbitrary Step S1505, an edge angle bit reduced image corresponding to the medium reduction ratio of the additional pattern model is created by the edge angle bit image reducing device 78 based on the edge angle bit image created by the edge angle bit image creating device 69.

Additionally, in the foregoing pre-processing during motion, the processing is performed on the image to be searched in the reverse order to the order of the large-area search and the local search as the coarse search, as well as the fine positioning, which are performed during motion (see FIGS. 8A to 8C), but the order of creating the pattern model is not particularly restricted, and it goes without saying that the pattern model for coarse search may be created after creation of the pattern model for fine positioning. Meanwhile, during motion, the coarse search is performed by use of an image having a high reduction ratio, and the reduction ratio is gradually lowered to perform the fine search on an image of a size close to the original size.

As thus described, after completion of the pre-processing during motion, the large-area search and the local search as the coarse search are performed using the created edge angle bit reduced image, edge angle bit image, and the like, and after the coordinate of the detection candidate is found, the fine positioning is performed (FIG. 9).

(Details of Each Operation Upon Registration)

In the above, the schemes of the operations upon registration and during motion were described. Next, the image processing operation upon registration is detailed. Upon registration, the edge angle/edge strength image creating device 60 applies the Sobel filter to the registered image, and finds the edge strength and the edge angle at each point constituting the registered image, to compute edge information including the edge strength, the edge angle and the edge position. The thinning processing is performed based on the edge information, to find the edge point. As a specific example of the thinning processing, the edge-strength non-maximal point suppressing processing can be used. The edge is thinned to have a line shape with a width of one pixel.

It is to be noted that the edge point can also be found by means of the accuracy of the sub-pixel position. For example, the sub-pixel position can be computed through use of quadric interpolation (e.g. see Japanese Unexamined Patent Publication No. H07-128017).

Further, the obtained edge points are coupled to create a continuous chain. The edge chaining device 64 performs edge coupling processing of coupling adjacent edge points with edge angles thereof almost in the same direction, to create a continuous line element (chain). The chain thus obtained also has an xy sub-pixel coordinate. Each chain is aggregation of the edge points, and each of the individual chains is provided with a chain index as an identifier for distinction among each chain.

Further, the chains are subjected to approximation by the edge chain segmenting device 65, to create a segment. The segment is found by fitting where the chains are approximated by a line and a circular arc through use of the least squares method. In the fitting, the approximation is first performed by the line, and when an error of the approximation by the line exceeds a predetermined threshold, the fitting is switched to one by the circular arc. When the error does not decrease even by the approximation by the circular arc, a result of the fitting by the line is used. In such a manner, the operation of sequentially performing the fitting in the combination of the line and the circular arc is repeated, and at the time point when the error of the fitting result exceeds the threshold, if the data obtained up to then is sufficiently long, it is regarded as the segment as a continuous line. Since the edge point is found in the sub-pixel position, the segment can also be obtained in a highly accurate position in the sub-pixel order.

The segment is created by approximating the chains by the line and the circular arc. The line segment can be expressed by an expression representing a straight line (e.g. $ax+by+c=0$), coordinates of end points, and the like. Meanwhile, the circular-arc segment can be expressed by a coordinate of the center, a radius, a start angle, an end angle, and the like. For example, a center coordinate $(x_o, y_o)$ of a circular arc and a radius $r_o$ in "$(x-x_o)2+(y-y_o)2=r_o2$" express the circular arc segment. At each of the segments created in such a manner, the reference points are set with predetermined intervals.

It should be noted that, although the example of the approximation by means of the line or the circular arc as the segment was described, this is not restrictive, and a cone curve, a spline curve, a Bezier curve, and the like can also be used as appropriate. Thereby, with a fixed geometric shape such as a circular shape, an oval shape, a triangle shape or a rectangular shape regarded as a reference, a pattern model can be created using these shapes singly or in combination, thereby to facilitate creation of the pattern search and each of subsequent processing.

(Reduction of Pattern Model)

Figure 16:
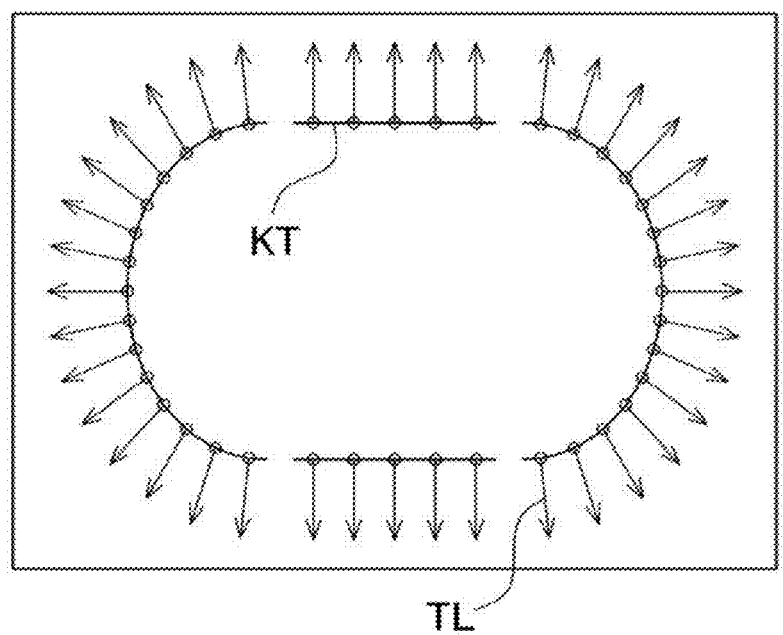
FIG. 16 is an image view showing a pattern model with corresponding point search lines set therein.
Figure 17:
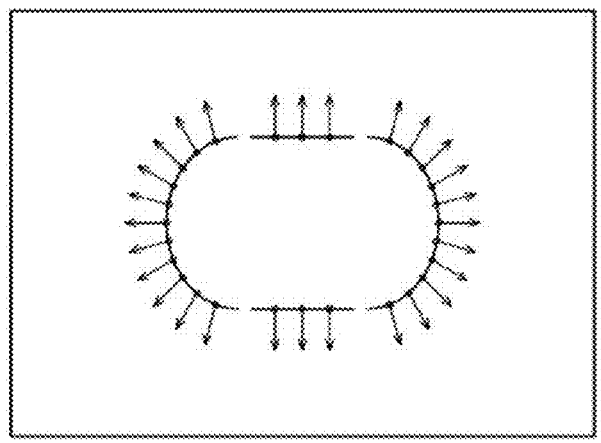
FIG. 17 is a schematic view showing a state where the pattern model of FIG. 16 has been thinned out.

Further, the pattern model is reduced during motion in the search. This reduction ratio is a reduction ratio for reducing the image to be searched for coarse search during motion that is described later. Since this reduction processing is to be performed, intervals are set among the reference points as the model edge points of the pattern model so as to prevent the reference points from designating the same coordinate as a result of the reduction processing. Consequently, the pattern model of FIG. 16 changes to one as in FIG. 17.

(Difference Between Pattern Model for Coarse Search and Pattern Model for Fine Positioning)

The pattern model for coarse search and the pattern model for fine positioning are separately created from the registered image of the original size (or its reduce image). In other words, the segment of the pattern model for coarse search is not created from the segment of the pattern model for fine positioning, and the segments of both models do not necessarily match. Further, since the size of the pattern model differs between the pattern model for coarse search and the pattern model for fine positioning, a distance among each reference point also differs therebetween. The difference in distance, obtained by transforming the distance among each reference point by unmagnification, depends upon the reduction ratio.

Further, in the pattern model for coarse search, the coordinate of the reference point and the orientation of the edge at the reference point (angle information) are given. In other words, the angle is set to be close to the orientation of the edge in the direction of the normal to a segment not having information on length of a corresponding point search line. In the coarse search by use of this pattern model for coarse search, the pattern model is placed on the image to be searched, and it is checked whether the edge is present at the positions of the reference points and whether the orientation of the edge matches the orientation of the pattern model.

On the other hand, in addition to the coordinate of the reference point and the orientation of the edge at the reference point in the pattern model for coarse search, the pattern model for fine positioning has a corresponding point search line passing through the reference point and having a predetermined length extending in a direction substantially orthogonal to the segment (i.e. one defining the length of the normal to the segment), and the kind of segment (e.g. attribute such as the line or the circular arc). This difference corresponds to contents of processing of each search. Namely, in the fine positioning, an edge that corresponds within the range of the corresponding point search line is searched. In such a manner, the pattern model for fine positioning functions as a corresponding edge point selecting device for selecting a corresponding edge point corresponding to the reference point.

It is to be noted that in the extraction of the contour, the segment is not necessarily required to be created. The corresponding point search line can be set not from the segment but directly from the chain. For example, in the case of setting three reference points with respect to a certain contour, three edge points that constitute the chain corresponding to the contour are set with equal intervals, to set the corresponding point search lines in the respective normal directions. With this method, high-speed processing can be expected since no segment is created, whereas the accuracy slightly deteriorates since the chain is not approximated by the straight line or the circular arc. Especially, the chain is formed by simply coupling the edge points and hence it may have poor linearity, whereas the segment is appropriated by the straight line or the circular arc so that a more accurate computing result is obtained and the position accuracy is also stabilized.

(Details of Coarse Search During Motion)

Figure 18:
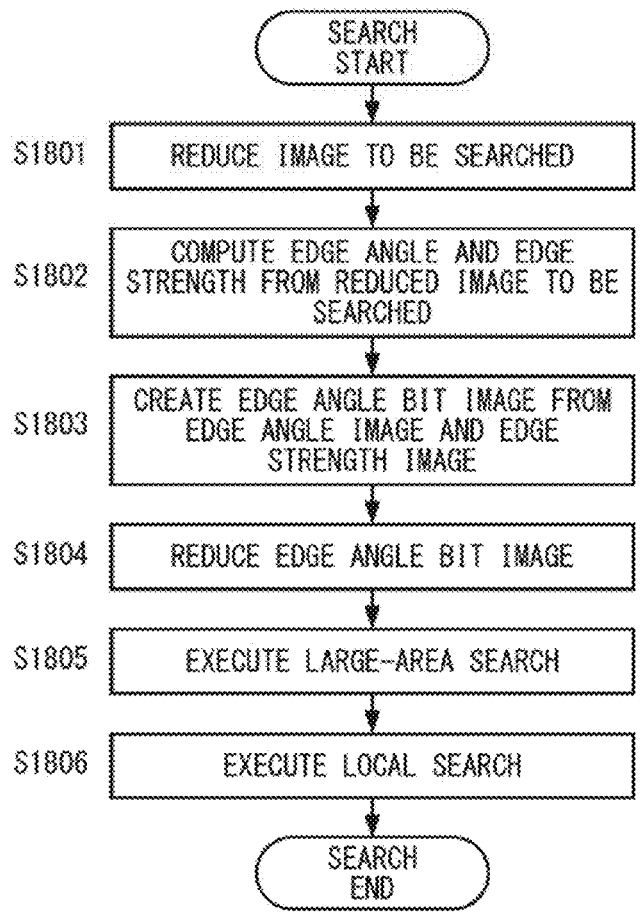
FIG. 18 is a flowchart showing a procedure for performing a pattern search during motion.

Next described is an operation during motion for actually searching the matching portion out of the image to be searched by use of the pattern model registered in such a manner as above. First, details of a procedure for obtaining a coarse position and posture in the coarse search are described based on a flowchart of FIG. 18. In the present embodiment, the coarse search divided into the large-area search and the local search, and performed, to find the detection candidate.

(Step S1801—Reduction in Image to be Searched)

Figure 19A:
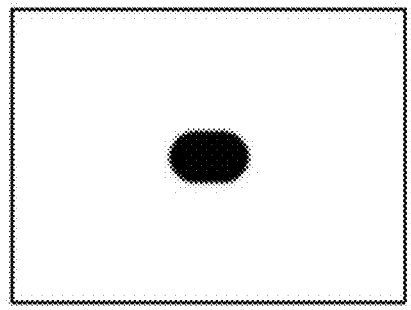
FIG. 19A is an image view showing an example of the image to be searched.
Figure 19B:
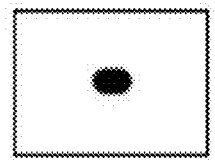
FIG. 19B is an image view showing a reduced image to be searched, having been reduced into the same magnification as that of the registered image of FIG. 6A.

First, in Step S1801, the image to be searched as the object to be searched is reduced in line with the reduction ratio of the registered image. For example, an image to be searched shown in FIG. 19A is reduced into the same magnification as that of the registered image, to obtain a reduced image to be searched shown in FIG. 19B. First, the image is reduced into the medium reduction ratio as the ratio for coarse search. In other words, the reduction ratio is not first reduced into the reduction ratio for large area which is a large reduction ratio, but first reduced into the medium reduction ratio which is a small reduction ratio.

(Step S1802—Acquirement of Edge Angle Image and Edge Strength Image)

Next, in Step S1802, the edge strength image and the edge angle image are separately obtained from the reduced image to be searched by an edge calculation device. As the edge calculating method, Sobel filtering or the like can be used.

The Sobel method is described. In the Sobel method, a matrix of 3×3 is used as an operator (kernel). This method extracts as a pixel value of the central point a value obtained by multiplying pixel values (e.g. luminance) by a coefficient with respect to peripheral points with the target point set at the center and adding up the multiplied values. This method is a horizontal and vertical filter, and has a characteristic of being resistant to noise since including a smoothing operation. The kernel for use in the Sobel filter is shown below.

$$\begin{vmatrix} -1 & 0 & 1 \\ -2 & 0 & 2 \\ -1 & 0 & 1 \end{vmatrix}$$

$$\begin{vmatrix} -1 & -2 & -1 \\ 0 & 0 & 0 \\ 1 & 2 & 1 \end{vmatrix}$$

[Expression 12]

As a result of this, the edge strength image and the edge angle image of the image to be searched are independently obtained.

(Step S1803—Creation of Edge Angle Bit Image of Image to be Searched)

Further, in Step S1803, the edge angle bit image is created by the edge angle bit image creating device 69 from the edge angle image and the edge strength image. The edge angle bit image is image data expressing as angle bit the edge angle of each point constituting the edge angle image. As a result of this, the edge angle bit image is obtained. Transformation from the edge angle image into the edge angle bit image is described later.

(Step S1804—Reduction in Edge Angle Bit Image)

Further, in Step S1804, the obtained edge angle bit image is reduced by the edge angle bit image reducing device 78. The reduction ratio is set to the reduction ratio for large area in the case of creating the second pattern model for large-area search, and to the medium reduction ratio in the case of creating the first pattern model for local search. As a result of this, the reduced image of the edge angle bit image is obtained.

(Step S1805—Execution of Large-Area Search)

Next, the large-area search is executed on the edge angle bit reduced image, reduced in Step S1804, by use of a pre-reduced pattern model. Specifically, the search is performed in the whole range, while the angle of the pattern model is changed, so as to scan the image from the upper left to the lower right. Thereby, the region of the detection candidate is extracted. The position and posture of the detection candidate are expressed, for example, by the XY coordinate and the angle θ or the like, respectively. The detection candidate is found by score calculation. The reduced pattern model is moved by the coarse searching device 71 in the degree of freedom of the search position and posture, and a score is calculated in each position and posture.

(Score Calculation)

The score calculation in the large-area search is performed by comparing the edge angle images at the respective edge points included in the pattern model and the edge angle bit image, obtained by reducing the image to be searched into the reduction ratio for large area, to calculate a coincidence. Upon performing the search, the data on the position and angle of the reference point are changed in line with the position and the posture the score in which the score is to be calculated. Subsequently, the angle is transformed as in the edge angle bit image, and AND processing is performed on a pixel value of the edge angle bit image data after the reduction. A value obtained by dividing a total value of the number of remaining bits by a maximal value of an expected total value is regarded as the coincidence, which is computed by the coarse searching device 71. Further, a plurality of bits can be allocated in the angle direction, to add a concept of weighting.

(Step S1806—Execution of Local Search)

Moreover, the local search is performed on the region of the detection candidate found in the large-area search. In the local search, the pattern model for local search with its reduction ratio made lower than that of the pattern model for large-area search is used. Furthermore, also as the edge angle bit image as the image to be searched, the reduced image, reduced by the reduction ratio for local search that is lower than the reduction ratio for large area, is used.

Further, upon performing the local search, not only the region of the detection candidate found in the large-area search is used as it is, but the local search may also be performed in the vicinity thereof, for example, on peripheral pixels such as 3×3 pixels and 5×5 pixels. Thereby a stable search result can be expected.

(Expansion Processing)

Namely, in order to stabilize the result of the score calculation, enlargement processing can also be performed upon performing the coarse search. There normally appears a tendency that, when the reduction ratio of the image to be searched decreases to increase the accuracy, even slight positional displacement causes a large decrease in score. A rotational angle may be minutely change for avoiding a rapid change in score, but in this case, the disadvantage of increasing a processing amount occurs. Therefore, in consideration of the balance between reduction in processing amount and improvement in accuracy, the edge angle bit image as the image to be searched is enlarged only by a predetermined amount. For example, the image is enlarged in the XY direction thereof by a predetermined number of pixels, for example, 2×2 pixels obtained by doubling one pixel. It is thereby possible to suppress rapid fluctuations of the score value due to slight displacement of the angle, so as to obtain a stable score.

In such a manner, the coarse position in the reduced image to be searched of the reduced pattern model is decided based on the calculated score. Further, as appropriate, the above step can be repeated, so as to enhance the accuracy of the coarse position. Namely, not only the coarse search is simply divided into twice, the large-area search and the local search, but the local search can be divided into a plurality of times, and a larger reduced image to be searched can be used by gradually lowering the reduction ratio of the image to be searched, so as to perform highly accurate positioning.

It is to be noted that, due to its wide range and large processing amount, the large-area search is normally performed only once. However, it can be performed a plurality of times in accordance with required accuracy or tact time. Further, as for the search technique, a known search technique can be used, such as edge search, normalized correlation search, generalized Hough transform or geometric hashing.

(Details of Fine Positioning During Motion)

Figure 20:
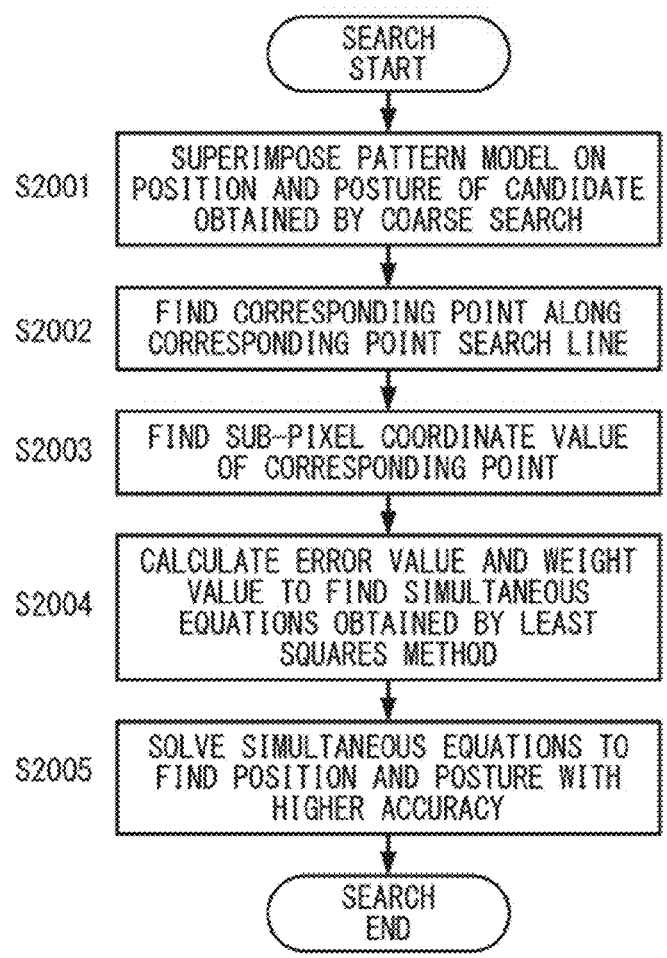
FIG. 20 is a flowchart showing a procedure for a pattern search during motion.

After the coarse search is performed in such a manner as above and data on the position and posture of the detection candidate where the pattern model is present are found, the fine positioning is performed by the fine positioning device 76. Next, a specific procedure for the fine positioning is detailed based on a flowchart of FIG. 20.

First, in Step S2001, the pattern model for the fine positioning is superimposed on the image to be searched based on the position and posture of the detection candidate found in the coarse search. It is preferable to use the image to be searched of the original size and the pattern model for fine positioning while the position and posture finally found in the coarse search are regarded as a starting position and a starting posture. However, the fine positioning can also be performed with a reduction ratio higher than the original size (reduction ratio of one) and lower than the reduction ratio used lastly in the coarse search.

Figure 46:
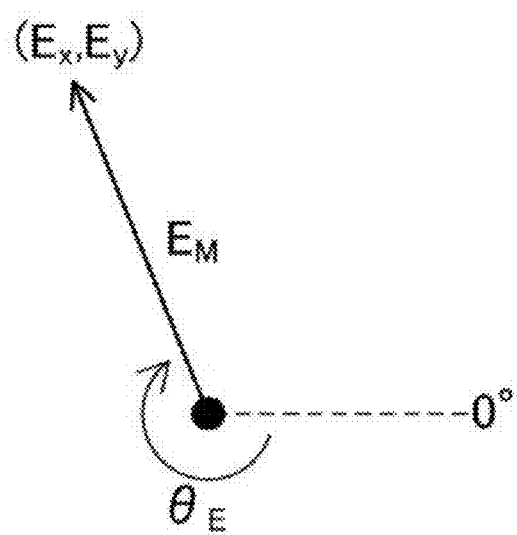
FIG. 46 is a schematic view showing an edge vector (Ex, Ey) having an edge strength EM and an edge angle θE.

Further, in Step S2002, the point as the corresponding edge point is found along the corresponding point search line of the pattern model for fine positioning. As described above, the corresponding point search line is the line with a predetermined length extending in the direction of the normal to the segment, and a starting point as one of both ends of the line segment is regarded as a search starting point, and an end point is regarded as a search end point. First, edge calculation is performed along the corresponding point search line, to acquire an edge vector. As a technique for the edge calculation, as described above, the sobel filter can be used as appropriate. The edge vector obtained by this edge calculation, the edge angle, edge strength, edge position and the like of each point on the corresponding point search line are found. It is to be noted that the edge vector is one expressing the edge strength and orientation by the vector, and can be expressed like (Ex, Ey). For example, as shown in FIG. 46, when the edge strength is EM and the edge angle is $\theta E$, these are expressed by: the edge angle $\theta E$=Atan (Ey/Ex); and the edge strength EM=sqrt (Ex2+Ey2).

(Corresponding Edge Point Search Processing)

Further, based on the information on the edge vector, edge angle, edge position, and the like, the corresponding edge point corresponding to the segment that includes the reference point of the corresponding point search line is found. As an example of the method for deciding a corresponding edge point, the corresponding edge point can be decided at high speed by use of the foregoing edge vector. As another method, the calculation can be performed by use of the edge strength and the edge angle as described below, but in this case, Atan needs to be calculated described below, the computing becomes complicated. In the following described is a procedure for obtaining a corresponding edge point by use of an edge strength and an edge angle.

First, a maximal point, which has an edge strength larger than a predetermined edge strength threshold and at which an absolute value of a difference between the edge angle and the angle of the reference point is smaller than a predetermined edge angle threshold, is taken as a candidate of the corresponding edge point. Further, the closest point to the reference point among the corresponding-edge-point candidates is finally regarded as the corresponding edge point.

Further, the sub-pixel position of the edge of the corresponding edge point is found (Step S2003). Using that position and geometric data of the segment, the error value is obtained, and the calculation of the least squares method is performed (Step S2004), to obtain a fine position (Step S2005). Examples of the error value in the case of the line segment include a distance between the corresponding edge point and the straight line, and examples of the error value in the case of the circular arc segment include an absolute value of the difference between the radius and a distance between the corresponding edge point and the central position.

As thus described, the error value or the weight value for use in the calculation of the least squares method is calculated by the fine positioning device 76, and from the calculated value, simultaneous equations obtained by the least squares method are acquired. The least squares method is adopted such that the segment takes an ideal shape and the error of a plurality of corresponding points corresponding to the segment are minimized. Further, the simultaneous equations are solved, to find a highly accurate position and posture. In such a manner, a corrected amount Δx of a position X, a corrected amount Δy of a position Y, a corrected amount Δθ of the angle θ, a corrected amount Δs (s: scale) of a scale "s" are obtained.

In the fine positioning, the reference point is superimposed on the image to be searched by use of the data on the position and posture obtained in the coarse search. Then, the edge calculation such as sobel filtering is performed along the corresponding point search line, to acquire the edge vector. It is to be noted that the edge vector is represented by a result in application of the sobel filter, and can be expressed by (Sx, Sy), or the like. Further, the edge strength EM can be expressed by "EM=√(Sx2+Sy2)", and the edge angle θE can be expressed as "θE=Atan (Sy/Sx)", or the like. Moreover, from the edge vector, the edge angle, the edge strength and the position of the pixel at the corresponding edge point are obtained. From these edge vector, edge angle, edge strength and position, the corresponding edge point corresponding to the segment including the reference point of the corresponding edge point is found by the fine positioning device 76.

Figure 21A:
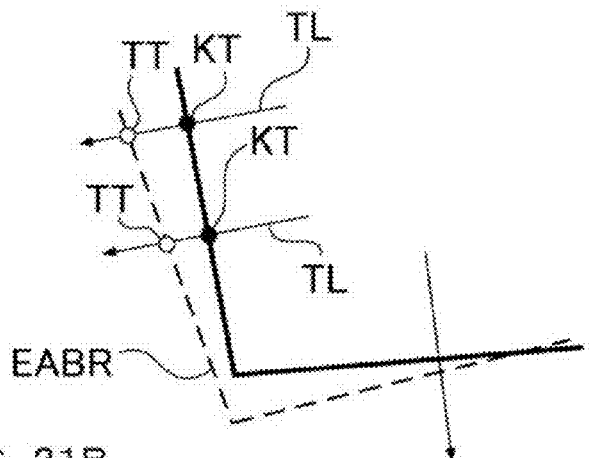
FIGS. 21A and 21B are schematic views each showing corresponding edge point search processing of finding a corresponding edge point.

This state is described based on FIG. 21A. First, the pattern model PM shown by a thick solid line is superimposed and arranged by the fine positioning device 76 in the position of the detection candidate of the image to be searched (edge angle bit reduced image EABR shown by a broken line) obtained in the coarse search. Then, along a corresponding point search line TL that passes through a reference point KT set on the pattern model and is almost vertical to the segment of the pattern model, a corresponding edge point TT corresponding to the reference point KT is found. In FIG. 21A, the corresponding point search line TL is shown by a thin solid line. It is to be noted that the corresponding point search line TL is an imaginarily set line, and is not actually drawn. The corresponding edge point TT becomes an intersection point of the corresponding point search line TL and the reduced image EABR. With the corresponding edge point TT, the sub-pixel coordinate position can be obtained. Using this position and geometric data of the segment, fine positioning is performed by the fine positioning device 76.

Specifically, with the relation between the geometric data (line in this case) of the segment and the corresponding edge point regarded as an evaluation value, the score calculation is performed so as to minimize or maximize an accumulated value of the evaluation values. As the evaluation value, a distance can be typically used, and with this distance regarded as the error value, the calculation of the least squares method is performed so as to minimize the error value, whereby the fine position can be obtained. As the distance used can be a Euclidean distance between the segment and the corresponding edge point. Namely, in the case of the segment being the line, the distance between the corresponding edge point and the straight line is used, and in the case of the segment being the circular arc, the absolute value of the difference between the radius and the distance between the corresponding edge point and the central position. Solving the simultaneous equations obtained by a solution using the means of the least squares method can find a highly accurate position and posture. Further, the evaluation value is not restricted to the distance, and may be an angle formed by the reference point and the corresponding edge point of the reference point.

Figure 21B:
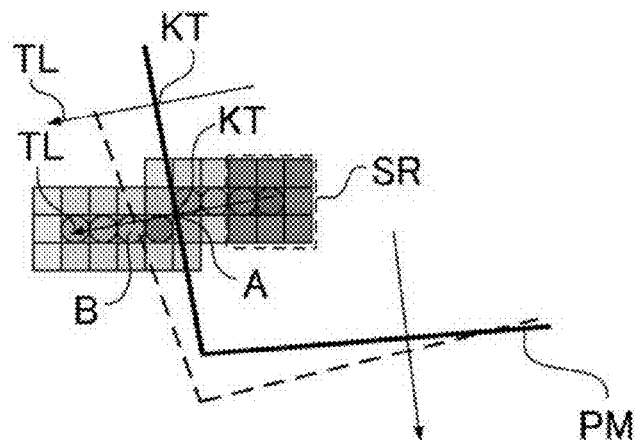

Further, FIG. 21B shows a state of corresponding edge point search processing in which the fine positioning device 76 finds the corresponding edge point. In this drawing, as in FIG. 21A, a broken line shows the reduced image EABR of the image to be searched, a thick solid line shows the pattern model PM, and a thin solid line shows the corresponding point search line TL set on the reference point KT. Found in this case is a coordinate position x, y in application of the Sobel filter in a region SR of 3×3 pixels of the reduced image EABR. The central coordinate in this calculation is found by use of Bresenham's algorithm for creating straight-line data. In the example of FIG. 21B, a pixel B is extracted as the corresponding edge point with respect to a model edge point A.

The method shown in FIG. 21B differs from Japanese Patent No. 3759983 described above in that a point, appropriately selected on the segment where the corresponding edge point was automatically extracted, is regarded as the reference point. Especially in Japanese Patent No. 3759983, an arrangement method for a seek-line is not defined. Further, upon decision of the corresponding edge point, data on the edge angle, the edge position and the like are used besides the edge strength, thereby to improve the reliability of the corresponding edge point. Additionally, the kernel used in the processing of obtaining an edge angle and an edge strength is made more compact, to lower a load of computing processing. Further, the position of the corresponding edge point can be obtained with sub-pixel accuracy. Moreover, the use of the least squares method can give the advantage of being capable of corresponding to models in a variety of shapes.

In such a manner as above, it is possible to perform highly accurate high-speed positioning in the pattern search. Especially in this method, by changing the line length of the corresponding point search line, the range for searching the corresponding edge point can be easily changed by means of the corresponding point search line, so that the advantage of being capable of adjusting the stability required. Namely, by gradually reducing the length of the corresponding point search line upon repeated application of the least squares method, positioning with higher accuracy at higher speed can be easily realized.

Figure 22:
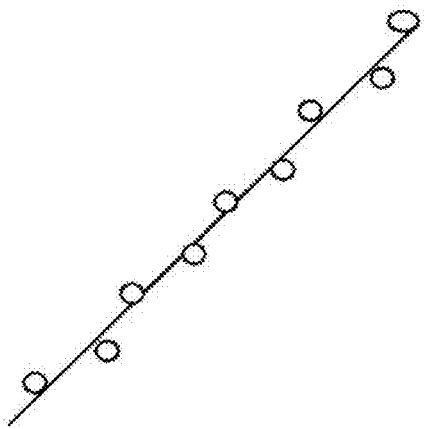
FIG. 22 is a schematic view for describing a corrugated phenomenon of an edge position.

Additionally, since the pattern model is expressed by the segment, a corrugated phenomenon of an edge position as shown in FIG. 22 can be eliminated. Namely, in the case of performing the fine positioning between points, large positional displacement may occur between pairing with a point in a higher wave and pairing with a point in a lower wave, but such an influence can be reduced.

Further, in place of this or in addition to this, the edge angle threshold may be changed in each repetition of the least squares method. Namely, gradually reducing the edge angle threshold in accordance with the repeated number of the least squares method also allows realization of more stable positioning.

It is to be noted that upon superimposing the pattern model on the image to be searched based on the initial position obtained in the coarse search or the fine-positioning start position obtained in another coarse search, unprocessed data, so-called original image data, is used as the image to be searched, and a pattern model corresponding to the original image data is used as the pattern model.

This method can eliminate the need for transforming all pixels in the original image data of the image to be searched into edge image data, so as to seek speeding up of the processing. Especially, in inline processing where the tact time is required, such high-speed low-load processing is preferred. It goes without saying that, when overall pre-extraction of the edge data is more efficient, all points in the image to be searched can be transformed into edge image data to perform the pattern search.

Further, superimposing and arranging the whole of the pattern model on the image to be searched is not necessary, but superimposing and arranging at least the corresponding point search line suffices. In particular, since the corresponding point search line is the straight line, it can be readily obtained by computing. Therefore, in the present specification, the term "superimpose" does not necessarily means to actually superimpose an image, but is used to mean processing of deciding the corresponding edge point in accordance with the corresponding point search line. Further, the phrase "superimpose and arrange" in this case is intended to describe that the corresponding position of each image is made easy to grasp by superimposition thereof as described above, which is merely imaginary in calculation and, needless to say, the operation of actually superimposing data is not necessary.

According to this method, a highly accurate edge-base search can be realized as compared with the conventional method. In the foregoing technique of Japanese Patent No. 3759983, the direction and angle component of the edge are not considered but only a pre-defined edge direction is viewed, and hence the stability in a complicated shape cannot be expected. As opposed to this, in the technique according to the present embodiment, importance is attached to the edge direction, thereby allowing enhancement of the reliability of the corresponding edge point. Further, in the present embodiment, since a difference is calculated by use of a small filter of the kernel, such as the Sobel filter, even when the work is long and narrow, the edge can be detected. As thus described, it is possible to realize a stable edge-based search adaptable to an object to be searched in complicated shape as compared with the technique of Japanese Patent No. 3759983.

Further, upon obtaining the position of the detection candidate in the image to be searched of the pattern model, namely the initial position in the local search, there is the advantage of performing a high-speed low-load pattern search by reducing the image to be searched and performing the search. However, since part of information might be lost due to the reduction to cause deterioration in accuracy, it is desirable to perform the reduction so as to hold an information amount (detailed later). Moreover, besides the form of obtaining the initial position of the pattern model in the coarse search, the position can be manually specified by the user.

The point mentioned in the above example means the point constituting the image to be searched or the registered image, namely one pixel, but it goes without saying that a plurality of pixels (e.g. four pixels) can be lumped together as one point. Therefore, in the present specification, the point means one pixel or a predetermined number of pixels.

Further, the phrase "based on the reference point" is used not only in the meaning of the edge detection being performed on the reference point, but also in the meaning including the edge detection being performed in the neighborhood of the reference point. For example, the edge detection is performed within a designated range, such as a range from one to ten pixels around the reference point.

Further, the segment refers to a continuous line with finite length configured of the line and/or the circular arc or the combination thereof. Moreover, the cone curve, the spline curve, the Bezier curve, and the like can be combined in addition to the line and the circular arc. Furthermore, data of the corresponding point search line includes the coordinate of the reference point, and the angle and length of the corresponding point search line.

(Least Squares Method)

In the least squares method, a straight line error function is adapted to the line segment. The straight line error function is a least squares method with the distance between a point and a straight line regarded as an error function. Further, a circular arc error function is adapted to the circular arc segment. The circular arc error function is a least squares method with a distance between a point and a circular arc regarded as an error function. This is to be detailed later.

Examples of the problem of the least squares method include that, when even one quite different value is present, the accuracy extremely deteriorates due to the influence of this point. Therefore, in the present technique, a weighted least squares method, made to have a weight value so as to lower weighting on such a point, is used to suppress the influence.

Further, as a degree of freedom to be used in the least squares method, a movement in the X direction, a movement in the Y direction, rotation, enlargement/reduction, skew, aspect, and the like can be employed. Selecting these can also correspond to rotation, enlargement/reduction, distortion and the like of the registered image besides the parallel movements in the XY directions.

(Generalization of Error Function of Least Squares Method)

The error function of the least squares method is generalized and developed. First, it is considered that an error function E (po, p1, ..., pn) is decided by an affine parameter po, p1, ..., pn (e.g. p0=x, p1=y, etc.). It is assumed that the error function E (po, p1, ..., pn) is minimized by an optimal affine parameter poo, p1o, ... pno) (o: optimized). At this time, the error function E (po, p1, ..., pn) is expressed by the following expression:

$$E(p_0, p_1, \ldots, p_n) = \sum_i \omega_i e_i(p_0, p_1, \ldots, p_n)^2 \quad \text{[Expression 13]}$$

The meanings of the parameters in the following expression are as follows.

i: index of a corresponding edge point

ωi: weight decided in accordance with positional relation between corresponding edge point and model. For example, when the point-line distance between the corresponding edge point and the line is long, this parameter is defined to come close to zero.

e (p0, p1, ..., pn): individual error functions decided by geometric distance between corresponding edge point and model. This parameter is decided by the point-line distance between the corresponding edge point and the line segment, or the like.

p0 to pn: affine parameters of parallel x-movement amount, parallel y-movement amount, rotational angle, scale value, or the like.

In order to find the affine parameters poo, p1o, ... pno that minimize the error function E (po, p1, ..., pn), displacement amounts are found as follows from affine parameters p0t, p1t, ... pnt that are expected to be sufficiently close to the affine parameters to be found and were obtained in the coarse search or the last fine positioning:

$$\Delta p_0, \Delta p_1, \ldots, \Delta p_n$$

$$(p_{i0} \approx p_{it} + \Delta p_i)$$

(t:trial) [Expression 14]

$\Delta p0, \Delta p1, \ldots, \Delta pn$ are obtained by solving the following simultaneous equations:

[Expression 15]

$$\begin{bmatrix} \sum_i \omega_i \frac{\partial e_i}{\partial p_0} \frac{\partial e_i}{\partial p_0} & \sum_i \omega_i \frac{\partial e_i}{\partial p_0} \frac{\partial e_i}{\partial p_1} & \cdots & \sum_i \omega_i \frac{\partial e_i}{\partial p_0} \frac{\partial e_i}{\partial p_n} \\ \sum_i \omega_i \frac{\partial e_i}{\partial p_1} \frac{\partial e_i}{\partial p_0} & \sum_i \omega_i \frac{\partial e_i}{\partial p_1} \frac{\partial e_i}{\partial p_1} & \cdots & \sum_i \omega_i \frac{\partial e_i}{\partial p_1} \frac{\partial e_i}{\partial p_n} \\ \cdots & & & \\ \sum_i \omega_i \frac{\partial e_i}{\partial p_n} \frac{\partial e_i}{\partial p_0} & \sum_i \omega_i \frac{\partial e_i}{\partial p_n} \frac{\partial e_i}{\partial p_1} & \cdots & \sum_i \omega_i \frac{\partial e_i}{\partial p_n} \frac{\partial e_i}{\partial p_n} \end{bmatrix}$$

$$\begin{bmatrix} \Delta p_0 \\ \Delta p_1 \\ \cdots \\ \Delta p_n \end{bmatrix} = \begin{bmatrix} -\sum_i \omega_i e_i \frac{\partial e_i}{\partial p_0} \\ -\sum_i \omega_i e_i \frac{\partial e_i}{\partial p_1} \\ \cdots \\ -\sum_i \omega_i e_i \frac{\partial e_i}{\partial p_n} \end{bmatrix}$$

As thus described, the use of the edge angle of the image as well as the edge strength thereof can add a direction component, thereby allowing stable positioning resistant to a noise component. Especially by use of differential processing on the image data, it is possible to perform a stable search less subject to fluctuations of luminance.

(Corresponding Point Search Line Filtering Processing)

Figure 23:
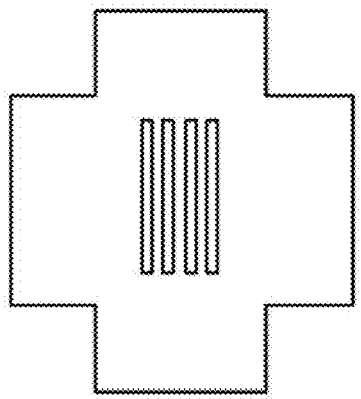
FIG. 23 is a schematic view showing an example of a certain registered image in which a corresponding point search line can be difficult to select.
Figure 24:
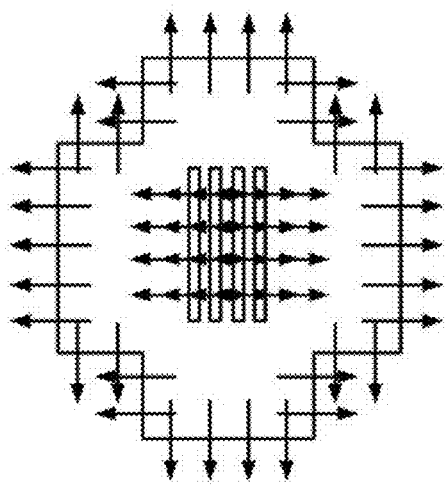
FIG. 24 is a schematic view showing a state where corresponding point search lines are automatically set on the pattern of FIG. 23.

Especially performing the search processing of the corresponding point search line on the registered image to select the corresponding point search line is highly likely to be difficult, such a position is preferably eliminated from the pattern search. For example, considering the case of a registered image as in FIG. 23 being present, when corresponding point search lines automatically set on this pattern are automatically set, those are set as in FIG. 24. As shown in this drawing, the corresponding point search line is set not only on the peripheral contour, but in a portion having a contrast difference which is located in the vicinity of the center of the inside. When the matching of the edge is performed by means of such corresponding point search lines set in the vicinity of the center, portions having similar edge angles are generated in large number. Consequently, when the pattern search is performed by use of these corresponding point search lines, it becomes more likely that the corresponding edge points become blurred in the corresponding edge point detection.

Figure 25:
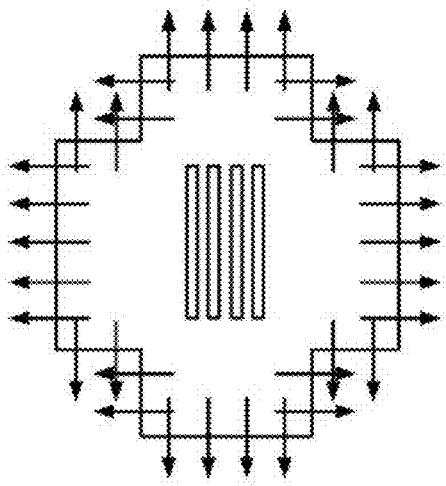
FIG. 25 is a schematic view showing a result of filtering of the corresponding point search lines.

In the present embodiment, such a blurred corresponding point search line is eliminated, to allow performance of a stable, highly accurate search. Specifically, the corresponding point search line set in such an unfavorable region is filtered by a corresponding-point-search-line filtering device, and when one having a similar edge strength and edge angle is present, this line is eliminated. FIG. 25 shows an example of a result of filtering the corresponding point search lines from FIG. 24.

Figure 26:
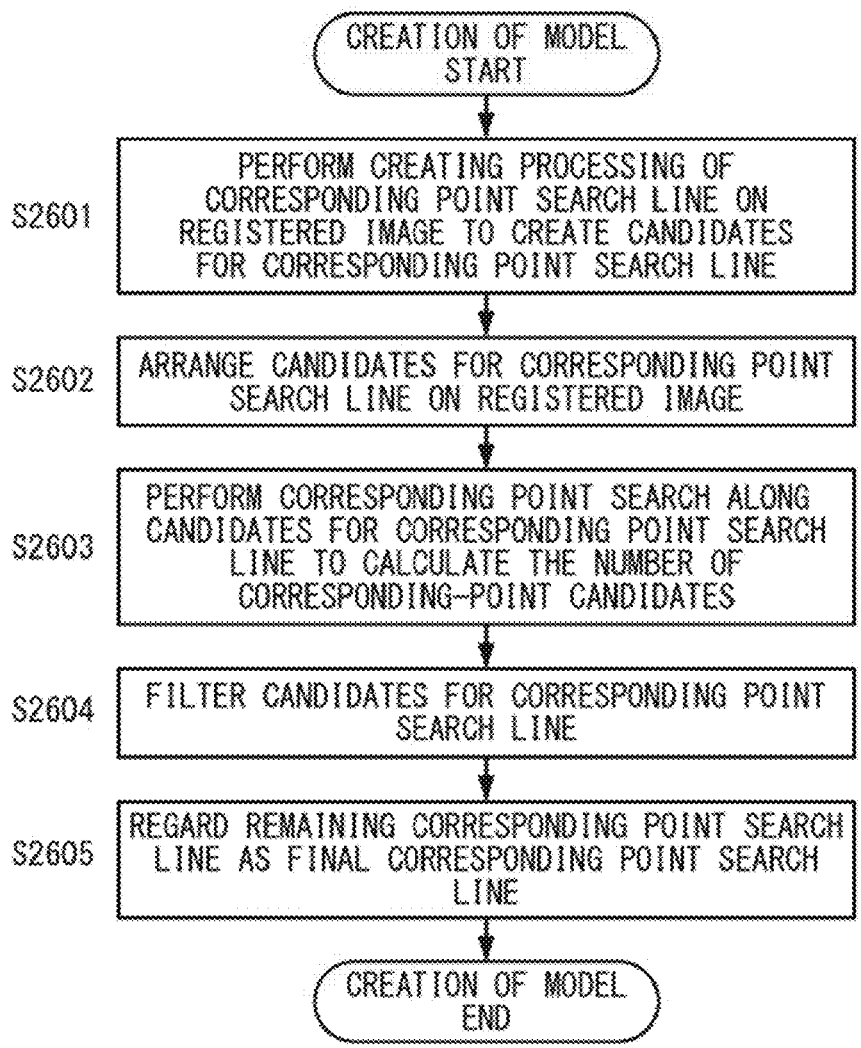
FIG. 26 is a flowchart showing a procedure for filtering processing of corresponding point search lines.

An example of a procedure for performing corresponding-point-search-line filtering processing on a candidate of the corresponding point search line in the above manner is described based on a flowchart of FIG. 26. First, in Step S2601, corresponding-point-search-line creating processing is performed on the registered image, to create candidates for the corresponding point search line. Next, in Step S2602, the candidates for the corresponding point search line are arranged with respect to the registered image. When arranged in a position where the corresponding point search line was created, the candidates for the corresponding point search line can be detected in the neighborhood of the medium of the candidates for the corresponding point search line.

Further, in Step S2603, the search of candidates for the corresponding point search line is performed along the candidates for the corresponding point search line, to respectively count the number of candidates for the corresponding point search line. Further, in Step S2604, the filtering processing is performed, and in the case of the number of candidates for the corresponding point search line being two or larger, the corresponding point search line there is determined to be highly likely to be blurred, and is thus eliminated from the candidates for the corresponding point search line. In Step S2605, the remaining corresponding point search lines are regarded as final corresponding point search lines. By this processing, an uncertain corresponding point search line is eliminated so that a more stable pattern search result can be expected.

It is to be noted that in the case of repeating the fine positioning step, since the line length of the corresponding point search line is made smaller in accordance with the repeated number of times, the corresponding point search line selected in the once performed filtering processing of the corresponding point search lines is previously recorded, and this information can be used in the repetition step. Alternatively, also in the case of shortening the corresponding point search line, similarly, the filtering processing of the corresponding point search lines is performed, and the corresponding point search line selected as a result of the processing can be recorded.

(Corresponding Point Search Line)

Further, by changing the line length of the corresponding point search line, it is possible to expect improvement in stability of the fine positioning and speeding up thereof. The line length of the corresponding point search line is decided based on a difference in reduction ratio between the coarse search and the fine positioning. For example, when the fine positioning is performed on the unmagnified image and the final coarse search is performed with a reduction ratio of one-fourth, the length is set to the degree of eight pixels (2*4=8).

(Chain Filtering Device 66)

In the above example, at least one reference point is set with respect to every segment. In the present embodiment, upon creating the segment, chains that constitute the segment are selected, to previously construct highly reliable segment and set the reference point in each segment. Selection or elimination of such specific chains is performed by the chain filtering device 66 shown in the block diagram of FIG. 1. Examples of a reference for selection of the chain by the chain filtering device 66 include an average edge strength and a chain length.

This chain filtering device 66 performs selection of chains upon registration and during motion. Upon registration, chains worth constituting the segment are extracted. Specifically, the filtering is performed so as to eliminate a chain having a small length not satisfying a predetermined chain length threshold and a chain having a low average edge strength not satisfying a predetermined edge strength threshold because even when the segment is created from these chains, the reliability of segment data is expected to be low.

Meanwhile, during motion, since a short chain is highly likely to be noise, whether or not to use the chain is selected in accordance with the state of the image to be searched. For example, the user sets a length threshold, to eliminate a short chain. In the following, these are sequentially detailed.

First, in the case of performing the filtering based on the average edge strength, the chain filtering device 66 performs the filtering by computing an average edge strength of the edge point included with respect to each chain, and comparing the computed value with a pre-set average edge strength threshold. Namely, a chain having a low average edge strength is eliminated, and only a chain having an average edge strength not smaller than the fixed strength is segmented. The reference point is set with respect to the obtained segment to create the pattern model so that the pattern search based on the edge with high accuracy can be expected and the search accuracy can be enhanced. The average edge strength threshold can be set by the user to such a degree as to include enough an edge strength to identify the contour of the pattern model.

Further, in the case of performing the filtering based on the chain length, the chain filtering device 66 performs the filtering by comparing each chain length with a pre-set chain length threshold. Namely, only a chain having a chain length not smaller than the fixed length is selected, and a chain shorter than that is eliminated, so that the pattern search based on the stable edge can be performed, to contribute to improvement in accuracy.

Meanwhile, the segment selecting device 67 for performing filtering on a segment configured of chains can also be used. Examples of a reference for selection of the segment by the segment selecting device 67 include, similarly to the above-mentioned chain filtering device 66, an average edge strength, a segment length, whether or not an edge angle image having a similar edge angle is present in the neighborhood, and elimination of uneven distribution of identical edge angles. Further, a short segment may not be simply eliminated uniformly, but the method for filtering a segment may be changed in accordance with the combination of the line and the circular arc constituting the segment. For example, in a case where a sufficiently long segment is extracted from aggregation of segments and the combination of these is estimated to find that one or more arc sectional segments are present, when one or more lines are also present, the shorter segments are considered unnecessary and these are thus eliminated or deleted. Further, in the case of every segment being the line, when three or more long segments are present, sufficient accuracy can be held even if the other shorter segments are eliminated. As thus described, the filtering by the segment selecting device 67 can be changed in accordance with the combination constituting the segment and an appropriate segment can be selected, so that the search can be executed more efficiently.

It should be noted that the segment length in this case means the length of the straight line or the curve from one end to the other of the line or the circular arc of each segment constituting the pattern model. Further, respective segment length thresholds for the line length and the circular arc length can be individually provided. The segment length threshold is set in accordance with the registered image, required accuracy, or the like, or can be set based on the average segment length of the registered image or the image to be searched.

Further, when the filtering is performed based on whether or not a segment having a similar edge angle is present in the neighborhood, the segment selecting device 67 determines whether or not another segment having a similar edge angle in the neighborhood in terms of the edge angle of the edge point included in each segment, and eliminates such a segment when it is present. Namely, considering the possibility that a pattern search result might not be stable due to the presence of the segment having a similar edge angle, such a segment is eliminated and the reference point is then set, thereby allowing enhancement of the stability of the pattern search result.
(Tentative Corresponding Edge Point)

Figure 29:
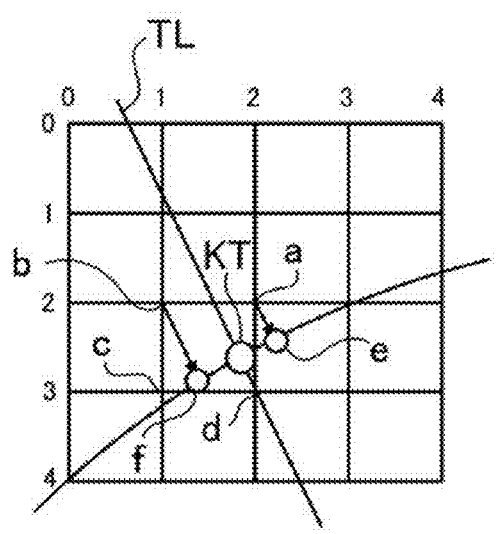
FIG. 29 is a schematic view for describing a procedure for finding a coordinate of a corresponding edge point.

Next, a procedure for finding the coordinate of the corresponding edge point corresponding to the reference point in the fine positioning is described based on FIG. 29. A corresponding edge point is first found on the corresponding point search line TL, and a corresponding edge point as the other of a pair is found. An average coordinate is found from these two points, and the obtained coordinate is regarded as a real corresponding edge point coordinate.

Specifically, in FIG. 29, the reference point KT is set in part of a circular arc segment (position indicated by a circle in the drawing), and the corresponding point search line TL passing through this point is extended from the upper left to the lower right. First, an edge strength of each point of the image to be searched is checked along the corresponding point search line TL. In the example of FIG. 29, the edge strength is found based on the reference point KT. The edge strength is checked at each of four points "a", "b", "c", and "d" as apexes of a grid shape including the reference point KT. A sub-pixel position of the point having the largest edge strength is found as a tentative corresponding edge point. Consequently, when "e" is computed as the tentative corresponding edge point as the sub-pixel position of the point "a", subsequently, a pair point corresponding to this tentative corresponding edge point "e" is selected. The pair point is selected such that the tentative corresponding edge point "e" and the pair point sandwich the reference point KT. It is assumed in this case that "f" is selected as the pair point. Further, an average coordinate is obtained from the tentative corresponding edge point "e" and the pair point "f". The obtained average coordinate is then treated as the real corresponding edge point coordinate.

In such a manner, computing of the corresponding edge point in corrugated shape can be suppressed, to obtain a stable computing result. Namely, in the case of performing the fine positioning between points, large positional displacement may occur between pairing with a point in a higher wave and pairing with a point in a lower wave, but such an influence can be reduced by the above technique.
(Method for Obtaining Coordinate of Corresponding Edge Point by Use of Neighborhood Edge Point)

Further, the method for finding a coordinate of a corresponding edge point in units of sub-pixels is not restricted to the above, but another method can also be used. For example, finding of the coordinate can also be realized in the following manner. The corresponding edge point on the corresponding point search line is searched in units of pixels, and the obtained point is regarded as the tentative corresponding edge point. A plurality of neighborhood edge points around this tentative corresponding edge point are found in units of pixels. The sub-pixel coordinates of the tentative corresponding edge point and the plurality of neighborhood edge points are found, and an average coordinate of these is then found. With this method, the position of the real corresponding edge point can be found by use of the tentative corresponding edge point and the plurality of adjacent neighborhood edge points, and hence the coordinate position of the corresponding edge point can be obtained with good accuracy in units of pixels. Further, not using the corresponding point search line but using a plurality of neighborhood edge points appropriately selected around the tentative corresponding edge point, the coordinate position of the corresponding edge point can be accurately decided in a simpler manner As the neighborhood edge point, an edge point located on the same contour or segment around the tentative corresponding edge point can be selected. Further, using an edge angle of the tentative corresponding edge point, a neighborhood edge point having a similar edge angle can be obtained. Preferably, with an edge angle direction of the tentative corresponding edge point set at the center, edge points adjacent to the right and left are respectively selected as the neighborhood edge points. Further, a distance from the tentative corresponding edge point to the neighborhood edge point is desirably close, for example within two pixels, preferably on the order of one pixel. This is because too far a distance causes deterioration in accuracy. In the following, a procedure for obtaining the coordinate of the corresponding edge point by use of the neighborhood edge points is described based on a schematic view of a FIG. 65 and a flowchart of FIG. 66.

Figure 65:
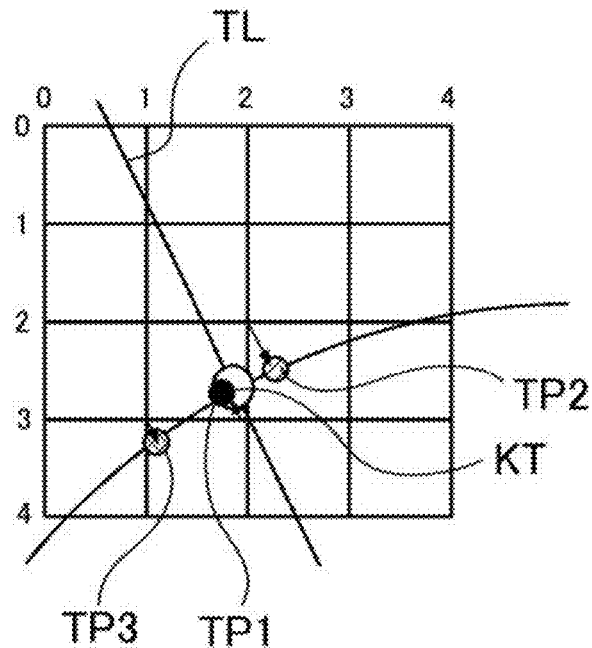
FIG. 65 is a schematic view showing a procedure for finding a coordinate of a corresponding edge point by use of the neighborhood edge points.
Figure 66:
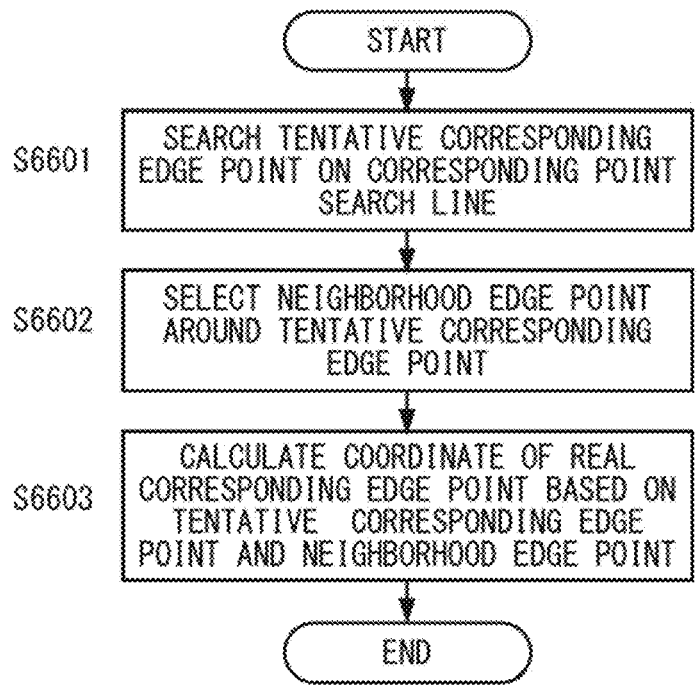
FIG. 66 is a flowchart showing a procedure for finding a coordinate of the corresponding edge point of FIG. 65.

First, in Step S6601, the tentative corresponding edge point is searched on the corresponding point search line in units of pixels. In FIG. 65, a shaded white circle is the reference point KT, and a position corresponding to the segment constituting the contour is found on the corresponding point search line TL passing through the reference point KT. The search is performed in units of pixels, namely with each intersection of grids in FIG. 65 regarded as a reference, and (x, y)=(2, 3) is selected in the pixel coordinate in this case.

Next, in Step S6602, the neighborhood edge point is selected in units of pixels around the tentative corresponding edge point in units of pixels. Since the edge angle of the tentative corresponding edge point has a vector in a direction superimposed on the corresponding point search line, edge points sandwiching the corresponding point search line and located to the right and left thereof, as well as having edge strengths not smaller than a predetermined value, are respectively selected as the neighborhood edge points. Specifically, a first neighborhood edge point located on the right side and a second neighborhood edge point located on the left side are selected. In the example of FIG. 65, a pixel coordinate of the first neighborhood edge point is (2, 2), and a pixel coordinate of the second neighborhood edge point is (1, 3). At this time, since the edge angles of the respective neighborhood edge points are edge points in the neighborhood of the tentative corresponding edge point, the neighborhood edge points are highly likely to have similar edge angles, and hence the edge angles need not to be checked. Needless to add, it is possible to select those edge points as the neighborhood edge points after checking high similarity of the edge angles thereof. It is to be noted that, when there is no edge point having an edge strength not smaller than the predetermined value in the neighborhood position, no neighborhood edge point is selected. In this case, a later-mentioned real corresponding edge point is calculated only through use of the obtained edge points (the tentative corresponding edge point and another neighborhood edge point). Further, although a total of two neighborhood edge points on the right and left are selected in this example, the number of neighborhood edge points selected can also be one or not smaller than three. However, the number is preferably two, considering the balance between the accuracy and load of the computing processing.

Moreover, in Step S6603, the coordinate of the real corresponding edge point is computed based on the tentative corresponding edge point and the neighborhood edge points. The coordinate position of the real corresponding edge point is decided as an average coordinate of sub-pixel positions of the tentative corresponding edge point and the neighborhood edge points. In the example of FIG. 65, the corresponding edge point is decided from an average of three points: TP1 indicated by a black circle as the sub-pixel position of the tentative corresponding edge point; TP2 indicated by a shaded circle as the sub-pixel position of the first neighborhood edge point; and TP3 indicated by a cross-hatched circle as the sub-pixel position of the second neighborhood edge point. The sub-pixel position of each edge point is previously computed from pixel values therearound. A known method can be applied to a method for computing a sub-pixel position. For example, the sub-pixel position can be calculated from pixel values of surrounding 3×3 pixels with each edge point set at the center thereof, or calculated by use of information on an adjacent edge point present in the edge angle direction, or by some other means. It should be noted that the timing for computing the sub-pixel position of each edge point is not particularly restricted, and the timing may be immediately after decision of the edge point in units of pixels or immediately before calculation of the average coordinate.

In such a manner as above, the corresponding edge point can be calculated from the average of the sub-pixel coordinates of the three edge points. With this method, the three edge points can be readily extracted from the tentative corresponding edge point, it is possible to decide a highly accurate corresponding edge point through use of many edge points. For example, in the case of the number of reference points being ten, the number of corresponding edge points is normally ten, but with the above method, the respective ten tentative corresponding edge points can be added with points to the right and left thereof, and hence the corresponding edge point can be calculated from the 30 edge points, thereby to improve the accuracy due to an averaging effect. Particularly, as compared with the foregoing method for finding the average coordinate from two points that are the pair point and the tentative corresponding edge point, this method is advantageous in terms of the accuracy since the average coordinate is found from three points that are the tentative corresponding edge point and the two neighborhood edge point added thereto. It is to be noted that three points are obtained and averaged in the above, the three points can be individually used in the fine-positioning calculation.

(Transformation of Edge Angle Image into Edge Angle Bit Image)

Next, transformation from the edge angle image into the edge angle bit image is described based on FIGS. 30 to 33. Upon taking the coarse-to-fine approach, it is not easy to set the reduced image in the first coarse search. This is because information on a characteristic amount necessary for the search may be lost by image reduction. Especially in the edge-based search, edge angle information is important for improvement in accuracy of the search. Therefore, in the present embodiment, the edge angle bit image creating device 69 and the edge angle bit image reducing device 78 are provided which are capable of holding the edge angle information even when the reduction ratio is made high upon reduction of the image by the thinning device 61, to reduce a data amount while keeping a sufficient characteristic amount, so as to seek speeding up of the processing.

In the following described is a procedure for acquiring edge angle information upon reducing the image by the thinning device 61 and holding this information. First, the edge strength of each edge point of the edge angle image is checked, and a bit corresponding to the orientation of the edge angle is set to one in the case of the edge strength being larger than a set edge strength threshold, and in the case other than that, the bit is set to zero. For example, a case is considered where the edge angle bit image is created by the edge angle bit image creating device 69 from the edge angle image of 2×2 pixels made up of the four pixels (edge points) "a" to "d" shown in FIG. 30. Each of the pixels "a" to "d" has an edge strength larger than the threshold, and also has an edge strength indicated by an arrow. This edge angle is expressed by eight kinds of edge angle bits that are 0 to 7 in accordance with edge angle sections representing the correspondence of the edge angle to the bit (Edge Angle Bit Image)

Upon transforming this edge angle image into the edge angle bit image, the edge angle information is transformed into the edge angle bits. The edge angle bit is a code that sections the edge angle direction with respect to each predetermined angle. To the edge angle section shown in FIG. 31, the same one as that in FIG. 6B described above can be applied. In the example of FIG. 31, a concentration gradient direction as the edge angle direction is sectioned into eight sections by 45 degrees, and the edge angle bit is allocated to each of the sections. This example is not restrictive. The sections may further be rotated counterclockwise by 22.5 degrees from the posture of FIG. 31, to be eight sections displaced by 22.5 degrees from the horizontal or vertical direction, and the respective edge angle sections may be labeled clockwise with E, SE, S, SW, W, NW, N, NE just from the right, each with a width of 45 degrees, and edge angle bit labels 0, 1, 2, 3, 4, 5, 6, 7 may then be added with respect to the respective edge angle sections (foregoing FIG. 52B). Naturally, such sectioning is exemplary, and for example, the edge angle can be sectioned into sixteen sections, four sections, or can further be three sections or five sections.

From the above, when the edge angle image data shown in FIG. 30 is transformed into a 2×2 edge angle bit image based on the edge angle sections of FIG. 31, the transformed image is as in FIG. 32. As thus described, the bits are set to edge angle sections corresponding to the respective edge angles with respect to the four edge points sectioned by the labels "a", "b", "c", "d".

As the method for acquiring an edge angle bit image, other than the technique for performing processing on only a portion not smaller than a certain edge strength threshold as described above, there is also a method for performing thinning processing by use of an edge strength image and an edge angle image, to acquire an edge angle bit image as described above by use of the edge angle image subjected to the thinning processing in order to acquire an edge angle bit image having a certain degree of width. In the case of the technique for performing the thinning processing, the processing time relatively takes long as compared with the foregoing technique, but there is the advantage of facilitating noise elimination since the contour portion of the object to be searched can be restricted.

(Reduction in Edge Angle Bit Image)

As thus described, after expression by means of the edge angle bit image, the data is reduced such that the edge angle information is sufficiently kept. Specifically, the data is synthesized such that "OR" or a bit sum of each edge angle bit of each pixel is taken with respect to each edge angle bit label. For example, in a case where the 2×2 data to be reduced is in the state of FIG. 32, when it is reduced into ½ long×½ side (=¼) to express the four pixels "a" to "d" by one pixel "a'", the reduced data is as in FIG. 33. As shown in this drawing, the edge bit of each pixel is synthesized in the edge angle bit reduced image where the edge angle bits of the pixels "a" to "d" are pulled together, and the edge angle bits are set up in columns corresponding to the edge angle bit labels 0 to 7. This processing of storing the edge angle information in the edge angle bit reduced image is performed by the edge angle bit image reducing device 78. Thereby, while the data amount is reduced, the edge angle information is held even after the reduction, and it is thus possible to keep enough characteristics for the search even when the reduction ratio is increased by repetition of the reduction.

The above compression processing can improve the conventionally problematic state where search processing speed becomes insufficient when the reduction ratio is suppressed so as to keep enough a characteristic amount for the search. Even when the reduction ratio for performing the edge detection is fixed to one-half, for example, a sufficiently high-speed search can be performed by processing of reducing the edge angle bit image with this reduction ratio. The reduction ratio for performing the edge detection can be automatically decided based on at least either the size of the registered image or the characteristic data of the pattern model. Further, the reduction ratio may be arranged so as to be independently set by the user.

An example of the procedure for reducing the edge angle bit image to create the edge angle bit reduced image is described based on FIGS. 34 to 37. Upon creating the edge angle bit reduced image, attention should be paid on a segmentation problem. Namely, it is possible that simply performing reduction processing by means of sub-sampling processing may cause occurrence of large variations in later-mentioned score calculation due to subtle displacement of a start coordinate of the processing or a position in the input image of the object to be searched. As reduction methods that avoid this segmentation problem, the following two methods can be considered.

The first method is a method for performing expansion after the reduction processing. This method is described taking an example of processing of reduction into 1/n (n=2) by use of FIGS. 34 and 35. First, the OR operation is performed on n×n edge angle bit data included in each rectangular region of FIG. 34. A result of the operation is replaced as edge angle bit data representing the edge angle bit data of each of the foregoing n×n regions. Performing this processing can reduce the image into 1/n of the original image.

Since leaving this reduced image in this state may cause occurrence of the segmentation problem, expansion is performed on this image. As in FIG. 35, the OR operation is performed on edge angle bit data in each of m×m (m=2 in this example) rectangular regions in the image after the reduction, and its result is replaced as edge angle bit data representing each of the m×m regions. In this processing, image reduction does not occur. "m=2" in this example, but it can be considered that "m" is increased in accordance with expected variations in shape and size of the object to be searched.

Another method is a method for taking rather a wide range for the OR operation to be performed in the above reduction processing and not performing subsequent expansion. Using FIG. 36, this method is described taking the case of processing of reducing the image into 1/n (n=2). The OR operation is performed on edge angle bit data of (n+m)×(n+m)(n=1, m=1) included in each rectangular region of FIG. 36. A result of the operation is replaced as edge angle bit data representing each of the n×n edge angle bit data in the vicinity of the center of the foregoing region. Performing this processing can reduce the image into 1/n of the original image. FIG. 37 shows the case of n=2 and m=1 in the second method.

Figure 36:
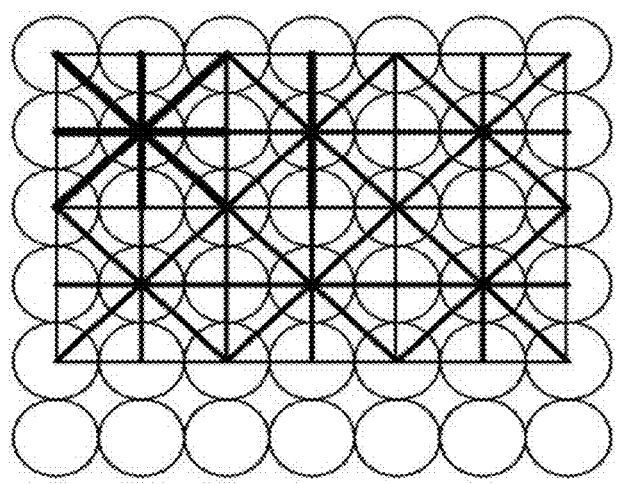
FIG. 36 is a schematic view for describing the state of reducing the original edge angle bit image into one-half.
Figure 37:
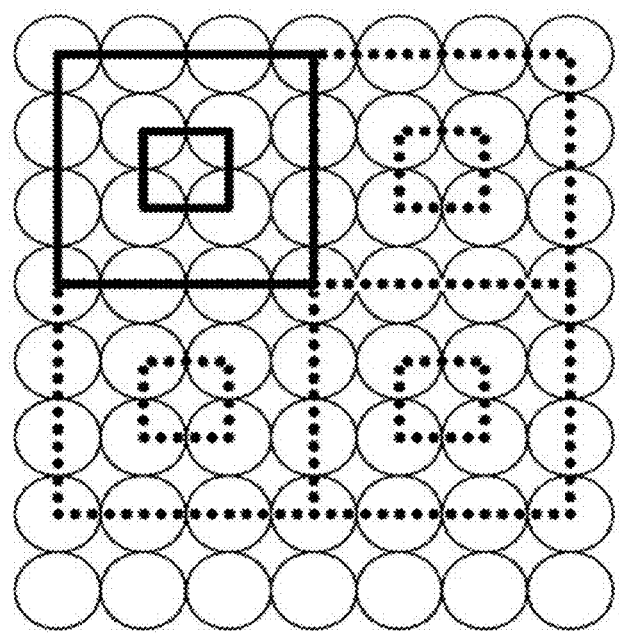
FIG. 37 is a schematic view for describing the state of reducing the original edge angle bit image into one-third.

As shown in FIG. 36, in the case of repeating normal reduction by 2×2 without expansion, the segmentation problem may occur. Namely, with a change in coordinate in the upper left of the search region by one pixel, a setting of pixels upon reduction changes, and hence the score calculation deteriorates regardless of the registered image being an identical image to the image to be searched. As opposed to this, performing the expansion brings about the advantage of not generating such a problem.

(Edge Angle Bit Transformation Processing in Angle Border)

Further, upon transformation of the edge angle bit, two bits are set up that correspond to two angle regions constituting an angle border when the edge angle is in the vicinity of the angle border, and hence the effect of improving the stability can be expected. For example, in the foregoing edge angle bit image of FIG. 31 obtained by transforming the edge angle image made up of the four pixels "a" to "d" shown in FIG. 30, when the edge angle is in the vicinity of the border between E and SE, the edge angle bit in the section of E may be set up, or the edge angle bit in SE may be set up, depending upon noise. It is expected that such swing causes a nonessential effect to be exerted on calculation of the coincidence. Therefore, when the edge angle is on the border, both edge angle sections that sectionalize the border are set to one. Thereby, the swing due to noise can be eliminated, and a stable calculation result of the coincidence can be expected. Specifically, when the edge angle is located within a predetermined width (e.g. 5.625 degrees) with the border of the edge angle sections set at the center, both of the edge angle bits facing the border are set to one.

It is to be noted that this edge angle bit transformation processing on an angle border is performed only in the case of the edge angle bit transformation processing on the object to be searched, and is not performed in the case of transformation of the edge angle bit of the pattern model. This is because also performing the same processing in the case of transformation of the edge angle of the pattern brings about an unnatural change in weight with respect to each edge point.

(Edge Angle Bit Adjacent Processing)

Further, although only one edge angle bit is set up in transformation from the edge angle image into the edge angle bit image in the above example, such edge angle bit adjacent processing can also be performed where a relevant edge angle section is set at the center and an edge angle bit is also set up in each of adjacent edge angle sections. For example, one edge angle bit each is given to the relevant edge angle section and edge angle sections adjacent to the right and left thereof. Further, such weighting is also possible that two edge angle bits are given to the relevant edge angle section and one edge angle bit is given to each of the edge angle sections adjacent to the right and left. Moreover, such weighting added with a fuzzy effect is also possible that three bits are given when the edge angle of the pattern model and the edge angle of the image to be searched sufficiently match, one bit is given when the angles are slightly displaced, and zero bit is given when the displacement is large.

Also in such edge angle bit adjacent processing, as described above, when the edge angle is present in the vicinity of the border, the effect exerted by swing due to noise can be considered. Hence in the case of the edge angle bit of the image to be searched being on the border of the edge angle sections, two bits are set up in each of the adjacent edge angle sections with the border set at the center, thereby to avoid the effect of the swing.

It is to be noted that, although the eight bits are used as the angle resolution of the edge angle in the above example, this is not restrictive, and transformation by a further higher angle resolution, such as 16 bits or 32 bits, can also be performed.

(Parallelization)

Figure 38:
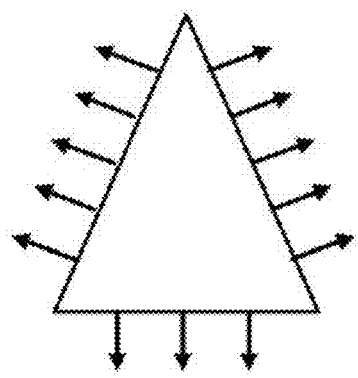
FIG. 38 is a conceptual view showing a pattern model before parallel processing.

Further, by parallelizing a value obtained by transforming the edge angle of the pattern model into the edge angle bit, speeding up of the search processing can be sought. FIGS. 38 and 39 show an example of parallelizing edge data of a pad. FIG. 38 is a conceptual view of a pattern model before parallelization, and FIG. 39 is a conceptual view of the pattern model after parallelization. As shown in these drawings, edge angle bit data on one reference point on the pattern model are laterally arranged in a plurality of number for parallelization, thereby enabling speeding up of the processing. A general CPU constituting a computing section is capable of performing parallel processing of four to eight bytes, and thus capable of performing quad-speed to octuple-speed processing. In such a manner, it is possible to speed up the coarse search by the parallelization processing.

(Coarse Search by Use of Edge Angle Bit Reduced Image)

In the following, a procedure for performing the coarse search by use of such reduction data is described. As for this edge angle bit reduced image, for example, when the size of the unmagnified image is 640×480 and the edge extraction is performed with a size of 320×240, one-half of the above, the size of the edge angle bit image subjected to compression processing into one eighth is 40×30. The search on this edge angle bit reduced image is performed as follows. First, upon registering the pattern model before the search processing, data as in FIGS. 40A and 40B is created. As shown in this drawing, the pattern model is held as an array of edge data having positional and angle information. FIG. 40A shows an example of the pattern model, and FIG. 40B shows an example of the pattern model of the edge data. In FIG. 40B, symbols x, y denote the coordinate position of the edge, and symbol θ denotes the angle of the edge. This pattern model is held as the array of the edge data having information on the coordinate position and the angle as shown in FIG. 40B.

Using the above data and the edge angle bit image of the image to be searched the position and the posture of the pattern is repeatedly changed, the coincidence is sequentially calculated with respect to each position and posture of the pattern. This calculation is performed as follows. First, an affine transformation value expressing a position and a posture, coincidences of which are wished to be checked, is decided. This affine transformation value is created also in light of the reduction scale of the pattern model and the reduction scale of the image to be searched. Using this affine transformation value, an edge position xi, yi and an edge angle θi are transformed. The edge position after the transformation is Xi, Yi and the edge angle after the transformation is φi. (i is a subscript expressing an index of the edge). This coincidence is calculated by transforming the edge angle φi into bit data in the same method as in the case of the image to be searched. A calculating expression for a coincidence S is expressed as follows:

$$S = \frac{\sum_i (EABI(X_i, Y_i) \,\&\, AngleToBit(\phi_i) != 0)}{\sum_i 1} \qquad \text{[Expression 16]}$$

EABI(x, y): the edge angle bit image of the image to be searched $X_i, Y_i$: the position of the reference point after the affine transformation AngleToBit (θ): function to transform an edge angle data into a bit data
$\phi_i$: edge angle on the expected reference point after the affine transformation
&: AND processing
!: if the left side is equal to the right side then 0, else 1

$$\sum_i:$$

sum of each reference point

As thus described, the fine positioning device 76 compares edge strengths and edge angles of the respective edge points included in the image to be searched and the pattern model. The coincidence S being high indicates a high probability of the presence of the pattern model in those position and posture. In such a manner, the state is improved where the processing speed is not sufficient when the search is performed as it is with the reduction ratio decided so as to keep enough a characteristic amount for performing the search. Further, since a sufficiently high-speed search can be performed even with the reduction ratio for performing the edge extraction fixed to one-half, it is possible to obtain the advantage of not having to decide the reduction ratio for performing the edge extraction, which is typically complex.

(Reduction Step for Image to be Searched)

With such reduction processing, enough characteristics for the search can be kept even with a high reduction ratio. Upon performing the edge extraction processing such as the Sobel filter on the image to be searched, when the unmagnified image of the original size remains unchanged, much noise is generated, which might be inappropriate for extracting characteristics for the coarse search. Therefore, in the present embodiment, the reduced image is created in advance and the edge extracting processing is then performed. Thereby, the averaging effect can be obtained by reduction of the image data, which also contributes to reduction in noise. The reduction ratio as a first reduction ratio (first reduction ratio) is set to one-half of the original size. With this size, a noise reducing effect can be obtained by the averaging while characteristics necessary for the search are sufficiently kept.

(Polarity of Edge Direction)

Further, with this method, the presence or absence of a polarity of the edge direction can be set. Thereby, the method for processing the edge angle in accordance with the polarity can be changed. Conventionally, such a concept of the polarity has not been considered, but only a concept of the edge direction (angle) has been considered, and hence there has been a problem in that, for example, the edge direction (angle) is treated as 0 to 180 degrees, resulting in that vectors with different orientations cannot be distinguished to cause occurrence of a wrong search. As opposed to this, in the foregoing method, 0 to 360 degrees are covered by considering the concept of the polarity so that a further accurate search is realized.

In the case of ignoring the polarity, the edge angle bit transformation on the object-to-be-searched side can be readily realized by processing of also setting up a reverse bit simultaneously. Otherwise, a bit can be uniformly allocated not to the orientation but to the edge direction. For example in the coarse search, eight edge angle bits as the edge resolution are uniformly allocated to the edge direction, so that a result of a search can be obtained where importance is attached not to the polarity of the edge but to the resolution of the direction of the edge.

(Fine Positioning Regarding Rotational Angle)

Figure 42:
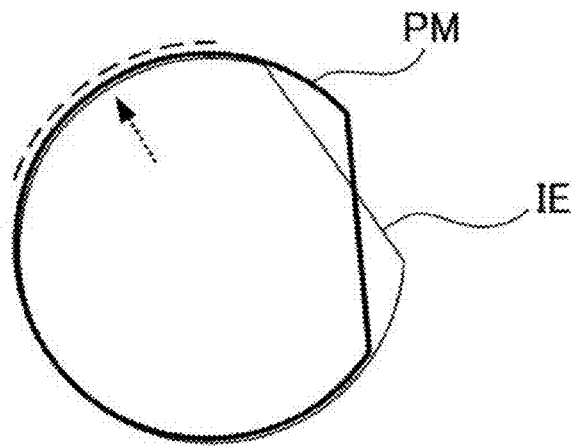
FIG. 42 is an image view showing a state where a coarse search has been performed by use of the pattern model of FIG. 41 on an input image, to perform a certain level of positioning.

Next, a procedure for performing fine positioning on a circular arc segment by means of the least squares method with a distance between a point and a circular arc regarded as an error angle is described based on FIGS. 41 to 45. Considered is the case of performing the fine positioning on the image to be searched by means of a pattern as the pattern model PM, expressing a partially notched circle by a circular arc segment and a line segment, as indicated by a thick line in FIG. 41. The pattern model PM of FIG. 41 is configured of one circular arc segment and one line segment, and such a work shape has generally been applied to a wafer provided with an orientation-flat surface, and the like. FIG. 42 shows a state where the coarse search has been performed on the image to be searched by means of this pattern model PM, to perform a certain level of positioning with the pattern model PM arranged in a position of a detection candidate. Considered is a state where the pattern model PM is almost superimposed on the edge point of the image to be searched and only the line segment of the notched section does not match. It is to be noted that in these drawings, the thick line indicates the pattern model PM, and a thin line indicates the edge point (input edge point IE) of the image to be searched. Further, a target point of the input edge point IE is indicated by a dashed arrow, and a tangent line SL at this input edge point is indicated by a broken line. It is to be noted that, although an actual tangent line SL is shorter and is present in the state of being superimposed on the pattern model PM of the thin line, the signal line is displayed longer in these drawings for the sake convenience of description.

When the fine positioning is performed from this state, it can be expected that the pattern model is relatively rotated so as to allow the line segment portions to match, namely in FIG. 42, the error does not necessarily become larger by the rotation even with the least squares method applied to the input edge point of the position indicated by the arrow in FIG. 42. The least squares method, in which not the distance between the point and the straight line but the distance between the point and the circular arc is regarded as the error function, is applied to the circular arc segment. Specifically, the least squares method is applied such that an absolute value of a difference between a radius of the circular pattern model and a radius of the edge point of the image with the center of the circular pattern model to be searched as the circular arc is regarded as the error value. Namely, the error function of the circular arc segment used in the least squares method is a difference between an ideal radius having the center of the circular arc segment and a distance between the center of the circular arc and the corresponding edge point. This error function of the circular arc segment can be expressed by the following expression:

$$e = abs(R_{ideal} - \sqrt{(x-x_c)^2 + (y-y_c)^2})$$ [Expression 17]

$R_{ideal}$: an ideal radius
$(x_c, y_c)$: a center coodinate of a circular arc
$(x, y)$: corresponding edge point $$e = abs((x-x_c)^2 + (y-y_c)^2 - R_{ideal}^2)$$ [Expression 18]

Figure 43:
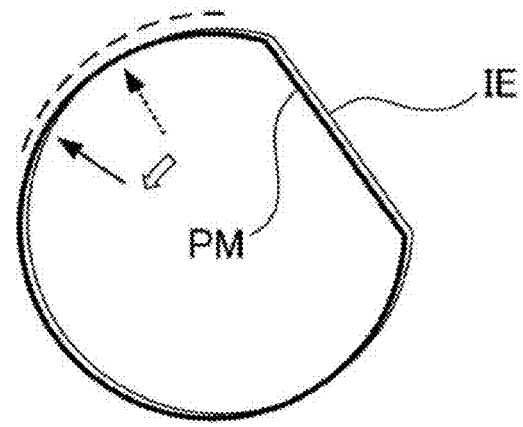
FIG. 43 is an image view showing a state where fine positioning has been performed from the state of FIG. 42 by application of a least squares method with a distance between a point and the circular arc regarded as an error function.

$R_{ideal}$: an ideal radius
$(x_c, y_c)$: a center coodinate of a circular arc
$(x, y)$: corresponding edge point Consequently, as shown in FIG. 43, the distance between the input edge point of the arrow and the circular arc model does not change much. Namely, this means that counterclockwise rotation of the pattern model PM as shown in FIG. 43 can be generated as a solution to a sufficient degree. It is thereby possible to expect achievement of high accuracy in the angle on the circular work in the fine positioning performed in a small number of times. It is to be noted that in the examples of FIGS. 42 and 43, the circular region indicated by the dotted line is in practice superimposed on the thin line of the pattern model, but is slightly displaced and displayed in these drawings for the sake of convenience of description.

Figure 47:
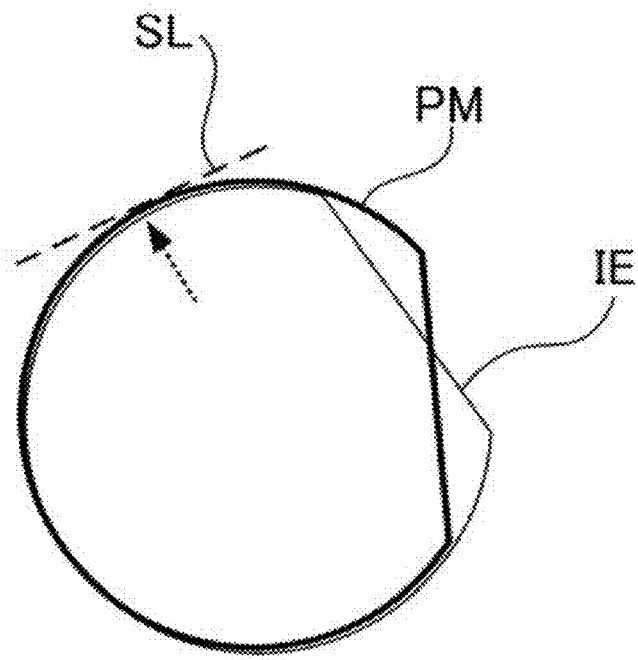
FIG. 47 is a conceptual view showing a state where the coarse search has been performed on the circular work, to complete a certain level of positioning.
Figure 48:
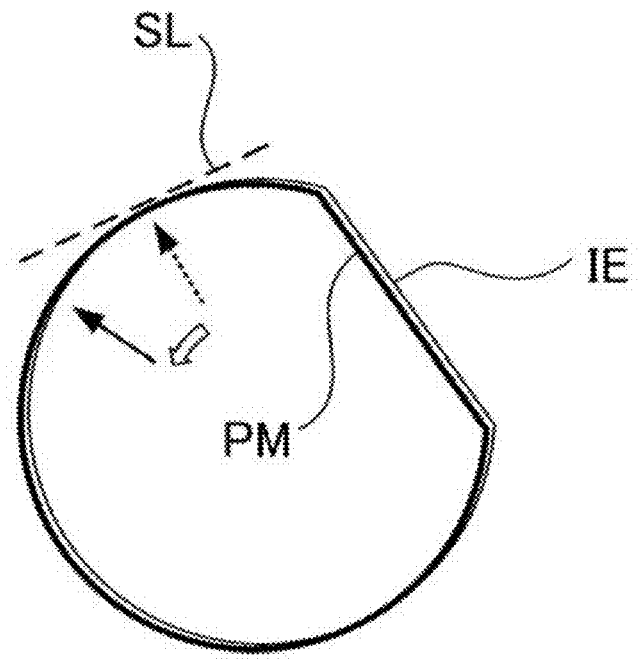
FIG. 48 is a conceptual view showing a state where the fine positioning has been performed from FIG. 47 in an attempt to superimpose the pattern model on the image to be searched.

Meanwhile, in the conventional least squares method, a distance between the input edge point and the tangent line has been regarded as the error function, and the pattern model has been moved so as to shorten this distance. It can thus be thought that the pattern model is not rotated in a proper rotational direction and this thus has the opposite effect of increasing positional displacement. For example, there have been cases where rotating the pattern model PM counterclockwise as shown in FIG. 48 from the state of FIG. 47 cannot be expected. Namely, when the pattern model PM is rotated as shown in FIG. 48 from the state of FIG. 47 where the relation between the input edge point and tangent line is formed in a position indicated by an arrow, the rotation is performed in a direction in which the input edge point detaches from the tangent line, resulting in that such a rotation cannot be generated as a solution. As opposed to this, in the present embodiment, since the foregoing least squares method with the distance between the point and the circular arc regarded as the error function is applied, it is possible to expect achievement of high accuracy in the angle on the circular work in the fine positioning performed in a small number of times.

(Corresponding Edge Point Creating Processing)

Figure 44:
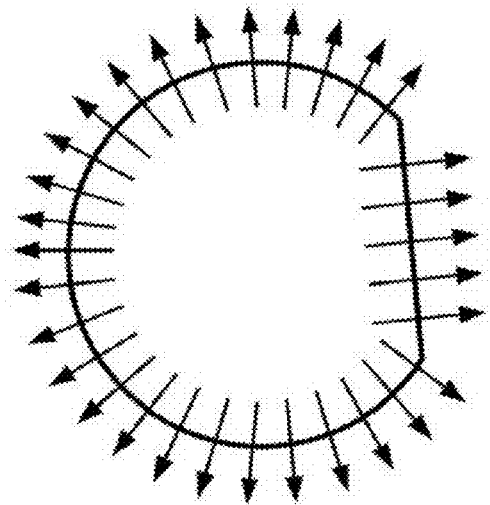
FIG. 44 is an image view showing an example of performing creating processing of a corresponding point search line on the pattern model of FIG. 41.
Figure 45:
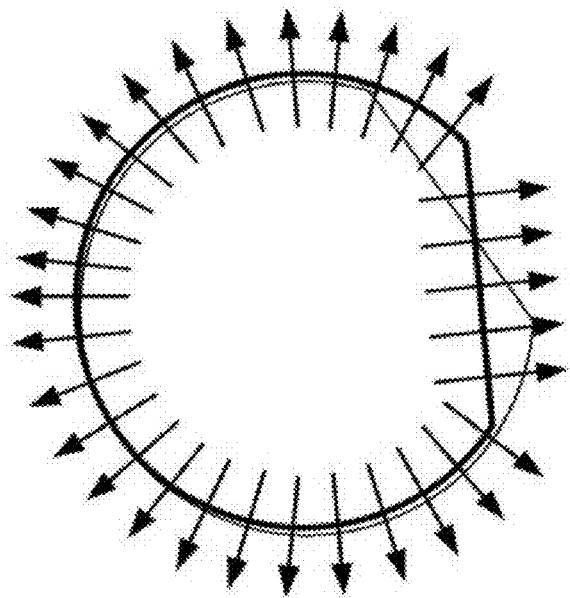
FIG. 45 is an image view showing a state where the coarse search has been performed on an image to be searched by use of the pattern model of FIG. 44, to superimpose the pattern model at a position and posture decided by the search.

FIG. 44 shows an example of further performing creating processing of a corresponding point search line on the pattern model of FIG. 41. As thus shown, one reference point is allocated to the center of each of the circular arc segment and the line segment, and reference points are set from each of those points at fixed intervals except for the vicinities of the end edges of the segments. Further, corresponding point search lines are set from the inside to the outside in the direction of the normal to the segments on the respective reference points. FIG. 45 shows a state where the coarse search has been performed on the image to be searched by use of this pattern model, and the pattern model PM has been superimposed on the position and posture of the decided detection candidate.

In this state, the edge extraction is performed along each corresponding point search line, to search the corresponding edge point with respect to each segment. Since the corresponding edge point is a point at which each corresponding point search line and the edge point (thin line) of the image to be searched intersect, for example in FIG. 45, points indicated by x are the corresponding edge points. In the example FIG. 45, since the circular arc sections of the pattern model arranged in the position of the detection candidate obtained as a result of the coarse search and the input edge point almost match, the corresponding edge point of the circular arc segment and the circular arc segment almost match. Therefore, even when the circular work is relatively rotated, the error function of the circular arc does not increase, and hence this degree of freedom does not inhibit the rotation. It is therefore possible to expect the rotational movement to be a solution.

On the other hand, many of corresponding edge points of the line segment are not on the line segment. In the least squares method to be performed on the line segment, since the distance between the point and the straight line is regarded as the error function, it is estimated that counterclockwise rotation totally reduces a value of the error function. It is found therefrom that it can be expected to a sufficient degree to obtain counterclockwise rotation as a solution obtained by the least squares method.

(Weighing Processing in Case of a Plurality of Corresponding-Edge-Point Candidates being Present)

Figure 49A:
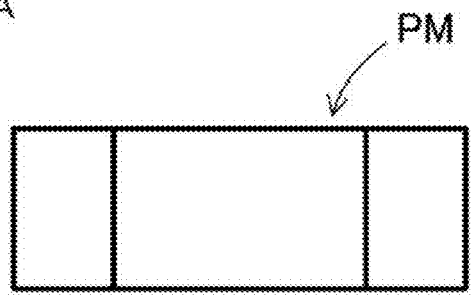
FIGS. 49A to 49D are schematic views each for describing weighting processing in the case of a plurality of corresponding-edge-point candidates being present.
Figure 49B:
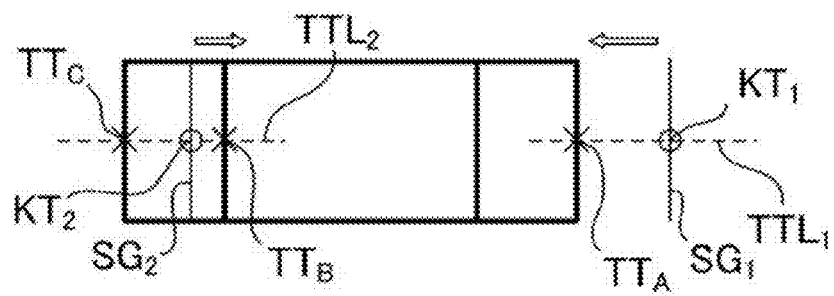
Figure 49C:
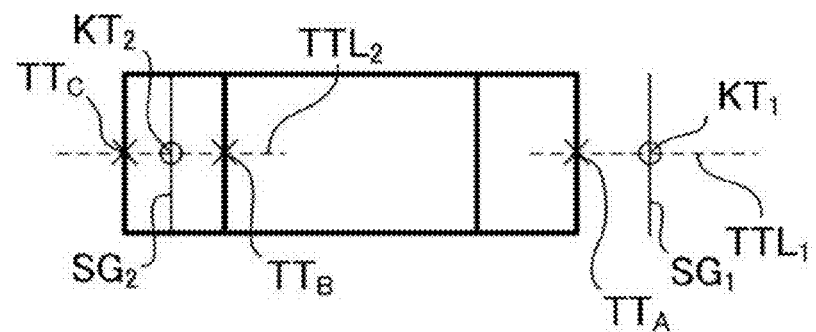

Furthermore, when a plurality of corresponding-edge-point candidates corresponding to the reference point are present, weighting can be performed on each corresponding edge point, so as to improve the accuracy in the fine positioning in a case where the corresponding edge points are ambiguously decided. This condition is described based on FIGS. 49A to 49D. An example of performing the fine positioning is considered using, as the pattern model, the pattern model PM that is a rectangle with two longitudinal lines drawn therein as indicated by thick lines in FIG. 49A. In this case, it is assumed that segments SG1 and SG2 as indicated by thin lines in FIG. 49B are obtained in the coarse search. In FIG. 49B, only the two segments SG1, SG2 located to the right and left of the work are considered. Corresponding point search lines TTL1, TTL2 of these segments are set in the directions of the normals (edge directions) to the respective segments SG1, SG2 passing through the reference points KT1, KT2 as described above. When the corresponding point search lines TTL1, TTL2 are set at the respective reference points KT1, KT2 as indicated by broken lines with respect to the respective segments SG1, SG2, corresponding-edge-point candidates located at the respective corresponding point search lines TTL1, TTL2 can be obtained. While only one corresponding-edge-point candidate TTA is obtained with respect to the right-side segment SG1, two corresponding-edge-point candidates TTB, TTC are obtained with respect to the left-side segment SG2. Since a corresponding edge point that is the closest to the reference point is selected out of the corresponding-edge-point candidates and decided as the corresponding edge point, TTA and TTB each become the corresponding edge point. In the example of FIG. 49B, since a plurality of corresponding-edge-point candidates are present with respect to the left-side segment SG2, it can be regarded that ambiguity is included. In this case, the issue is in which direction the segment, namely the pattern model, is to be moved. Especially in the case of FIG. 49B, when the whole segment, namely the pattern model, moves to the right as a result of selection of TTB as the corresponding edge point, it moves in the reverse direction to desired fine positioning, which is not preferred.

Figure 49D:
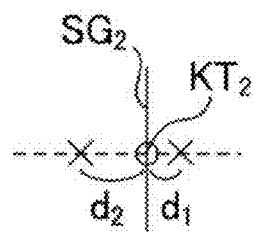

Therefore, upon performing the calculation of the least squares method, each corresponding edge point is weighted. In the example of FIG. 49B, since only one corresponding edge point TTA is present on the corresponding point search line TTL1 of the reference point KT1 with respect to the right-side segment SG1, a weight of "1.0" is given. On the other hand, concerning the left-side segment SG2, the corresponding-edge-point candidates TTB, TTC are located to the right and left of the reference point KT2 sandwiched therebetween on the corresponding point search line TTL2 of the reference point KT2. Therefore, weighting of the corresponding edge point TTB with regard to the reference point KT2 is set in accordance with a distance from the reference point KT2 to each corresponding-edge-point candidate. As an example of an expression for deciding weighting, as shown in FIG. 49D, when a distance between a first corresponding-edge-point candidate and the reference point is dl, and a distance between a second corresponding-edge-point candidate and the reference point is d2 (d1≦d2), $$\text{Weighting } W = 1 - \alpha(d1/d2)$$

where $0 < \alpha < 1$.

In the above expression, W=1 in the case of the number of corresponding-edge-point candidates being one, and W is smaller in the case of the number being more than one. As thus described, by increasing weighting in the case of the number of corresponding-edge-point candidates being one, namely in the case of no blurring, a movement in a more probable direction can be expected. Further, in the case of the number of corresponding-edge-point candidates being more than one, while the closest corresponding-edge-point candidate is regarded as the corresponding edge point, the positional relation between the corresponding edge point and the corresponding-edge-point candidate is the above expression: W=1−α (shorter distance)/(longer distance), when an ideal point is sandwiched, and "W=1" when the ideal point is not sandwiched. After such a weighting operation and weighting, the segment movement direction is decided by the fine positioning device 76 included in the computing device 6 of FIG. 1 as a weighting computing device.

(Score Calculation)

Further, upon performing the fine positioning calculation by use of the least squares method, a score indicating a similarity can also be calculated. Namely, the least squares method is applied to the corresponding point search line, and the score is calculated by a ratio between the number of corresponding points and the number of reference points in the final least squares method processing. In a simplified manner, a value obtained by subtracting the number of corresponding points by the number of reference points is considered as the similarity, and the can be found by the following expression:

$$S = \frac{\sum_{i=1}^{n} 1}{\sum_{i=1}^{m} 1} = \frac{n}{m}$$

[Expression 19]

S: score
n: the number of corresponding points
m: the number of reference points Further, a similarity of an ideal edge angle of the reference point and the edge angle of the corresponding edge point can also be reflected to the score. In this case, a ratio of a total of weights each obtained from a difference between the edge angle of the corresponding edge point in the final least squares method processing and the edge angle of the reference point corresponding thereto, and the number of reference points is calculated as the score. Specifically, it can be computed by the following expression:

$$S = \frac{\sum_{i=1}^{n} \omega(|\theta_i - \theta_i^p|)}{\sum_{i=1}^{m} 1}$$

[Expression 20]

S: score
n: the number of corresponding points
m: the number of reference points
ω(x): function that is 1 when x=0, and monotonously decreases with increase in x
θi: edge angle of corresponding point
θip: angle of reference point corresponding to corresponding point (ideal angle of reference point)

The ideal edge angle of the reference point is the direction of the normal to the line when the segment is the line, and superimposed on the corresponding point search line. In this method, a setting is made such that the smaller the difference between the edge angle of each corresponding edge point and the ideal edge angle of the reference point corresponding to the corresponding edge point, the more the weight approaches 1, and on the contrary, the larger the angle difference, the more the weight approaches to 0. For example, the weight is set so as to be 0 in the case of the angle difference being 0 to 18 degrees, to be 0.1, . . . , in the case of the angle difference being 18 to 36 degrees, and to be 1 in the case of the angle difference being 162 to 180 degrees. In such a manner, a weight is computed with respect to each reference point and finally obtained weights are averaged, to compute the score.

In the example of FIG. 49B, a weight of 1 is given to the right-side corresponding edge point A, and a weight of "0.9" is given to the left-side corresponding edge point B. This results in that an action to move the pattern model to the left side is exerted on the right-side segment SG1 and an action to move the pattern model to the right side is exerted on the right-side segment SG2. Therefore, putting these together, the weight intended for movement to the left side is 1.0 and the weight intended for movement to the right side is 0.9, and consequently, the pattern model is moved to the left side, to come into a state as in FIG. 49C. Similarly, weighting is performed again from the state of FIG. 49C, and movement processing is repeated based on a result of the weighting, to determine final fine positioning. As thus described, the direction in which the pattern model is to be moved upon positioning is estimated by weighting in accordance with the distance between the corresponding-edge-point candidate and the reference point, and the positioning is then performed. It is thereby possible to move the pattern model in a relatively probably direction, so as to expect improvement in reliability and stability of the positioning.

(Method for Selecting Segment in Consideration of Positioning Direction)

Such a case as above can occur especially when many line segments are concentrated in a specific direction. In the example of FIG. 49B, the segments are present only in the longitudinal direction (Y-axis direction), and accurate positioning can thus be expected in the X-axis direction. On the other hand, since no line segment extending in the lateral direction (X-axis direction) is present, the Y-axis direction cannot be defined, to make the positioning in this direction ambiguous. Therefore, upon selecting segments constituting the pattern model, segments in the orthogonal relation, such as in the X-axis direction and the Y-axis direction, are intentionally selected for preventing the positioning directions from being concentrated in a specific direction, so that a stable positioning result can be expected. In the following, a method for selecting a segment in consideration of a positioning direction is described based on a flowchart of FIG. 50.

First, in Step S4901, in a state where a plurality of segment candidates have been obtained, the segment candidates are sorted in order of length. It is to be noted that in the case of the circular arc segment, the length of the circular arc is regarded as the segment length.

Next, in Step S4092, the longest segment candidate is selected as the segment, and also set as a reference point segment. The direction of the normal to this reference segment is regarded as a reference angle. It should be noted that, when the circular arc segment is selected, the reference angle comes into an ineffective state. When the reference angle is ineffective, a conjugated segment is selected not by means of the angle but only the length of each segment candidate.

Figure 51A:
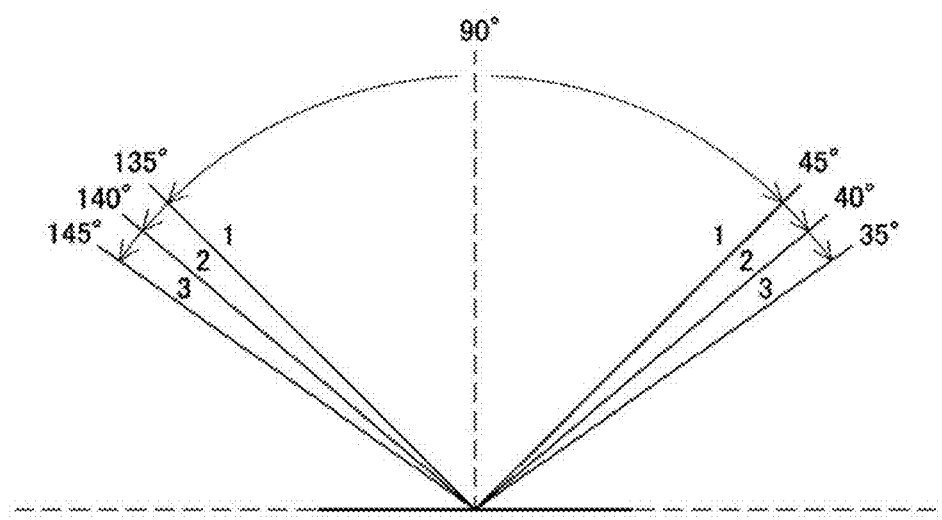
FIGS. 51A and 51B are schematic views each for describing the state of updating a setting of an angle range in FIG. 50.

Further, in Step S4903, the segment candidates as the conjugated segment with respect to the reference segment are extracted. It is searched from the reference angle whether or not the segment candidate included within a predetermined angle range, a first angle range in this case, is present. FIG. 51A shows an example of the first angle range. The segment candidate is extracted which is included within the range of ±45 degrees with the direction of the normal to the reference segment (90 degrees) set at the center, namely the range of 45 to 135 degrees, the range of 90 degrees in total.

Figure 51B:
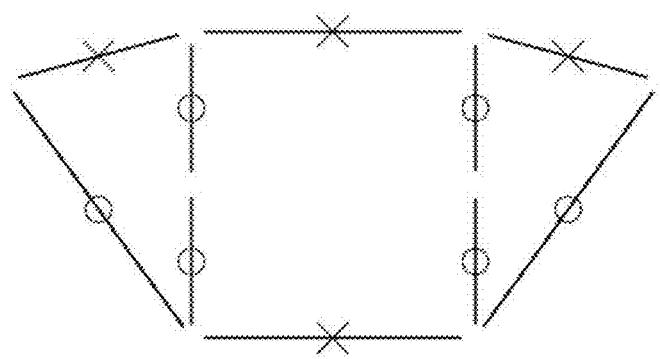

In the example of the segment candidates shown in FIG. 51B, segment candidates with "○" marked thereon are extracted, and segment candidates with "x" marked thereon are eliminated. When the line segment is selected as the conjugated segment, the reference angle becomes the direction of the normal to that segment, and comes into an effective state. When the segment is not the line but the circular arc segment, it is unconditionally extracted. This is because, in the case of the circular arc segment, a change in angle is expected to be large and can thus be useful information. Further, in the case of the circular arc, the state of the reference angle remains unchanged.

When the segment candidates are extracted, the process goes to Step S4901-1, the longest segment candidate among the extracted segment candidates is selected as the segment, and is also set as the conjugated segment with respect to the reference segment. Further, in Step S4905, it is determined whether or not the number of already selected segments has reached a predetermined number. When it reaches the predetermined number, the processing is completed. When it has not reached the predetermined number, the process goes to Step S4906, and a new reference segment is set again as the conjugated segment. Thereafter, the process returns to Step S4903, to repeat the processing. It should be noted that, in the case of the circular arc segment being selected as the conjugated segment and the circular arc segment being regarded as the reference segment, the selection of the conjugated segment is made in accordance not with the angle but with the length alone as described above when the reference angle is in the ineffective state, and the extraction of the conjugated segment is made by performing the same processing as the foregoing show when the reference angle is in the effective state.

Meanwhile, when no segment candidate included within the first angle range is present in Step S4903, the process goes to Step S4904, and it is searched in the same manner as above whether or not a segment candidate is present which is included within a second angle range expanded from the first angle range. In the example of FIG. 51A, the range of 40 to 140 degrees, expanded by ±5 degrees from the first angle range, is set as an example of the second angle range. When the segment candidate is found, the process jumped to Step S4904-1, and in the same manner as above, the longest segment is selected and set as the conjugated segment.

When no segment candidate is found even within the second angle range, in Step S4904-3, it is further searched in the same manner as above whether or not a segment candidate is present which is included within a third angle range further expanded from the second angle range. In the example of FIG. 51A, the range of 35 to 145 degrees, further expanded by ±5 degrees from the second angle range, is set as an example of the third angle range. When the segment candidate is found, the process jumped to Step S4904-1 in the same manner as above, and the longest segment is selected and set as the conjugated segment. When no segment candidate is found, the process goes to Step S4902, and the longest segment among the segment candidates is re-selected as the reference segment. It should be noted that the numeral value of the angle range, the number of times of re-settings of the angle range, and the like can be changed as appropriate. For example, when no segment is found in Step S4094-3, a search in a further expanded angle range may be performed. On the contrary, Step S4904-3 may not be performed, and when no segment is found in Step S4904-2, the process may be immediately returned to Step S4902 to reset the reference segment.

As thus described, since the operation of selecting the conjugated segment close to the orthogonal direction to the reference segment is repeated and as a result, the segment with a dispersed angle is selected, the stability of the positioning can be improved. The segment is selected in such a manner by the segment selecting device 67 of the segment creating device 68.

(Pattern Characteristic Selecting Function)

Figure 67:
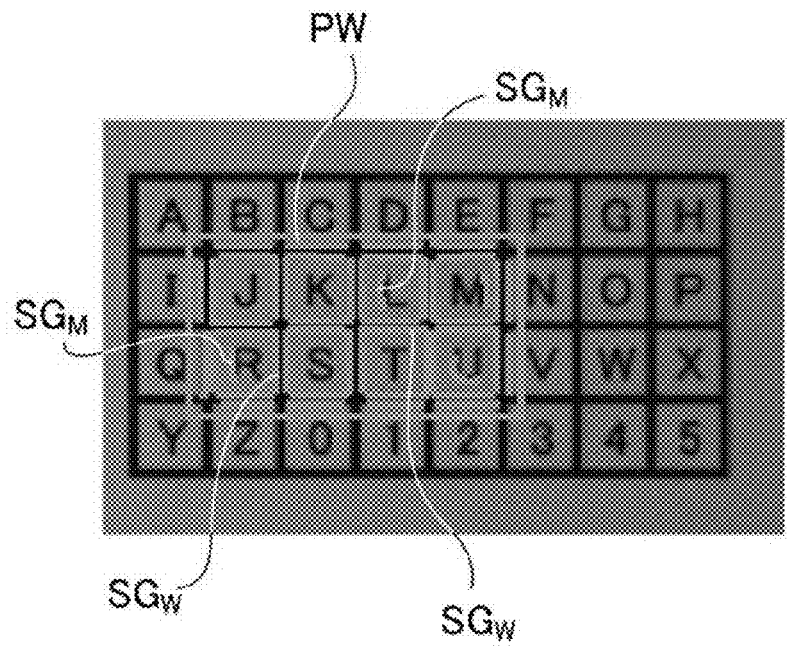
FIG. 67 is an image view showing the state of setting a pattern model in a registered image where characters are displayed in frames.

Further, a pattern characteristic selecting function can also be provided which is capable of changing selection criteria for the segment constituting the pattern model in accordance with characteristics of the pattern obtained from the object to be searched. Specifically, it is especially effective in a registered image as shown in FIG. 67. In the registered image in FIG. 67, different characters and numerals are displayed in grid frames. When the pattern window PW is set on such an image, as shown in FIG. 67, many segments SGW are set in frame portions whereas few segment SGM are set in the characters inside the frames in the created pattern model. In such a pattern model, the positioning is performed only in the frame portions, resulting in that the characters inside the frames are ignored or importance is not attached thereto, to make the characters difficult to recognize, and thereby, the positioning may be failed due to positional displacement in units of frames or the like.

This is caused by the selection criteria for the segment. Namely, a long segment has been preferentially selected from the conventional viewpoint that eliminating the noise component and attaching importance to a more clearly detected edge point leads to improvement in positioning accuracy. This is because a short contour is considered to have a large number of noise components, and based on assumption that a longer line segment adversely extracts more accurate edge information, a setting has been made to automatically select the segment from long line segments. In other words, there have not hitherto been present an image processing method and the like for making a short line segment preferentially selectable. Therefore, in the example of FIG. 67, since the edge detection tends to be relatively easy and clear in the frame portion surrounded by the straight lines, the segment created in the frame portion becomes more apt to be selected, leading to failure of the positioning as described above. Especially in the coarse search, since it is a simple search and thus not all contour information on the extracted edge, chain segment and the like are used but only part of the contour is selected, when the preferentially selected contour does not contribute to accurate positioning, the problem of such an erroneous selection occurs.

As opposed to this, in the present embodiment, a function capable of selecting the contour in ascending order of length from the shorter contour is set, so as to obtain an appropriate search result in accordance with the registered image. Further, elimination of the noise component is realized by setting a threshold and eliminating a line segment with a length not larger than the predetermined length. Consequently, while the noise component is effectively eliminated, a highly reliable search result can be obtained.

(Sorting in Order of Contour Length)

Figure 68:
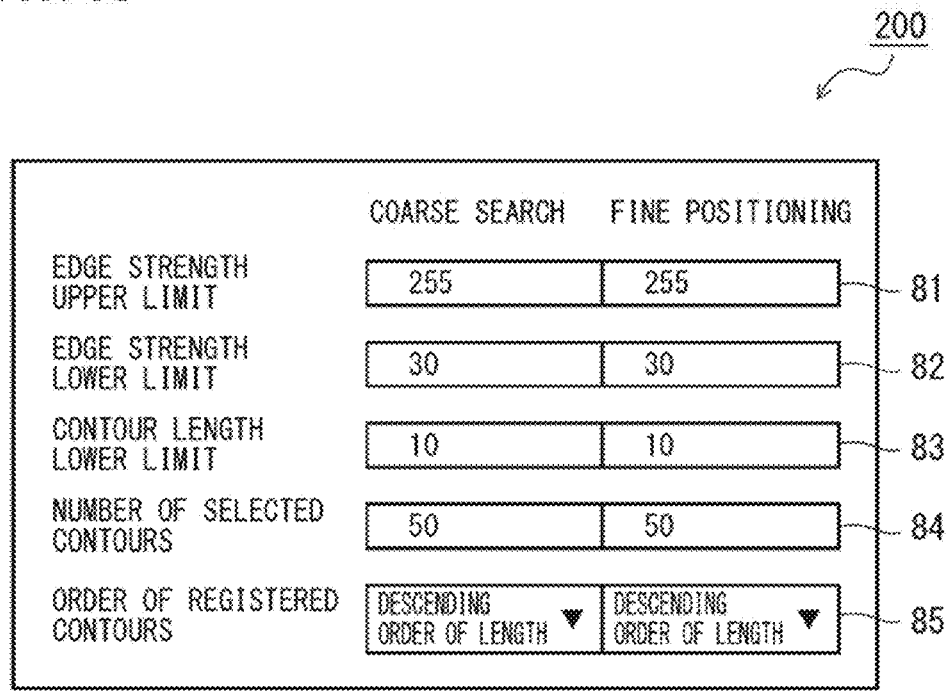
FIG. 68 is an image view showing a user interface screen for setting a pattern characteristic selecting function for performing sorting in order of length in an image processing program.

Next, two methods for selecting a short contour are described. First, a method for sorting contours in order of length and selecting a predetermined number of contours from a short one is described based on a user interface screen of FIG. 68. FIG. 68 is an image view showing a user interface of an image processing program setting screen 200 of the pattern characteristic selecting function for appropriately selecting a contour constituting a pattern model of a registered image. In this screen, the user can make respective settings for the coarse search and the fine positioning, regarding respectively as setting items an edge strength lower limit 82, a contour length lower limit 83, a number of selected contours 84, and an order of contour registration 85. Among them, the items regarding the pattern characteristic selecting function are the contour length lower limit 83, the number of selected contours 84 and the order of contour registration 85.

A range for detection as the edge is defined by the edge strength upper limit 81 and the edge strength lower limit 82, and such a filtering condition as to eliminate an edge strength higher than the upper limit value or lower than the lower limit value is designated.

(Contour Length Lower Limit Setting Device)

The contour length lower limit 83 functions as a contour length lower limit setting device for setting a lower limit for detection as the contour. Namely, the contour shorter than a lower limit value defined by the contour length lower limit 83 is filtered by a length filter. This can eliminate noise appeared as the short contour. Further, with this value made adjustable by the user, the strength of the filtering can be appropriately adjusted in accordance with a used environment and application of the filtering. Further, the contour length lower limit may be a fixed value depending upon the environment.

(Number-of-Selections Deciding Device)

The number of selected contours 84 functions as a number-of-selections deciding device for defining the number of contours selected. Defining the upper limit of the number of contours used as the pattern model can simplify the pattern model to reduce a processing amount, thereby to seek reduction in search time. Further, with the number of selections increased, the processing amount increases, but on the other hand, a highly accurate search result can be expected. It is to be noted that setting the number of contours selected to a fixed value (e.g. 50) can seek simplification of the setting operation as described above.

(Order-of-Selections Deciding Device)

The order of contour registration 85 functions as an order-of-selections deciding device capable of switching the order of selecting contours between ascending order and descending order of contour length. Thereby, in accordance with an image as an object for image processing, an appropriate selecting method of ascending order or descending order of length is set so that image processing with more flexibility and higher accuracy can be performed.

By setting the above setting items, such an extremely short contour as to be close to noise is filtered out of a plurality of contours, and the contours are made selectable sequentially from the shorter one, to effectively eliminate the noise component and also appropriately select a segment that exerts an influence on the positioning accuracy so that an efficient pattern model can be constructed.

Figures 69, 70:
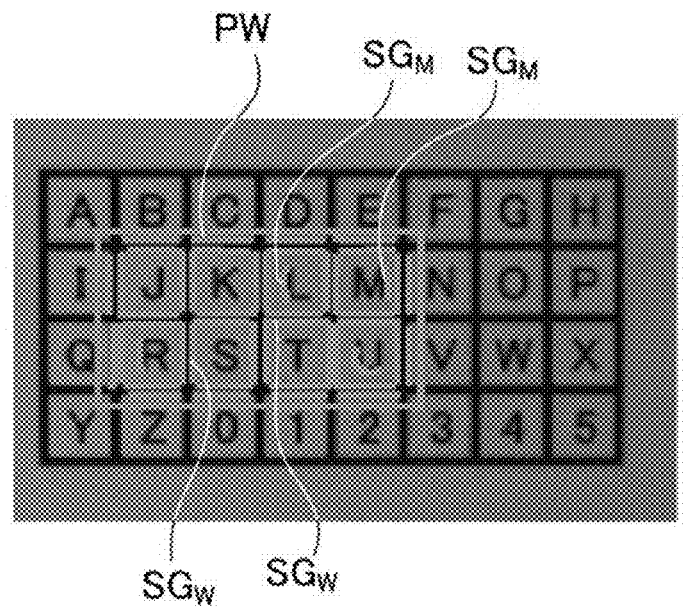
FIG. 69 is an image view showing a segment selected as a pattern model in a registered image where different characters and numerals are displayed in grid frames.
FIG. 70 is an image view showing a state where the contour registering order has been set to "descending order of length" in the user interface screen of FIG. 68.

For example considered is an example of selecting a segment constituting a pattern model by setting the pattern window PW on a registered image where different characters and numerals are displayed in grid frames as shown in FIG. 69. In the case of setting as shown in FIG. 70, since the order of contour registration 85 is set to "descending order of length", namely, it is set so as to sequentially select the contours from the longer one to the shorter one. Thereby, as in FIG. 69, many of the segments SGW in the frame portions are undesirably selected and few of the segments SGM in the portions of characters and numerals, important for identification, are selected, and the accuracy in positioning cannot be expected if this state remains unchanged.

Figure 71:
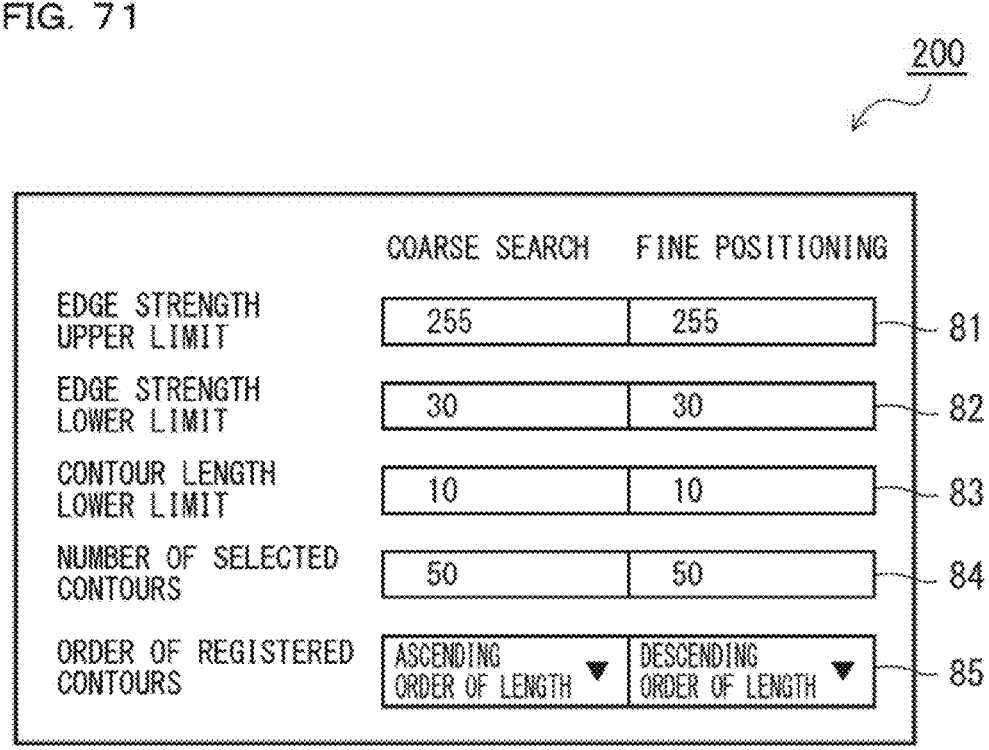
FIG. 71 is an image view showing a state where the contour registering order has been set to "ascending order of length" in the user interface screen of FIG. 70.
Figure 72:
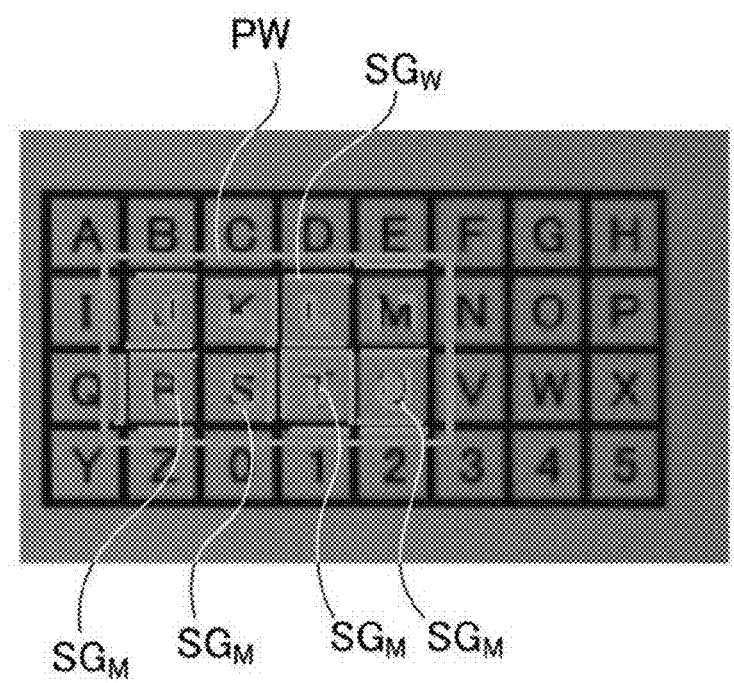
FIG. 72 is an image view showing a state where a segment has been selected in the registered image of FIG. 69 on the setting condition of FIG. 71.

As opposed to this, as shown in FIG. 71, the setting in the order of contour registration 85 is changed to "ascending order of length", namely, the setting is changed so as to select the contours sequentially from the shorter one to the longer one, whereby many of the segments SGM of the characters and numerals inside the frames come to be selected as in FIG. 72, so that a pattern model including contour information suitable for the registered image can be constructed.

It is to be noted that, although each setting item is individually settable respectively in the coarse search and fine positioning in the example of FIG. 68, it can be made settable in either one, or such a constitution may be formed that a specific item is defined by the image processing program or the image processing apparatus side, and adjustment by the user is inhibited. Reducing the number of setting items to allow a user not particularly familiar with the operation to use the device in a simplified manner can improve operability.

Further, as for the contour, contour information such as the chain or the like other than the segment is also usable. For example, in the case of using chains obtained by the chain creating device 63 as they are as the contour information without approximating the chains to the line segment or the circular arc segment, a technique for selecting the chains from the short chain as described above, a technique for making the order of selection switchable between ascending order and descending order, or a technique for eliminating a chain shorter or longer than a predetermined threshold can be applied to selection criteria for the chain, and this can also allow a similar action effect to be obtained. Next, a specific procedure for sorting the contours in order of contour length is described based on flowcharts of FIGS. 73 and 74.

Figure 73:
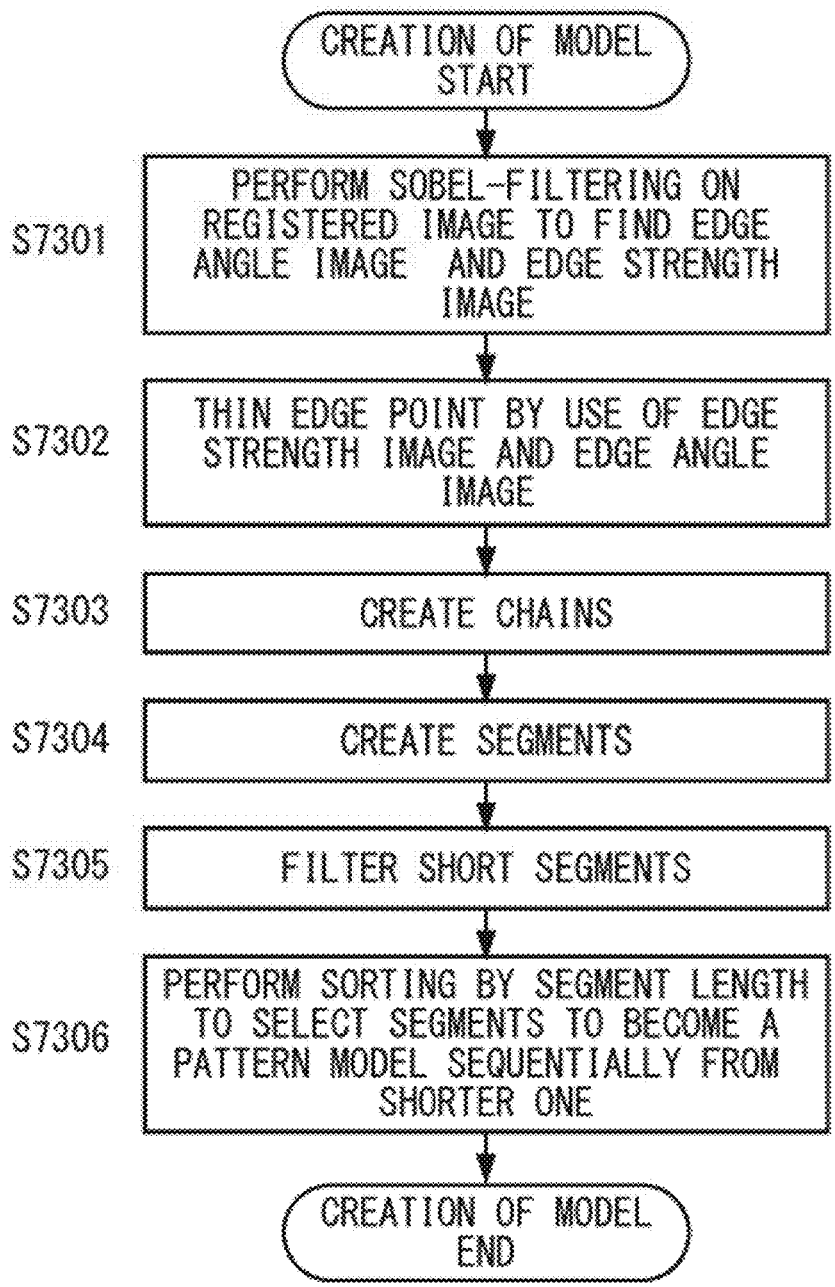
FIG. 73 is a flowchart showing a procedure for performing sorting in order of segment length.

First, the case of performing the sorting by use of a segment length is described based on FIG. 73. First a contour is extracted. First, in Step S7301, the registered image is Sobel-filtered, to find an edge angle image and an edge strength image. Next in Step S7302, an edge point is thinned by use of the edge angle image and the edge strength image, to find a contour point. Specifically, after creation of the edge angle image and the edge strength image by the edge angle/edge strength image creating device 60 of the contour extracting device 62, the edge point is thinned by the thinning device 61 by means of edge-strength non-maximal point suppressing processing. Further, in Step S7303, a chain is created by the chain creating device 63. Specifically, the edge chaining device 64 couples adjacent edge points, to create the chain. Moreover, the filtering is performed as appropriate by the chain filtering device 66 with a variety of characteristic amounts.

Next in Step S7304, a segment is created. The edge chain segmenting device 65 of the segment creating device 68 creates a segment obtained by approximating each chain by the line and/or the circular arc. Further, in Step S7305, the short segment is filtered. As a contour length lower limit setting device, the segment selecting device 67 eliminates a segment with a length not larger than a lower limit value, to eliminate the noise component.

Finally, in Step S7306, the segments are sorted by segment length, to select the segments constituting a pattern model sequentially from the segment having a shorter length. The segment selecting device 67 functions as a contour sorting device for sorting the contours in descending order of length, sorts the segments in order of length, and further selects the segments in number defined by the number-of-selections deciding device in a selection order defined by the order-of-selections deciding device, in ascending order of segment length, namely sequentially from the shorter one. Thereby, a pattern model suitable for the registered image as in FIG. 72 described above is constructed.

Figure 74:
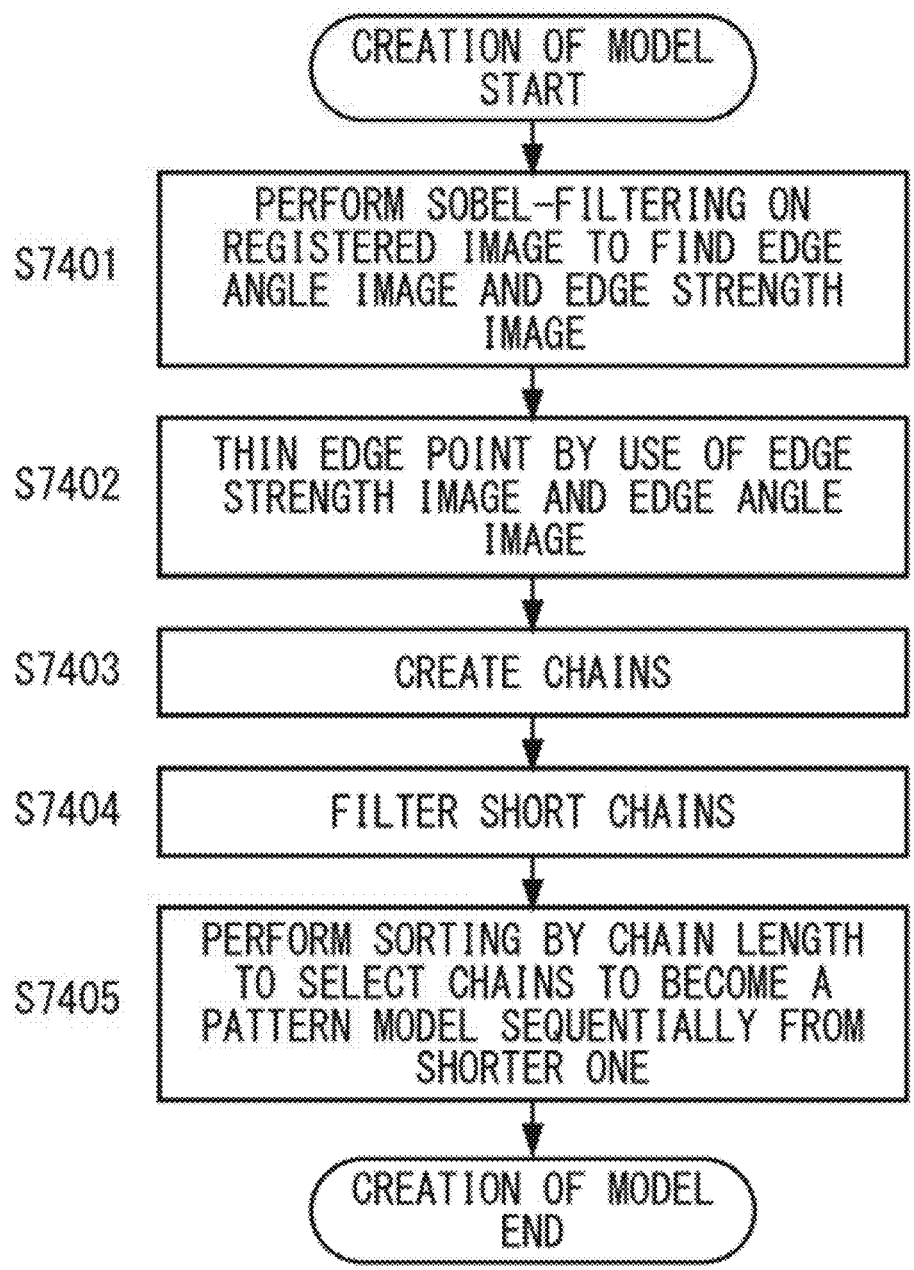
FIG. 74 is a flowchart showing a procedure for sorting in order of chain length.

On the other hand, an example of using the chains as they are not through the segment as the contour is described based on a flowchart of FIG. 74. A procedure from extraction of the contour point to creation of the chain is the same as FIG. 73 above. Namely, in Step S7401, the registered image is Sobel-filtered, to find an edge angle image and an edge strength image. Next in Step S7402, an edge point is thinned by use of the edge angle image and the edge strength image, to find a contour point. Further, in Step S7403, a chain is created.

Then, in Step S7404, the short chain is filtered. In accordance with a lower limit value set by the contour length lower limit setting device, the chain filtering device 66 of the chain creating device 63 eliminates the chain shorter than the contour length lower limit 83. Subsequently, in Step S7405, the chains are sorted in order of chain length, to select the chains constituting a pattern model sequentially from the chain having a shorter length. Also in this case, the chain filtering device 66 functions as the contour sorting device, sorts the chains in order of length, and further selects the chains in number defined by the number-of-selections deciding device in a selection order defined by the order-of-selections deciding device, in ascending order of chain length. Thereby, a pattern model suitable for the registered image as in FIG. 72 is constructed.

With this method, the processing of once making approximation with a segment is not required, and hence the processing can be accordingly simplified. On the other hand, since the chain is a body of coupled random line segments not approximated to a fixed geometric graphic such as the line or the circular arc, each of subsequent processing becomes complicated. Which method is selected is decided in accordance with whether or not the registered image is a simple graphic, the detection accuracy of the edge point, or the like.

(Filtering Long Contour)

Figure 75:
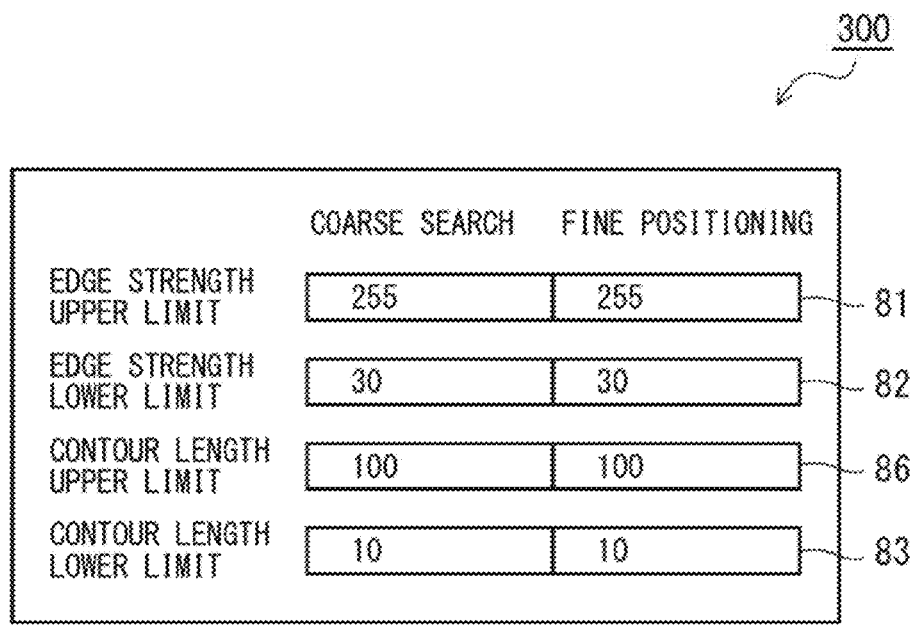
FIG. 75 is an image view showing a user interface screen for setting a pattern characteristic selecting function to filter a long contour in the image processing program.

It should be noted that, although the sorting is performed in order of contour length in the above example, the pattern model can be constructed by eliminating the long contour without performing sorting. In the following, this method is described based on a user interface screen of FIG. 75. FIG. 75 is also an image view showing a user interface of an image processing program setting screen 300 for setting the pattern characteristic selecting function for the registered image in the image processing program. In this screen, a contour length upper limit 86 is given in addition to the edge strength upper limit 81, the edge strength lower limit 82, and the contour length lower limit 83. The edge strength upper limit 81, the edge strength lower limit 82 and the contour length lower limit 83 are similar to those in FIG. 68 described above, and detailed descriptions thereof are not repeatedly provided.

(Contour Length Upper Limit Setting Device)

The contour length upper limit 86 functions as a contour length upper limit setting device for setting an upper limit value of a contour. Namely, the contour length upper limit 86 filters the longer contour than the upper limit value defined by the contour length upper limit 86. It is thereby possible to construct a pattern model by intentionally eliminating the long contour while leaving only the short contour, so as to consequently obtain a similar effect to the case of preferentially selecting the short contour.

It is to be noted that in the example of FIG. 75, the number-of-selections deciding device is not provided, and contours in number of a pre-set defined value are automatically selected. However, the number-of-selections deciding device can also be provided so as to allow the user to manually set the number of contours.

Figure 76:
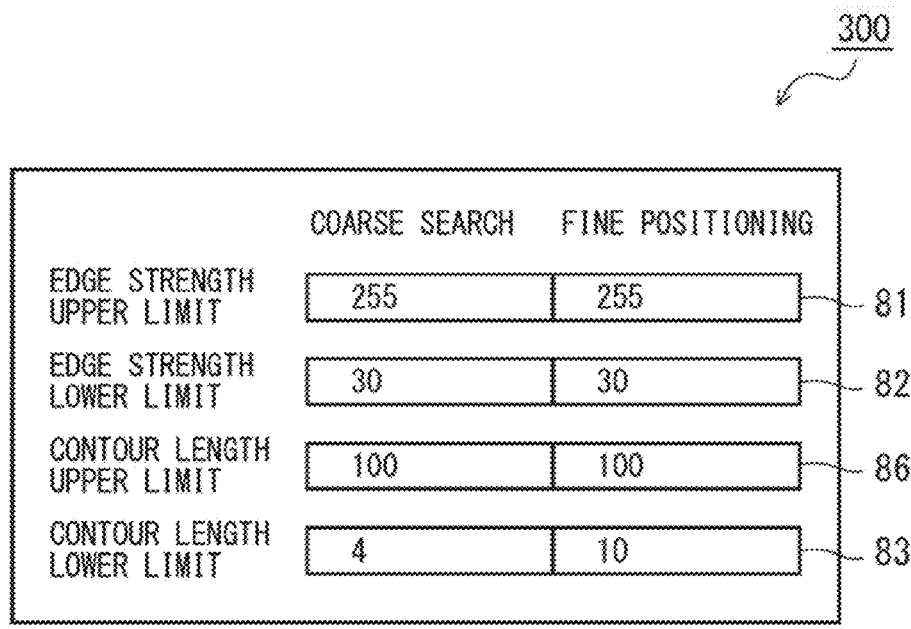
FIG. 76 is an image view showing a state where the upper limit of the contour length has been set high in the user interface screen of FIG. 75.
Figures 77, 78:
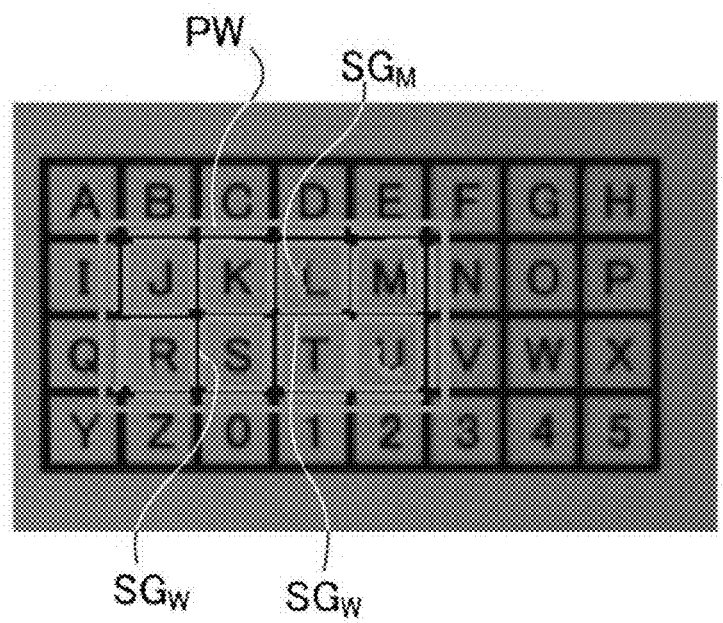
FIG. 77 is an image view showing a state where a segment has been selected in the registered image of FIG. 69 on the setting condition of FIG. 76.
FIG. 78 is an image view showing a state where the upper limit of the contour length has been set low in the user interface screen of FIG. 75.
Figure 79:
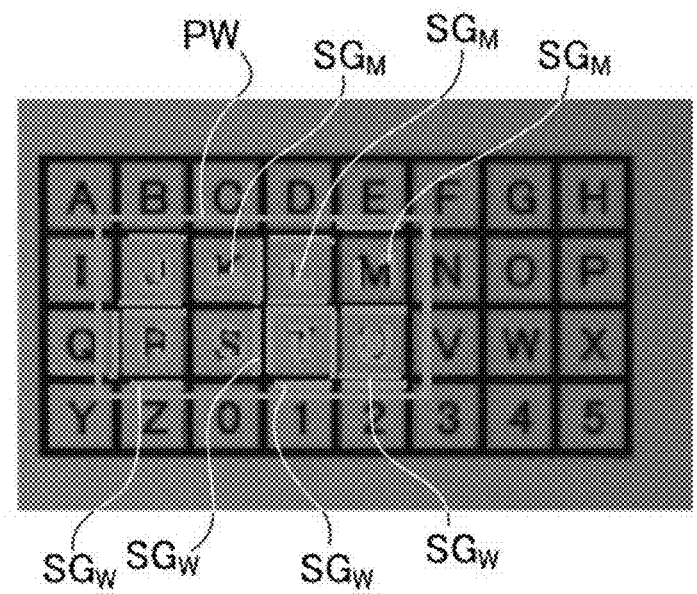
FIG. 79 is an image view showing a state where a segment has been selected in the registered image of FIG. 69 on the setting condition of FIG. 78.

As thus described, without sorting the contours in order of length, a pattern model can be constructed where a short contour is preferentially selected, and a pattern search also effective to the registered image as in FIG. 67 can be realized. For example, in such setting conditions as shown in FIG. 76, the pattern model includes many of the segments SGW that are selected in the frame portions as shown in FIG. 77. However, by changing the contour length upper limit 86 from 100 to 20 as shown in FIG. 78, there can be constructed a pattern model, as shown in FIG. 79, including many of the segments SGM of the characters or numerals inside the frames.

Figure 80:
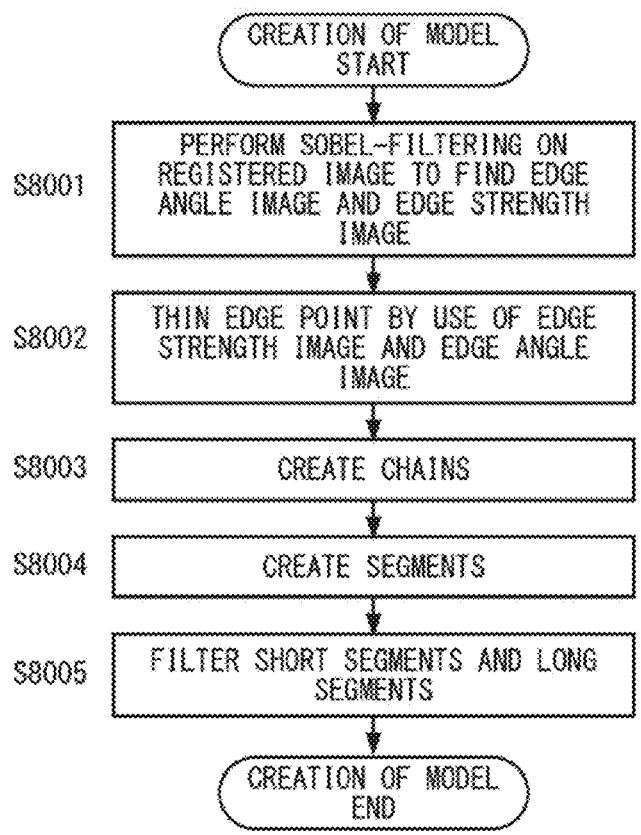
FIG. 80 is a flowchart showing a procedure for filtering a long segment.
Figure 81:
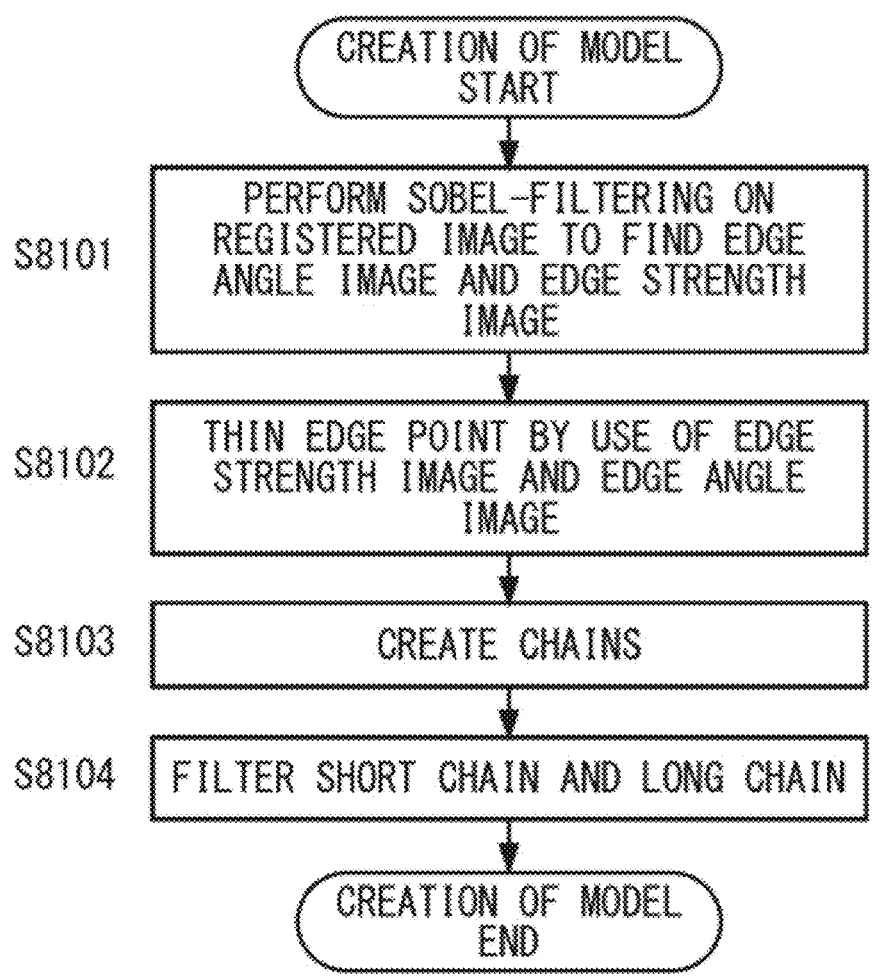
FIG. 81 is a flowchart showing a procedure for filtering a long chain.

A procedure for filtering a long contour is described based on flowcharts of FIGS. 80 and 81. First, FIG. 80 describes the case of using the segment as the contour. Also with this method, as in the foregoing case of sorting the contours by contour length, contour points are extracted to create a chain. Namely, in Step S8001, the registered image is Sobel-filtered, to find an edge angle image and an edge strength image. Next in Step S8002, an edge point is thinned by use of the edge angle image and the edge strength image, to find a contour point. Further, in Step S8003, a chain is created, and subsequently in Step S8004, a segment is created.

Finally, in Step S8005, the long segment and the short segment are deleted. Besides that the segment selecting device 67 eliminates the segment having a length not larger than the lower limit value as the contour length lower limit setting device, the segment selecting device 67 further functions as the contour length upper limit setting device, to delete the segment having a length larger than the contour length upper limit 86. Consequently, since the short segment can be selected after elimination of the noise component, there can be constructed a pattern model including a segment effective for positioning in such a case as FIG. 79. Although the number of segments to be selected is a fixed value, as described above, the number-of-selections deciding device can be separately provided so as to allow the user to manually make a setting.

Further, an example of constructing a pattern model by chains in place of segments is described based on FIG. 81. Also in this case, a procedure from extraction of the contour point to creation of the chain is similar to that of FIG. 74 described above. Namely, in Step S8101, the registered image is Sobel-filtered, to find an edge angle image and an edge strength image. In Step S8102, an edge point is thinned by use of the edge angle image and the edge strength image, to find a contour point. In Step S8103, a chain is created.

Then, in Step S8104, the long chain and the short chain are deleted. The chain filtering device 66 eliminates the chain having a length not larger than a contour length lower limit value as the contour length lower limit setting device, and also functions as the contour length upper limit setting device, to delete the longer chain than the contour length upper limit 86. Consequently, since the short chain can be selected after elimination of the noise component, there can be constructed a pattern model including a chain effective for positioning of the registered image in such a case as FIG. 79. Although the number of chains to be selected is a fixed value, as described above, the number-of-selections deciding device can be separately provided so as to allow the user to manually make a setting.

(Combination of Segment Selecting Functions in Consideration of Segment Direction)

The pattern characteristic selecting function can be used simultaneously with the foregoing segment selecting function in consideration of the positioning direction or angle. Namely, as a technique for deciding which segment is selected for constructing a pattern model after sorting of segments in order of length or after filtering of a long segment, it is possible to adopt a method for selecting a conjugated segment close to an orthogonal direction to a reference segment, as a method shown by a flowchart of FIG. 50 and the like. It is to be noted that this method can be used for selection of the segment, but cannot be use for selection of the chain. This is because the chain is not appropriated by the line and/or the circular arc, and thus does not have an angle or a direction as does the segment.

Figure 82:
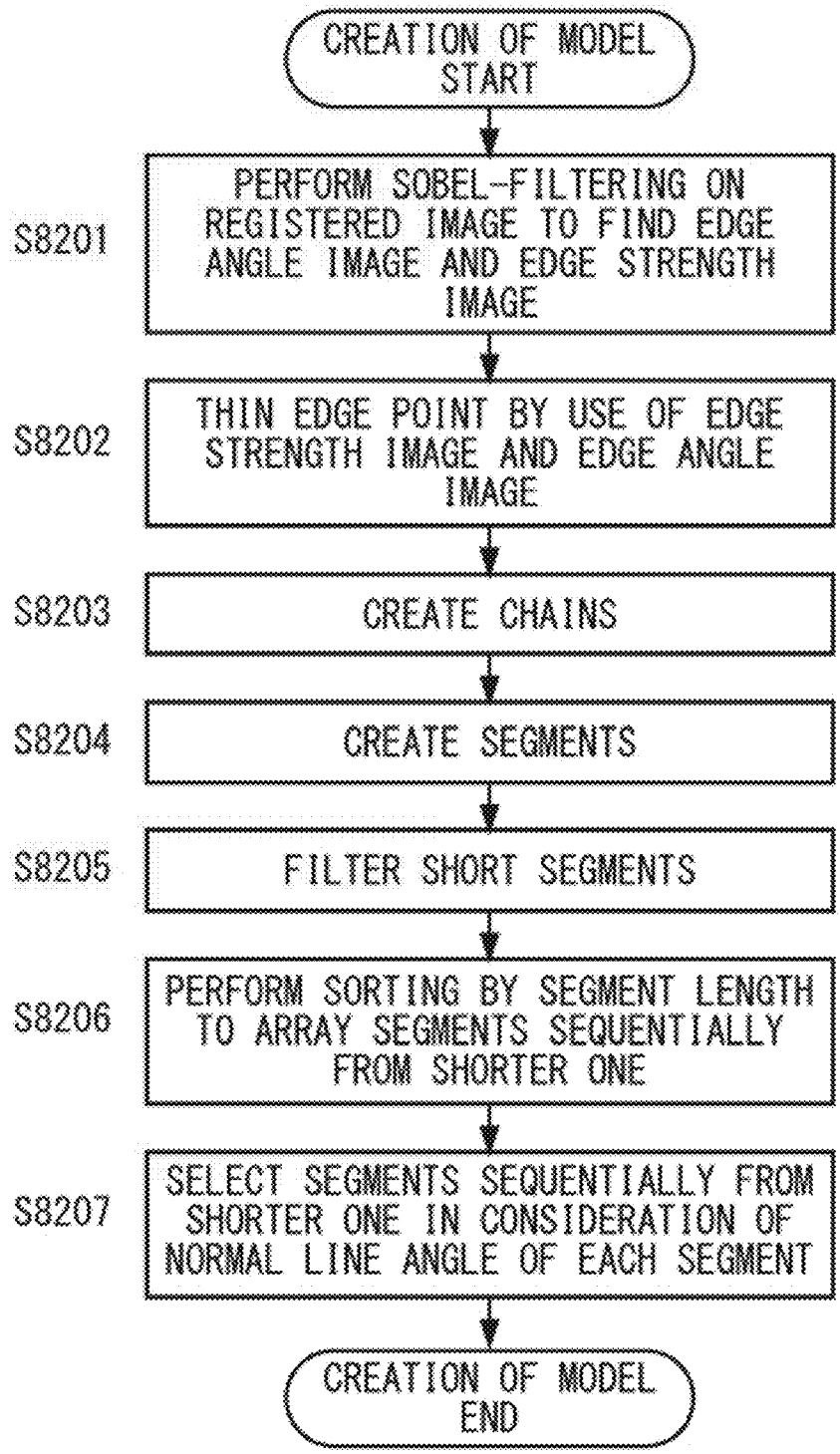
FIG. 82 is a flowchart showing a procedure for selecting a segment after sorting with the segment length.

An example of considering the direction of the normal to the segment upon selecting the segment after sorting or filtering is described below based on flowcharts of FIGS. 82 and 83. First, FIG. 82 shows an example of sorting the segments by segment length. Also in this case, a procedure from extraction of the contour point to create the chain and the segment to filtering of the short one among the obtained segments to sort the segments is similar to the foregoing procedure of FIG. 73. Namely, first in Step S8201, the registered image is Sobel-filtered, to find an edge angle image and an edge strength image. Next in Step S8202, an edge point is thinned by use of the edge angle image and the edge strength image, to find a contour point. Further in Step S8203, a chain is created, and then in Step S8204, a segment is created. Subsequently in Step S8205, the short segment is filtered, and then in Step S8206, segments after the filtering are sorted by segment length and arrayed in ascending order of length.

Figure 84:
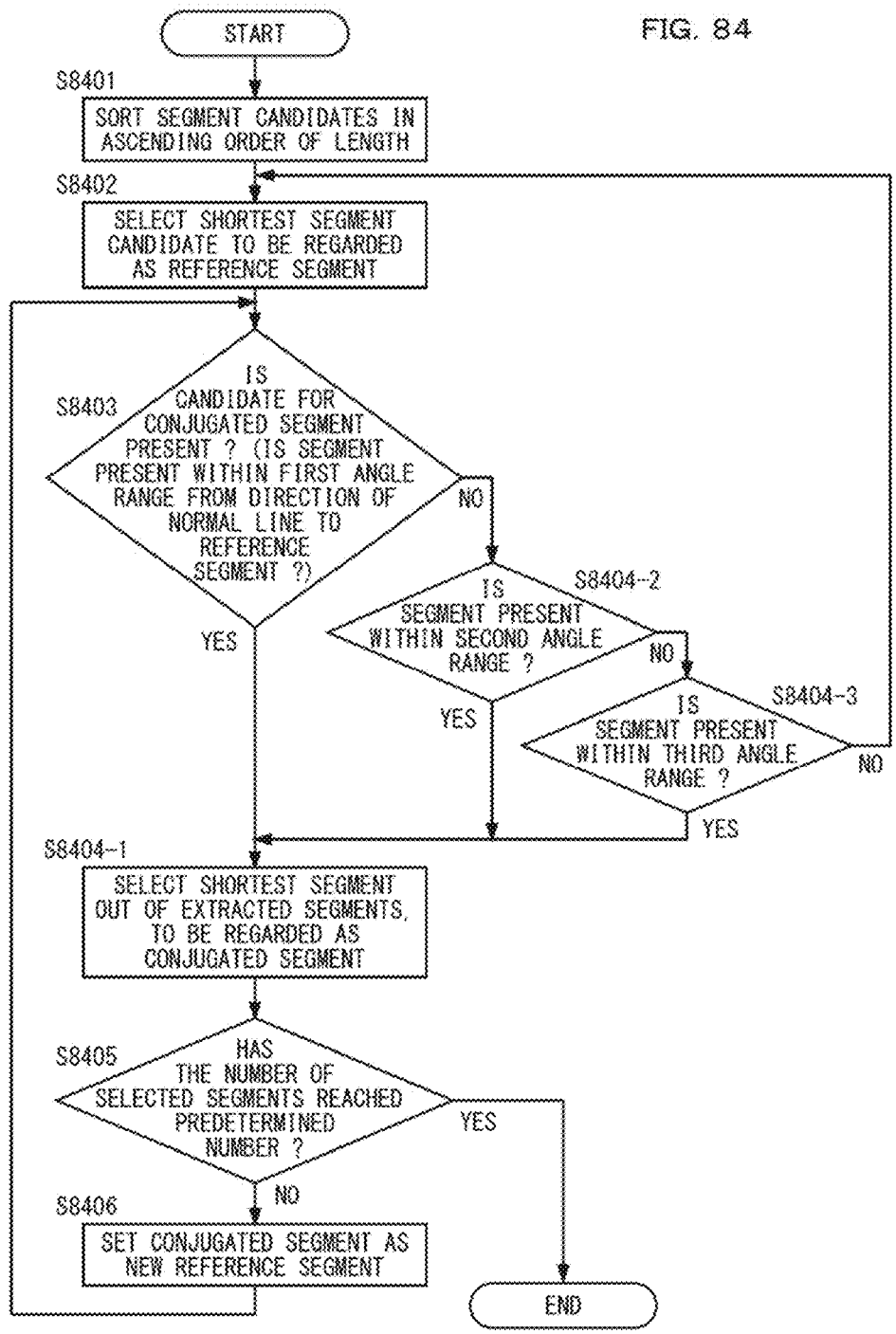
FIG. 84 is a flowchart showing a selection procedure for a segment in consideration of a direction of a normal thereto.

In this state, in Step S8207, the segments are selected sequentially from the shorter one while considering the direction of the normal to each segment. A specific procedure after Step S8206 of FIG. 82 is shown in a flowchart of FIG. 84. This flowchart is almost similar to the flowchart of FIG. 50, but is different therefrom in: setting the order of sorting not to descending order of segment length but to ascending order from the shorter one in Step S8401; selecting the shortest segment as a segment candidate and regarding this as a reference segment in Step S8402; and selecting the shortest segment as a segment candidate and regarding this as a conjugated segment in Step S8404-1. Other than the above are similar to those in FIG. 50, and detailed descriptions thereof are thus not repeatedly provided.

This method is particularly effectively performed on the registered image where the short segment is effective, and substantially orthogonal segments are alternately selected, to construct a pattern model where segments in such a relation that normal angles are orthogonal are intentionally selected, whereby it is possible to expect a result of stable positioning in the longitudinal and lateral directions.

Figure 83:
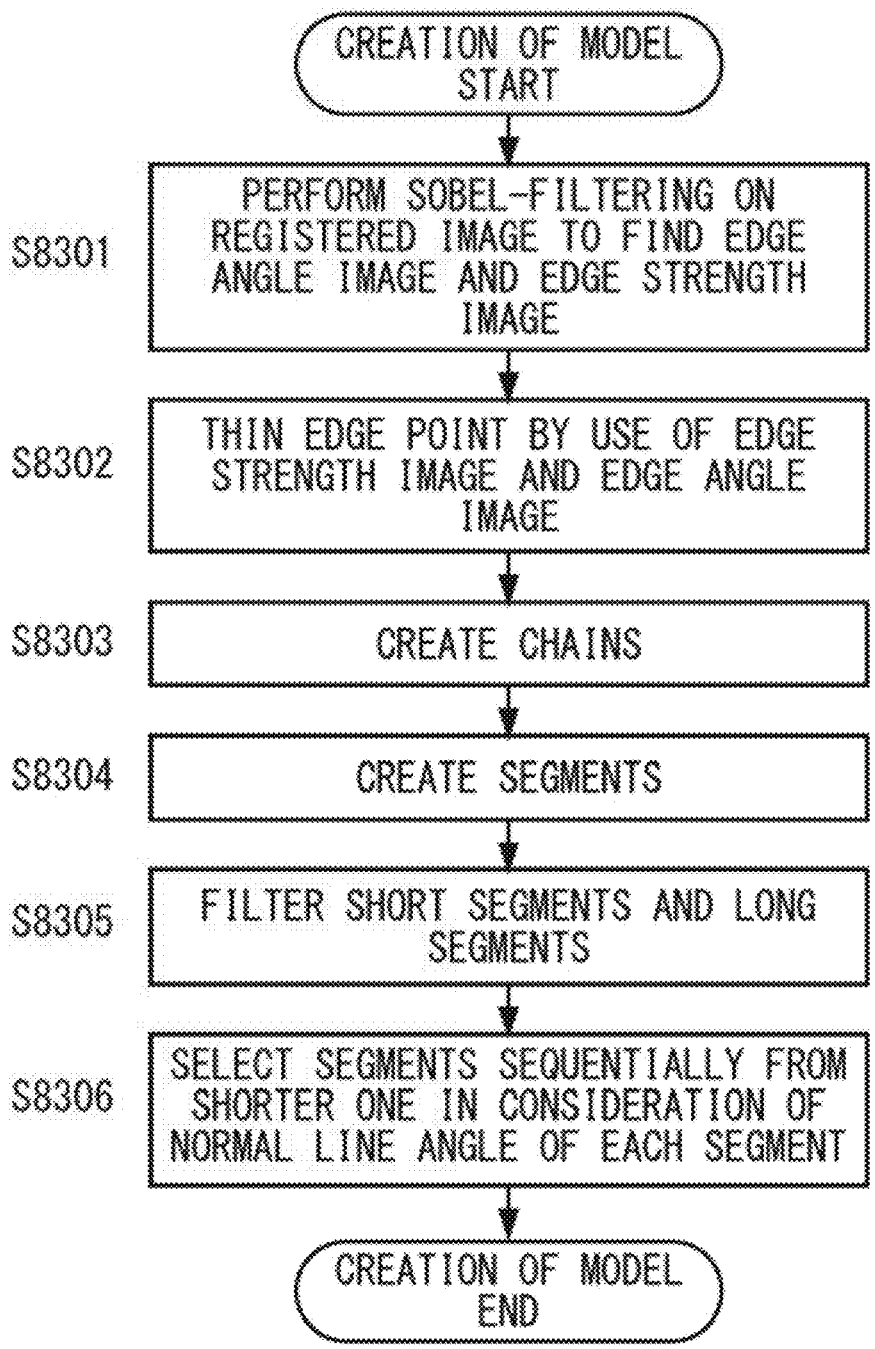
FIG. 83 is a flowchart showing a procedure for selecting a segment after filtering.

Similarly, an example of considering the direction of the normal to the segment in the method for filtering a segment having a large length is described based on a flowchart of FIG. 83. Also in this case, a procedure from extraction of the contour point to create the chain and the segment to filtering of the short one and the long one is similar to the foregoing procedure of FIG. 80 and the like. Namely, first in Step S8301, the registered image is Sobel-filtered, to find an edge angle image and an edge strength image. Next in Step S8302, an edge point is thinned by use of the edge angle image and the edge strength image, to find a contour point. Further in Step S8303, a chain is created, and then in Step S8304, a segment is created. Subsequently in Step S8305, the short segment and the long segment are filtered. Since an operation of sorting the segments by segment length in Step S8306 is required at any rate in this case, the foregoing method of FIG. 82 can be regarded as more efficient from this point of view. The other effects are similar to those in FIG. 82, and as a result of selecting a conjugated segment close to the orthogonal direction, the segment with a dispersed angle is selected to be the pattern model, thereby allowing improvement in stability of the positioning.

(Improvement in Stability of Least Squares Method)

Figure 85:
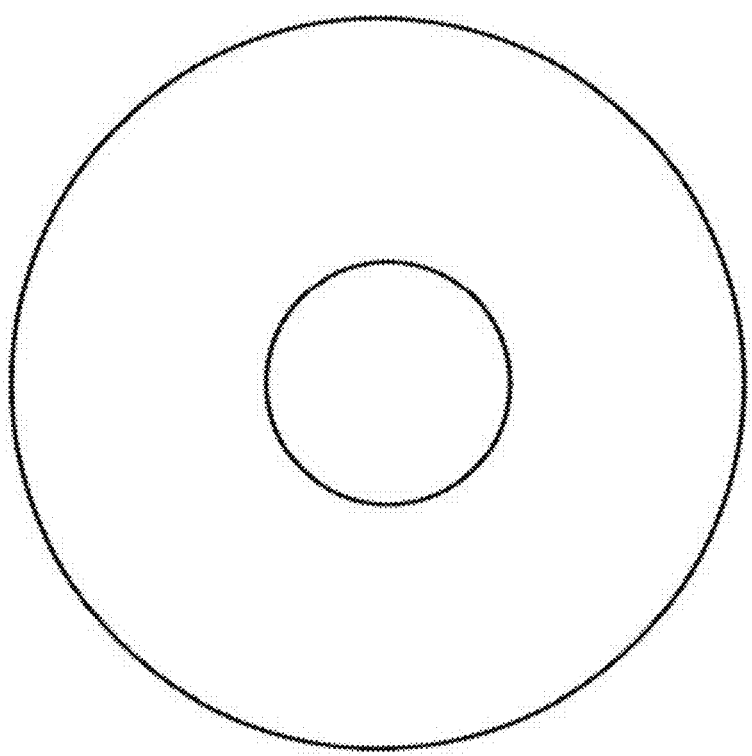
FIG. 85 is a schematic view showing an example of performing fine positioning on a graphic having high symmetry.

Next described is a technique for improving the stability of the least squares method performed in the fine positioning step. The least squares method is briefly categorized into a linear method and a non-linear method. In the linear least squares method out of these methods, theoretically, a solution can be uniformly obtained. On the other hand, in the non-linear least squares method, approximation is typically made until a quadratic expression, and hence the approximated value is not necessarily accurate. In some cases, in the fine positioning step, the position to be detected may be moved or rotated in a direction to lower the accuracy than the position obtained in the coarse search. For example, in the case of performing the fine positioning on a graphic with high symmetry such as a circular shape shown in FIG. 85 (a center coordinate of an outer circle is subtly different from a center coordinate of an inner circle), since an error value hardly changes even when each circle is rotated around its center as a rotational axis, the circles can rotate in a reverse direction to a direction in which the circles should essentially rotate, or consequently, a large change in angle as well as a large displacement of a parallel moving amount may occur.

In a typical solving method of the non-linear least squares method approximated by a quadratic expression, such a procedure is taken that an approximate error function is created by approximating an error function E (pi) until a quadratic power number of a trial parameter in the neighborhood of a group "pi" of trail parameters as variables of the least squares method, and using the approximate error function, such a group "pi" of the trial parameters as to minimize the error function is found.

As a solving method for obtaining a solution with a small error value in the non-linear least squares method as thus described, the following reverse-Hessian method has been proposed.

This is a method in which, after calculation of the approximate error function and calculation a group of the least trial parameters from the error function, a group of trial parameters on a next stage with higher accuracy is found all together. However, in the case of finding a solution having a small error value by use of this reverse-Hessian method, such a defect as below might occur. This is described based on FIGS. 86A and 86B. In each of FIGS. 86A and 86B, a solid line indicates the error function, and a broken line indicates an approximate error function obtained by approximating this error function. In each of FIGS. 86A and 86B, symbol P1 provided on a curve showing the error function denotes a position (x, y, θ) obtained in the coarse search described above. What is obtained as a quadratic function based on a value of the error function in the neighborhood of this P1 is the quadratic curve showing the approximate error indicated by the broken line.

Figure 86A:
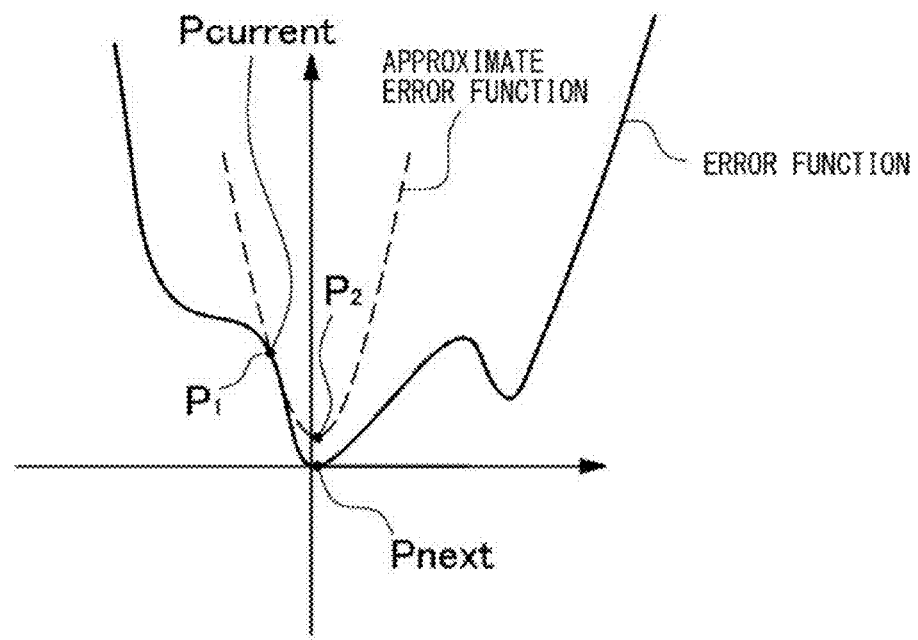
FIGS. 86A and 86B are schematic views each showing the state of approximating an error function by the reverse Hessian method.

Further, in the case shown in FIG. 86A, the drawing describes a case where the reverse-Hessian method appropriately acts, showing a case where, since a position having the least error value of the quadratic curve of the broken line indicating the approximate error function, namely P2, is close to a position P having the least error value of the error function indicated by the solid line, a more accurate position P2 having a small error value is found.

Figure 86B:
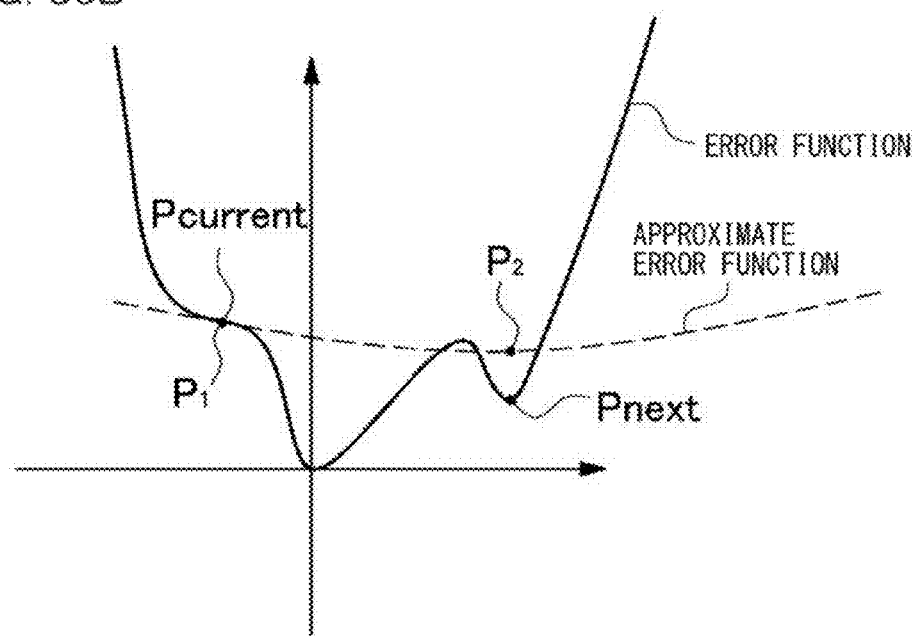

On the other hand, in the case of FIG. 86B, the drawing describes a case where the reverse-Hessian method inappropriately acts, showing a case where, since a position having the least error value of the quadratic curve of the broken line indicating the approximate error function, namely P2, is away from the position P having the least error value of the error function indicated by the solid line, an in accurate position P2 having a small error value is found.

Out of the above cases, in the case shown in FIG. 86B, when a solution is intended to be found as it is in the reverse-Hessian method, large displacement of the trial parameter may be taken as the solution as described above, which as a result causes the problem of deterioration in accuracy of fine positioning. The present inventor found a technique for providing a limitation concerning movement or rotation of a pattern model as a technique for suppressing occurrence of the case of the reverse-Hessian method acting in an inappropriate manner, shown in FIG. 86B. Namely, as a solving method for the least squares method based on the reverse-Hessian method, a new term is added to the error function. Specifically, besides the foregoing term concerning a distance (first error function), such a term (second error function Ed) as to increase the error value due to displacement from the trial parameter is added. Thereby, an excessively large change is suppressed by the second error function Ed so that appropriate approximation as shown in FIG. 86A can be expected. As thus described, a condition of convergence in a proper direction in the fine positioning step can be added, to avoid rotation and dispersion in an unintended direction, so as to improve the reliability of the positioning. When the trial parameter in the least squares method is Pi, the second error function is a function of "Pi−P0i". An example of simultaneous equations of the error function E(P) obtained as a result of this is shown in the next expression:

$$E(P_0, P_1, \ldots, P_n) = \quad \text{[Expression 21]}$$
$$E_o(P_0, P_1, \ldots, P_n) + E_d(P_0, P_1, \ldots, P_n)$$
$$E_d(P_0, P_1, \ldots, P_n) = \sum_i \left(\frac{(P_i - P_{0i})}{\sigma_i}\right)^2$$

In the above expression, a total error function E(P) is expressed by a sum of a first error function Eo showing a distance between each segment and its corresponding edge point and a second error function Ed obtained by regarding as a second error value an amount of change in trial parameter in the first error function upon making that change and computing an accumulated value of the second error values. As thus described, in computing of the least squares method, since addition of the second error function Ed besides the term that becomes the least value upon matching with an ideal position leads to searching for a solution in such a direction as to make both terms smaller, and suppression of an excessively large change in trial parameter, it is possible to avoid such a condition as rotation or dispersion in a wrong direction upon the fine positioning, so as to obtain the advantage of stabilizing a processing result.

INDUSTRIAL AVAILABILITY

The image data compression method, the pattern model positioning method in image processing, the image processing apparatus, the image processing program, and the computer readable recording medium according to the present invention are preferably applicable to positional detection of a coordinate position, a rotational angle and the like of a work, positional measurement of an external diameter, an internal diameter, a width, and the like, recognition, identification, determination, testing, and the like in image processing to be used in the factory automation (FA) field. For example, the present invention can be used for positioning of an electrode of an integrated circuit (IC) for bonding thereof, and the like.

What is claimed is:

1. An image data compression method for compressing data on an image to be searched in pattern model positioning in image processing of searching out of the image to be searched and positioning an object to be searched that is similar to a pre-registered image by use of a pattern model corresponding to the registered image, the method including the steps of:

computing an edge angle image including edge angle information with respect to each pixel constituting an image;

transforming an edge angle of each pixel into an edge angle bit image expressed by an edge angle bit indicating an angle with a pre-defined fixed width; and performing an OR operation on an edge angle bit of every pixel included in an OR operation region decided in accordance with a reduction ratio for reducing the edge angle bit image in order to create an edge angle bit reduced image reduced from the edge angle bit image, to create an edge angle bit reduced image made up of reduced edge angle bit data representing each OR operation region.

2. The image data compression method according to claim 1, wherein the step of computing an edge angle image computes an edge strength image including information on an edge strength in each pixel constituting the image in addition to the edge angle image including the edge angle information.

3. The image data compression method according to claim 2, wherein the step of transforming an edge angle of each pixel into an edge angle bit image creates an edge angle bit image based on the edge strength image and the edge angle image of each pixel so as to hold the edge angle information with respect to each edge angle image even after reduction of the edge angle image into a predetermined reduction ratio.

4. The image data compression method according to claim 2, wherein an edge angle of a pixel, an edge strength of which is higher than a pre-set edge strength threshold, is held and an edge angle of a pixel, an edge strength of which is lower than the pre-set edge strength threshold, is not held.

5. The image data compression method according to claim 2, wherein the step of computing the edge angle image generates a thinned edge angle image by performing an edge-strength non-maximal point suppressing processing with an edge angle and an edge strength of the search image to be searched.

6. The image data compression method according to claim 1,
wherein the step of transforming the edge angle of each pixel into the edge angle bit image sets up edge angle bits of both edge angle sections that demarcate a border between the edge angle sections in a case where the edge angle is included in a predetermined edge angle bit processing width with the border between the edge angle sections for sectionalizing the edge angle set at the center.

7. The image data compression method according to claim 1,
wherein the step of transforming the edge angle of each pixel into the edge angle bit image sets up an edge angle bit of either one of the edge angle sections that demarcate a border between the edge angle sections in a case where the edge angle is included in a predetermined edge angle bit processing width with the border between the edge angle sections for sectionalizing the edge angle set at the center.

8. The image data compression method according to claim 1,
wherein a resolution of the edge angle in the step of transforming an edge angle of each pixel into an edge angle bit image is any of eight bits, 16 bits, 32 bits and 64 bits.

9. The image data compression method according to claim 1,
wherein the search is performed by uniformly allocating to edge directions the edge angle bit as the resolution of the edge angle.

10. The image data compression method according to claim 1,
wherein the step of transforming an edge angle of each pixel into an edge angle bit image allocates a plurality of bits to edge angle directions.

* * * * *